United States Patent
Abrams et al.

(10) Patent No.: US 12,551,669 B2
(45) Date of Patent: Feb. 17, 2026

(54) MEDICAL SYSTEM INCLUDING TWO ACCESS PORTS

(71) Applicant: Biogen MA Inc., Cambridge, MA (US)

(72) Inventors: Daniel J. Abrams, Denver, CO (US); Lisa Lynn Shafer, Stillwater, MN (US); Dwight Skinner, New Brighton, MN (US)

(73) Assignee: Biogen MA Inc., Cambridge, MA (US)

( * ) Notice: Subject to any disclaimer, the term of this patent is extended or adjusted under 35 U.S.C. 154(b) by 582 days.

(21) Appl. No.: 17/376,554

(22) Filed: Jul. 15, 2021

(65) Prior Publication Data

US 2022/0016402 A1    Jan. 20, 2022

Related U.S. Application Data

(60) Provisional application No. 63/209,835, filed on Jun. 11, 2021, provisional application No. 63/052,284, filed on Jul. 15, 2020.

(51) Int. Cl.
*A61M 27/00*    (2006.01)
*A61M 5/142*    (2006.01)
(Continued)

(52) U.S. Cl.
CPC ...... *A61M 27/006* (2013.01); *A61M 5/14276* (2013.01); *A61M 5/158* (2013.01);
(Continued)

(58) Field of Classification Search
CPC ........... A61M 2005/14284; A61M 2025/0037; A61M 2039/0235; A61M 2039/025;
(Continued)

(56) References Cited

U.S. PATENT DOCUMENTS

| | | | |
|---|---|---|---|
| 1,456,469 | A | 5/1923 | Schwidetzky |
| 2,609,818 | A | 9/1952 | Parrine |

(Continued)

FOREIGN PATENT DOCUMENTS

| | | |
|---|---|---|
| CA | 3098311 A1 | 11/2019 |
| DE | 3127882 A1 | 2/1983 |

(Continued)

OTHER PUBLICATIONS

International Search Report and Written Opinion from PCT App. No. PCT/US2021/041766 dated Nov. 25, 2021, 14 pages.

(Continued)

*Primary Examiner* — Kai H Weng
(74) *Attorney, Agent, or Firm* — Finnegan, Henderson, Farabow, Garrett & Dunner, LLP

(57) ABSTRACT

A system includes a first port comprising a first inlet, a first outlet, a first fluid pathway extending from the first inlet to the first outlet, a second inlet, a second outlet, and a second fluid pathway extending from the second inlet to the second outlet. The system further includes one or more CSF catheters having a first lumen, a first distal opening in fluid communication with the first lumen, a second lumen, and a second distal opening in fluid communication with the second lumen. The one or more CSF catheters are, or are configured to be, operatively coupled with the first implantable device such that the first lumen is in fluid communication with the first fluid pathway and the second lumen is in fluid communication with the second fluid pathway. At least the first distal opening is configured to be placed in the CSF-containing space. The system further includes a second port having a third inlet, a third outlet, and a third fluid pathway extending from the third inlet to the third outlet. The system also includes a port catheter configured to (Continued)

operatively couple the third fluid pathway to the second fluid pathway.

22 Claims, 7 Drawing Sheets

(51) Int. Cl.
| | | |
|---|---|---|
| *A61M 5/158* | (2006.01) | |
| *A61M 5/165* | (2006.01) | |
| *A61M 39/02* | (2006.01) | |
| A61B 10/00 | (2006.01) | |
| A61M 5/14 | (2006.01) | |
| A61M 25/00 | (2006.01) | |

(52) U.S. Cl.
CPC ........ *A61M 5/165* (2013.01); *A61M 39/0208* (2013.01); *A61M 39/0247* (2013.01); *A61B 2010/0077* (2013.01); *A61M 5/1408* (2013.01); *A61M 2005/14284* (2013.01); *A61M 2025/0037* (2013.01); *A61M 2039/025* (2013.01); *A61M 2039/0264* (2013.01); *A61M 2210/0687* (2013.01); *A61M 2210/0693* (2013.01)

(58) Field of Classification Search
CPC .. A61M 2039/0264; A61M 2210/0687; A61M 2210/0693; A61M 27/006; A61M 39/0208; A61M 39/0247; A61M 5/1408; A61M 5/14276; A61M 5/158; A61M 5/165; A61B 10/0045; A61B 2010/0077
See application file for complete search history.

(56) References Cited

U.S. PATENT DOCUMENTS

| | | |
|---|---|---|
| 3,040,743 A | 6/1962 | Knut |
| 3,506,006 A | 4/1970 | Lange, Jr. |
| 3,563,373 A | 2/1971 | Paulson |
| 3,640,269 A | 2/1972 | Delgado |
| 3,892,237 A | 7/1975 | Steiner |
| 4,281,666 A | 8/1981 | Cosman |
| 4,281,667 A | 8/1981 | Cosman |
| 4,464,168 A | 8/1984 | Redmond et al. |
| 4,500,311 A | 2/1985 | Redmond et al. |
| 4,583,968 A | 4/1986 | Mahurkar |
| 4,677,985 A | 7/1987 | Bro et al. |
| 4,723,556 A | 2/1988 | Sussman |
| 4,732,850 A | 3/1988 | Brown et al. |
| 4,767,410 A | 8/1988 | Moden et al. |
| 4,779,763 A | 10/1988 | Klawitter |
| 4,861,335 A | 8/1989 | Reynolds |
| 4,883,101 A | 11/1989 | Strong |
| 4,904,241 A | 2/1990 | Bark |
| 4,946,778 A | 8/1990 | Ladner et al. |
| 4,958,622 A | 9/1990 | Selenke |
| 5,067,948 A | 11/1991 | Haber et al. |
| 5,197,951 A | 3/1993 | Mahurkar |
| 5,225,539 A | 7/1993 | Winter |
| 5,334,163 A | 8/1994 | Sinnett |
| 5,377,864 A | 1/1995 | Blechl et al. |
| 5,522,807 A | 6/1996 | Luther |
| 5,648,237 A | 7/1997 | Carter |
| 5,704,352 A | 1/1998 | Tremblay et al. |
| 5,720,720 A | 2/1998 | Laske et al. |
| 5,736,137 A | 4/1998 | Anderson et al. |
| 5,810,789 A | 9/1998 | Powers et al. |
| 5,823,961 A | 10/1998 | Fields et al. |
| 5,897,528 A | 4/1999 | Schultz |
| 5,902,331 A | 5/1999 | Bonner et al. |
| 6,001,806 A | 12/1999 | Hilbert et al. |
| 6,006,124 A | 12/1999 | Fischell et al. |
| 6,013,051 A | 1/2000 | Nelson |
| 6,018,036 A | 1/2000 | Mosmann et al. |
| 6,086,555 A | 7/2000 | Eliasen et al. |
| 6,113,578 A | 9/2000 | Brown |
| 6,248,080 B1 | 6/2001 | Miesel et al. |
| 6,248,126 B1 | 6/2001 | Lesser et al. |
| 6,293,922 B1 | 9/2001 | Haase |
| 6,324,433 B1 | 11/2001 | Errico |
| 6,451,977 B1 | 9/2002 | De Sauvage et al. |
| 6,458,943 B1 | 10/2002 | Byrne |
| 6,475,987 B1 | 11/2002 | Shu |
| 6,482,185 B1 | 11/2002 | Hartmann |
| 6,562,023 B1 | 5/2003 | Marrs et al. |
| 6,573,099 B2 | 6/2003 | Graham |
| 6,595,979 B1 | 7/2003 | Epstein et al. |
| 6,632,927 B2 | 10/2003 | Adair et al. |
| 6,720,138 B2 | 4/2004 | Sharma et al. |
| 6,753,139 B1 | 6/2004 | Baulcombe et al. |
| 7,056,704 B2 | 6/2006 | Tuschl et al. |
| 7,083,785 B2 | 8/2006 | Browning et al. |
| 7,112,421 B2 | 9/2006 | Ambrose et al. |
| 7,161,488 B2 | 1/2007 | Frasch |
| 7,195,616 B2 | 3/2007 | Diller et al. |
| 7,359,765 B2 | 4/2008 | Varvarelis et al. |
| 7,371,388 B1 | 5/2008 | Ruben et al. |
| 7,618,409 B2 | 11/2009 | Hochman |
| 7,670,327 B2 | 3/2010 | Kucharczyk et al. |
| 7,883,502 B2 | 2/2011 | Powers et al. |
| 7,917,222 B1 | 3/2011 | Osorio et al. |
| 7,922,695 B2 | 4/2011 | Wiegel et al. |
| 8,066,681 B1 | 11/2011 | Hall et al. |
| 8,277,425 B2 | 10/2012 | Girard et al. |
| 8,409,133 B2 | 4/2013 | Pesach et al. |
| 8,556,866 B2 | 10/2013 | Krulevitch et al. |
| 8,744,544 B2 | 6/2014 | Najafi et al. |
| 8,808,234 B2 | 8/2014 | Vogelbaum et al. |
| 8,827,964 B2 | 9/2014 | Boyd et al. |
| 8,979,822 B2 | 3/2015 | Vogelbaum et al. |
| 9,913,960 B2 | 3/2018 | Blanchard et al. |
| 10,506,988 B2 | 12/2019 | Karoly et al. |
| 10,716,921 B2 | 7/2020 | Purdy |
| 10,967,172 B1 | 4/2021 | Shire et al. |
| 11,504,516 B2 | 11/2022 | Otto |
| 11,534,592 B2 | 12/2022 | Singh et al. |
| 12,097,029 B1 | 9/2024 | Shanechi |
| 2002/0004643 A1 | 1/2002 | Carmel et al. |
| 2002/0052563 A1 | 5/2002 | Penn et al. |
| 2002/0086356 A1 | 7/2002 | Tuschl et al. |
| 2003/0012783 A1 | 1/2003 | Kindsvogel |
| 2003/0069623 A1 | 4/2003 | Stypulkowski |
| 2003/0097051 A1 | 5/2003 | Kolberg et al. |
| 2003/0108923 A1 | 6/2003 | Tuschl et al. |
| 2003/0135148 A1 | 7/2003 | Dextradeur et al. |
| 2003/0204075 A9 | 10/2003 | Wang |
| 2003/0216714 A1* | 11/2003 | Gill .................. A61M 5/14232 604/890.1 |
| 2003/0228691 A1 | 12/2003 | Lewis et al. |
| 2004/0002677 A1 | 1/2004 | Gentsler |
| 2004/0053411 A1 | 3/2004 | Cullen et al. |
| 2004/0069044 A1 | 4/2004 | Lavi et al. |
| 2004/0073196 A1 | 4/2004 | Adams et al. |
| 2004/0082984 A1 | 4/2004 | Osorio et al. |
| 2004/0086884 A1 | 5/2004 | Beach et al. |
| 2004/0102412 A1 | 5/2004 | Broschat et al. |
| 2004/0106566 A1 | 6/2004 | Lin et al. |
| 2004/0112411 A1 | 6/2004 | Boykin et al. |
| 2004/0152112 A1 | 8/2004 | Croce et al. |
| 2004/0171037 A1 | 9/2004 | Li et al. |
| 2004/0171983 A1 | 9/2004 | Sparks et al. |
| 2004/0175732 A1 | 9/2004 | Rana |
| 2004/0210951 A1 | 10/2004 | Baulcombe et al. |
| 2004/0215162 A1 | 10/2004 | Putz |
| 2004/0221337 A1 | 11/2004 | Baulcombe et al. |
| 2004/0229266 A1 | 11/2004 | Tuschl et al. |
| 2004/0253604 A1 | 12/2004 | Lin et al. |
| 2004/0259247 A1 | 12/2004 | Tuschl et al. |
| 2004/0259248 A1 | 12/2004 | Tuschl et al. |
| 2004/0268441 A1 | 12/2004 | Vance et al. |
| 2005/0004219 A1 | 1/2005 | Hildebrand et al. |
| 2005/0026278 A1 | 2/2005 | Tuschl et al. |

(56) References Cited

U.S. PATENT DOCUMENTS

| | | |
|---|---|---|
| 2005/0037988 A1 | 2/2005 | Zamore et al. |
| 2005/0038371 A1 | 2/2005 | Reich et al. |
| 2005/0059005 A1 | 3/2005 | Tuschl et al. |
| 2005/0059011 A1 | 3/2005 | Sin et al. |
| 2005/0070458 A1 | 3/2005 | John |
| 2005/0074788 A1 | 4/2005 | Dahlberg et al. |
| 2005/0075492 A1 | 4/2005 | Chen et al. |
| 2005/0079614 A1 | 4/2005 | Reinhart et al. |
| 2005/0137578 A1 | 6/2005 | Heruth et al. |
| 2005/0163775 A1 | 7/2005 | Chan et al. |
| 2005/0209332 A1 | 9/2005 | Kuppuswamy et al. |
| 2005/0228315 A1 | 10/2005 | Ayad |
| 2005/0245906 A1 | 11/2005 | Makower et al. |
| 2006/0004317 A1 | 1/2006 | Mauge et al. |
| 2006/0067933 A1 | 3/2006 | Gross et al. |
| 2006/0073146 A1 | 4/2006 | Ashkenazi et al. |
| 2006/0079834 A1 | 4/2006 | Tennican et al. |
| 2006/0084055 A1 | 4/2006 | Gaiger et al. |
| 2006/0122677 A1 | 6/2006 | Vardiman |
| 2006/0160889 A1 | 7/2006 | Veeneman et al. |
| 2006/0286093 A1 | 12/2006 | Gross et al. |
| 2007/0073228 A1 | 3/2007 | Mernoe et al. |
| 2007/0078438 A1 | 4/2007 | Okada |
| 2007/0083063 A1 | 4/2007 | Nelson et al. |
| 2007/0086979 A1 | 4/2007 | Chevrier et al. |
| 2007/0123758 A1 | 5/2007 | Miesel et al. |
| 2007/0185017 A1 | 8/2007 | Aggarwal et al. |
| 2007/0197957 A1 | 8/2007 | Hunter et al. |
| 2007/0255237 A1 | 11/2007 | Lobl et al. |
| 2007/0260375 A1 | 11/2007 | Hilton |
| 2008/0027346 A1 | 1/2008 | Litt et al. |
| 2008/0039774 A1 | 2/2008 | Zawacki et al. |
| 2008/0058476 A1 | 3/2008 | Whiteker et al. |
| 2008/0132980 A1 | 6/2008 | Gerber |
| 2008/0147006 A1 | 6/2008 | Brunnberg et al. |
| 2008/0262374 A1 | 10/2008 | Gerber et al. |
| 2009/0030480 A1 | 1/2009 | Durand et al. |
| 2009/0069267 A1 | 3/2009 | Abrams et al. |
| 2009/0069742 A1 | 3/2009 | Larsen |
| 2009/0112327 A1 | 4/2009 | Lane et al. |
| 2009/0131850 A1 | 5/2009 | Geiger |
| 2009/0131857 A1* | 5/2009 | Geiger ................. A61K 31/145 424/94.1 |
| 2009/0137944 A1 | 5/2009 | Haarala et al. |
| 2009/0203983 A1 | 8/2009 | Carlton et al. |
| 2009/0228066 A1 | 9/2009 | Hirata et al. |
| 2010/0036477 A1 | 2/2010 | Bronson et al. |
| 2010/0089167 A1 | 4/2010 | Trieu et al. |
| 2010/0145162 A1 | 6/2010 | Devauchelle et al. |
| 2010/0145176 A1 | 6/2010 | Himes |
| 2010/0158869 A1 | 6/2010 | Kaemmerer |
| 2010/0168532 A1 | 7/2010 | Waziri et al. |
| 2010/0210958 A1 | 8/2010 | Manwaring et al. |
| 2010/0241088 A1 | 9/2010 | Ranalletta et al. |
| 2010/0280335 A1 | 11/2010 | Carlson et al. |
| 2010/0286585 A1 | 11/2010 | Dimauro et al. |
| 2010/0305492 A1 | 12/2010 | Lad et al. |
| 2011/0009821 A1 | 1/2011 | Jespersen et al. |
| 2011/0009933 A1 | 1/2011 | Barker |
| 2011/0033463 A1 | 2/2011 | Thakker et al. |
| 2011/0066072 A1 | 3/2011 | Kawoos et al. |
| 2011/0092921 A1 | 4/2011 | Beling et al. |
| 2011/0172633 A1 | 7/2011 | Ali et al. |
| 2011/0201944 A1 | 8/2011 | Higgins et al. |
| 2011/0257596 A1 | 10/2011 | Gaudet |
| 2011/0264033 A1 | 10/2011 | Jensen et al. |
| 2011/0270095 A1 | 11/2011 | Bukhman |
| 2011/0270230 A1 | 11/2011 | Sage et al. |
| 2011/0275930 A1 | 11/2011 | Jho et al. |
| 2012/0015336 A1 | 1/2012 | Mach |
| 2012/0087869 A1 | 4/2012 | Thakker et al. |
| 2012/0245529 A1 | 9/2012 | Hummen et al. |
| 2012/0290225 A1 | 11/2012 | Julian et al. |
| 2012/0296271 A1 | 11/2012 | Yomtov et al. |
| 2012/0296404 A1 | 11/2012 | Carpentier et al. |
| 2012/0302959 A1 | 11/2012 | Fielder et al. |
| 2012/0310140 A1 | 12/2012 | Kramer et al. |
| 2013/0204229 A1 | 8/2013 | Olson et al. |
| 2013/0253266 A1 | 9/2013 | Dextradeur et al. |
| 2013/0267928 A1 | 10/2013 | Imran et al. |
| 2013/0324945 A1 | 12/2013 | Sabin |
| 2014/0012209 A1 | 1/2014 | Sansoucy |
| 2014/0074060 A1* | 3/2014 | Imran ..................... A61B 5/24 604/503 |
| 2014/0081347 A1 | 3/2014 | Nelson et al. |
| 2014/0148780 A1 | 5/2014 | Putz |
| 2014/0194825 A1 | 7/2014 | Nielsen et al. |
| 2014/0207074 A1 | 7/2014 | Nielsen |
| 2014/0236259 A1 | 8/2014 | Colantonio |
| 2014/0249410 A1 | 9/2014 | Uber, III et al. |
| 2014/0257168 A1 | 9/2014 | Gill |
| 2014/0276416 A1 | 9/2014 | Nelson et al. |
| 2015/0038901 A1 | 2/2015 | Lampropoulos et al. |
| 2015/0202373 A1 | 7/2015 | Creaturo |
| 2015/0209505 A1 | 7/2015 | Hanson et al. |
| 2015/0230724 A1 | 8/2015 | Waziri et al. |
| 2015/0238685 A1 | 8/2015 | Elias et al. |
| 2015/0297874 A1 | 10/2015 | East et al. |
| 2015/0306302 A1* | 10/2015 | Marsden ............ A61M 1/3661 604/95.04 |
| 2015/0367067 A1 | 12/2015 | Minaie et al. |
| 2016/0122282 A1 | 5/2016 | Kandula |
| 2016/0213312 A1 | 7/2016 | Singh et al. |
| 2016/0374901 A9 | 12/2016 | Rodriguez et al. |
| 2017/0007621 A1 | 1/2017 | Wotton et al. |
| 2017/0173267 A1 | 6/2017 | Ashmead et al. |
| 2017/0325685 A1* | 11/2017 | Shachar ............... A61B 5/4839 |
| 2017/0365101 A1 | 12/2017 | Samec et al. |
| 2018/0028746 A1 | 2/2018 | Abrams et al. |
| 2018/0028824 A1 | 2/2018 | Pivonka et al. |
| 2018/0104459 A1* | 4/2018 | Anand ................ A61M 39/223 |
| 2018/0107798 A1 | 4/2018 | Hu |
| 2018/0107998 A1 | 4/2018 | Pederson |
| 2018/0140810 A1 | 5/2018 | Cataltepe |
| 2018/0193562 A1 | 7/2018 | Gibson et al. |
| 2018/0263752 A1 | 9/2018 | Pinchuk et al. |
| 2019/0030322 A1 | 1/2019 | Schulte et al. |
| 2019/0082990 A1 | 3/2019 | Poltorak |
| 2019/0105019 A1 | 4/2019 | Pagoulatos et al. |
| 2019/0151239 A1 | 5/2019 | Abrams et al. |
| 2019/0167964 A1 | 6/2019 | Lewis et al. |
| 2019/0218334 A1 | 7/2019 | Delaney, Jr. et al. |
| 2019/0246989 A1 | 8/2019 | Genov et al. |
| 2019/0282802 A1 | 9/2019 | Malinowski |
| 2019/0321106 A1 | 10/2019 | Bergman et al. |
| 2019/0351209 A1 | 11/2019 | Butziger et al. |
| 2020/0061337 A1 | 2/2020 | Singh et al. |
| 2020/0069254 A1 | 3/2020 | Lange et al. |
| 2020/0086538 A1 | 3/2020 | Funaoka |
| 2020/0170542 A1 | 6/2020 | Waziri et al. |
| 2020/0338325 A1 | 10/2020 | Shachar et al. |
| 2020/0375492 A1 | 12/2020 | Govari |
| 2021/0077714 A1 | 3/2021 | Bodner |
| 2021/0100990 A1 | 4/2021 | Yoo et al. |
| 2021/0205623 A1 | 7/2021 | Peterson et al. |
| 2021/0252266 A1 | 8/2021 | Karl-Heinz |
| 2021/0260280 A1 | 8/2021 | Gordon et al. |
| 2021/0327029 A1 | 10/2021 | Chen et al. |
| 2021/0338992 A1 | 11/2021 | Bertrand |
| 2021/0386982 A1 | 12/2021 | Lad et al. |
| 2021/0397970 A1 | 12/2021 | Cherian et al. |
| 2022/0016338 A1 | 1/2022 | Abrams et al. |
| 2022/0016402 A1 | 1/2022 | Abrams et al. |
| 2022/0016404 A1 | 1/2022 | Abrams et al. |
| 2022/0022800 A1 | 1/2022 | Abrams et al. |
| 2022/0249190 A1 | 8/2022 | Kelly et al. |
| 2022/0331567 A1 | 10/2022 | Abrams |
| 2023/0148923 A1 | 5/2023 | Abrams et al. |
| 2023/0200707 A1 | 6/2023 | Abrams et al. |

(56) References Cited

U.S. PATENT DOCUMENTS

| | | |
|---|---|---|
| 2023/0277840 A1 | 9/2023 | Abrams et al. |
| 2024/0021313 A1 | 1/2024 | Alkaitis et al. |

FOREIGN PATENT DOCUMENTS

| | | |
|---|---|---|
| DE | 102013002763 A1 | 8/2014 |
| EP | 0904119 | 3/1999 |
| EP | 1281758 A2 | 2/2003 |
| EP | 1391219 A2 | 2/2004 |
| EP | 1391219 A3 | 5/2004 |
| EP | 1798243 A2 | 6/2007 |
| EP | 3028727 A1 | 6/2016 |
| EP | 0995460 | 4/2022 |
| JP | 2004533997 A | 11/2004 |
| JP | 2007309746 A | 11/2007 |
| KR | 102054445 B1 | 12/2019 |
| WO | 9406690 A1 | 3/1994 |
| WO | 9427587 A2 | 12/1994 |
| WO | 1996/033761 | 10/1996 |
| WO | 0040716 A2 | 7/2000 |
| WO | 0068378 A1 | 11/2000 |
| WO | 0160397 A1 | 8/2001 |
| WO | 0168836 A2 | 9/2001 |
| WO | 0175164 A2 | 10/2001 |
| WO | 0244321 A2 | 6/2002 |
| WO | 02066516 A2 | 8/2002 |
| WO | 02094185 A2 | 11/2002 |
| WO | 03013582 A1 | 2/2003 |
| WO | 03029459 A2 | 4/2003 |
| WO | 03062401 A2 | 7/2003 |
| WO | 03070884 A2 | 8/2003 |
| WO | 03070903 A2 | 8/2003 |
| WO | 03070918 A2 | 8/2003 |
| WO | 03072713 A2 | 9/2003 |
| WO | 03074566 A2 | 9/2003 |
| WO | 03074654 A2 | 9/2003 |
| WO | 2004009779 A2 | 1/2004 |
| WO | 2004031412 A2 | 4/2004 |
| WO | 2004039956 A2 | 5/2004 |
| WO | 2004057017 A2 | 7/2004 |
| WO | 2004066183 A2 | 8/2004 |
| WO | 2004072248 A2 | 8/2004 |
| WO | 2004111191 A2 | 12/2004 |
| WO | 2004112411 A1 | 12/2004 |
| WO | 2005000351 A2 | 1/2005 |
| WO | 2005012523 A1 | 2/2005 |
| WO | 2005017111 A2 | 2/2005 |
| WO | 2005019453 A2 | 3/2005 |
| WO | 2005023200 A2 | 3/2005 |
| WO | 2005023986 A2 | 3/2005 |
| WO | 2005033271 A2 | 4/2005 |
| WO | 2005035769 A2 | 4/2005 |
| WO | 2005041859 A2 | 5/2005 |
| WO | 2005042705 A2 | 5/2005 |
| WO | 2006068867 A1 | 6/2006 |
| WO | 2007019618 A1 | 2/2007 |
| WO | 2007070538 A2 | 6/2007 |
| WO | 2008112017 A2 | 9/2008 |
| WO | 2008115919 A2 | 9/2008 |
| WO | 2008/141321 | 11/2008 |
| WO | 2009014762 A1 | 1/2009 |
| WO | 2009024562 A1 | 2/2009 |
| WO | 2009151741 A1 | 12/2009 |
| WO | 2010056712 A1 | 5/2010 |
| WO | 2011097487 A2 | 8/2011 |
| WO | 2013004843 A1 | 1/2013 |
| WO | 2014064691 A2 | 5/2014 |
| WO | 2014159757 A2 | 10/2014 |
| WO | 2014188407 A1 | 11/2014 |
| WO | 2015001008 A1 | 1/2015 |
| WO | 2015197867 A1 | 12/2015 |
| WO | 2016140853 A1 | 9/2016 |
| WO | 2018/023041 | 2/2018 |
| WO | 2018038930 A1 | 3/2018 |
| WO | 2018153943 A1 | 8/2018 |
| WO | 2019084038 A1 | 5/2019 |
| WO | 2019136462 A1 | 7/2019 |
| WO | 2019211314 A1 | 11/2019 |
| WO | 2020160613 A1 | 8/2020 |
| WO | 2020248067 A1 | 12/2020 |
| WO | 2021150522 A1 | 7/2021 |
| WO | 2022015941 A1 | 1/2022 |
| WO | 2022020314 A1 | 1/2022 |

OTHER PUBLICATIONS

Written Opinion from PCT App. No. PCT/US2021/041766 dated May 30, 2022, 7 pages.

Leontariti et al., "Circulating miR-146a and miR-134 in predicting drug-resistant epilepsy in patients with focal impaired awareness seizures" May 2020 Epilepsia, 61(5):959-970.

Lubrizol Corporation, webinar, "Materials for Implantable Devices: Decoding Thermoplastic Polyurethanes" copyright 2022. Available on the world wide web at: lubrizol.com/Health/Medical/Resource-Hub/Webinars/Materials-for-Implantable-Devices-Decoding-Thermoplastic-Polyurethanes, 1 page.

Caudy et al., "Fragile X-related protein and VIG associate with the RNA interference machinery." Genes & development 16.19 (2002): 2491-2496.

Cawley et al., "Unbiased mapping of transcription factor binding sites along human chromosomes 21 and 22 points to widespread regulation of noncoding RNAs." Cell 116.4 (2004): 499-509.

Cerutti H., "RNA interference: traveling in the cell and gaining functions." Trends in Genetics 19.1 (2003): 39-46.

Chang et al., "MicroRNAs act sequentially and asymmetrically to control chemosensory laterality in the nematode." Nature 430.7001 (2004): 785-789.

Chang et al., "miR-122, a mammalian liver-specific microRNA, is processed from hor mRNA and maydownregulate the high affinity cationic amino acid transporter CAT-1." RNA biology 1.2 (2004): 106-113.

Chang et al., "Resistance of human hepatitis delta virus RNAs to dicer activity." Journal of virology 77.22 (2003): 11910-11917.

Chang P., "Encapsulation for somatic gene therapy." Annals of the New York Academy of Sciences 875.1 (1999): 146-158.

Chapman et al., "Viral RNA silencing suppressors inhibit the microRNA pathway at an intermediate step." Genes & development 18.10 (2004): 1179-1186.

Chapoval et al., "Anti-CD3 x anti-tumor F (ab') 2 bifunctional antibody activates and retargets tumor-infiltrating lymphocytes." Journal of immunology 155.3 (1995): 1296-1303.

Chattopadhyay et al., "Lack of impact of the loss of constitutive folate receptor a expression, achieved by RNA interference, on the activity of the new generation antifolate pemetrexed in HeLa cells." Clinical cancer research 10.23 (2004): 7986-7993.

Chen et al., "A bioinformatics based approach to discover small RNA genes in the *Escherichia coli* genome." Biosystems 65.2-3 (2002): 157-177.

Chen et al., "A simple framework for contrastive learning of visual representations." International conference on machine learning (2020): 1-11.

Chen et al., "Automatic sleep stage classification based on subthalamic local field potentials." IEEE Transactions on Neural Systems and Rehabilitation Engineering 27.2 (2019): 118-128.

Chen et al., "Improved baselines with momentum contrastive learning." arXiv preprint arXiv:2003.04297 (2020): 1-3.

Chen et al., "MicC, a second small-RNA regulator of Omp protein expression in *Escherichia coli*." Journal of bacteriology 186.20 (2004): 6689-6697.

Chen et al., "MicroRNAs as regulators of mammalian hematopoiesis." Seminars in immunology 17 (2005): 155-165.

Chen et al., "MicroRNAs modulate hematopoietic lineage differentiation." science 303.5654 (2004): 83-86.

Chen et al., "Selection and analysis of an optimized anti-VEGF antibody: crystal structure of an affinity-matured Fab in complex with antigen." Journal of molecular biology 293.4 (1999): 865-881.

(56) References Cited

OTHER PUBLICATIONS

Chen et al., "Viral virulence protein suppresses RNA silencing—mediated defense but upregulates the role of microRNA in host gene expression." The Plant Cell 16.5 (2004): 1302-1313.

Chen T., "Advancing Self-Supervised and Semi-Supervised Learning with SimCLR," Blog.research.google, Retrieved from the Internet: <URL: https://research.google/blog/advancing-self-supervised-and-semi-supervised-learning-with-simclr/> (2020): 1-8.

Chen X., "A microRNA as a translational repressor of APETALA2 in *Arabidopsis* flower development." Science 303.5666 (2004): 2022-2025.

Cheng et al., "Antisense inhibition of human miRNAs and indications for an involvement of miRNA in cell growth and apoptosis." Nucleic acids research 33.4 (2005): 1290-1297.

Cheng et al., "Stem cells: from epigenetics to microRNAs." Neuron 46.3 (2005): 363-367.

Chesnut et al., "The role of secondary brain injury in determining outcome from severe head injury." Journal of Trauma and Acute Care Surgery 34.2 (1993): 216-222.

Chiu et al., "Hodgkin lymphoma cells express TACI and BCMA receptors and generate survival and proliferation signals in response to BAFF and APRIL." Blood 109.2 (2007): 729-739.

Cios K., "Deep Neural Networks—A Brief History." in: Gaweda et al., Advances in Data Analysis with Computational Intelligence Methods, vol. 378 (2018): 183-200.

Clark et al., "How does B cell depletion therapy work, and how can it be improved." Annals of the rheumatic diseases 64.suppl 4 (2005): iv77-iv80.

Clarke et al., "Computer-assisted EEG diagnostic review for idiopathic generalized epilepsy." Epilepsy & Behavior 121 (2021): 1-18.

Cobb et al., "Tracing microRNA patterns in mice." Nature genetics 36.10 (2004): 1033-1034.

Coburn et al., "Potent and specific inhibition of human immunodeficiency virus type 1 replication by RNA interference." Journal of virology 76.18 (2002): 9225-9231.

Coenen et al., "What work-related exposures are associated with post-traumatic stress disorder? A systematic review with meta-analysis." BMJ open 11.8 (2021): 1-12.

Cogoni et al., "Post-transcriptional gene silencing across kingdoms." Current opinion in genetics & development 10.6 (2000): 638-643.

Cohen et al., "Neuronal overexpression of 'readthrough' acetylcholinesterase is associated with antisense-suppressible behavioral impairments." Molecular psychiatry 7.8 (2002): 874-885.

Cohen J., "Statistical Power Analysis for the Behavioral Sciences." (Cover page, title page, and table of contents), 2nd Edition (1988): 1-8.

Colciaghi et al., "Platelet APP, ADAM 10 and BACE alterations in the early stages of Alzheimer disease." Neurology 62.3 (2004): 498-501.

Cole et al., "Direct labeling of RNA with multiple biotins allows sensitive expression profiling of acute leukemia class predictor genes." Nucleic acids research 32.11 (2004): 1-9.

Collins et al., "Long subcutaneous tunnelling reduces infection rates in paediatric external ventricular drains." Child's Nervous System 30.10 (2014): 1671-1678.

Colsky et al., "FcR-Independent Antibody-Mediated Cellular Cytotoxicity." Journal of leukocyte biology 49.6 (1991): 548-555.

Conner et al., "Posttraumatic stress disorder and suicide in 5.9 million individuals receiving care in the veterans health administration health system." Journal of affective Disorders 166 (2014): 1-5.

Connolly et al., "Characterization of the relationship between intracranial pressure and electroencephalographic monitoring in burst-suppressed patients." Neurocritical care 22.2 (2015): 212-220.

Connor et al., "Fluoxetine in post-traumatic stress disorder: randomised, double-blind study." The British Journal of Psychiatry 175.1 (1999): 17-22.

Conrad C., "Chronic stress-induced hippocampal vulnerability: the glucocorticoid vulnerability hypothesis." Reviews in the Neurosciences 19.6 (2008): 395-412.

Conrad C., "What is the functional significance of chronic stress-induced CA3 dendritic retraction within the hippocampus." Behavioral and cognitive neuroscience reviews 5.1 (2006): 41-60.

Conway et al., "Chronic vagus nerve stimulation significantly improves quality of life in treatment-resistant major depression." The Journal of Clinical Psychiatry 79.5 (2018): 52-59.

Cook et al., "Anti-seizure therapy with a long-term, implanted intra-cerebroventricular delivery system for drug-resistant epilepsy: A first-in-man study." EClinicalMedicine 22 (2020): 1-9.

Cook et al., "Prediction of seizure likelihood with a long-term, implanted seizure advisory system in patients with drug-resistant epilepsy: a first-in-man study." The Lancet Neurology 12.6 (2013): 563-571.

Coquery et al., "Regulatory roles of the tumor necrosis factor receptor BCMA." Critical Review in Immunology 32.4 (2012): 287-305.

Coquery et al., "T follicular helper cells contribute to autoimmunity through the BCMA-BAFF axis (BA2P. 117)." The Journal of Immunology 192.Supplement_1 (2014): 45-4.

Courtney et al., "Links between traumatic brain injury and ballistic pressure waves originating in the thoracic cavity and extremities." Brain Injury 21.7 (2007): 657-662.

Courtois et al., "Clinical Practice Guideline for the Treatment of Posttraumatic Stress Disorder (PTSD) in Adults." adopted as APA Policy on Feb. 24, 2017, American Psychological Association, 139 pages.

Gaudilliere et al., "RNA interference reveals a requirement for myocyte enhancer factor 2A in activity-dependent neuronal survival." Journal of Biological Chemistry 277.48 (2002): 46442-46446.

Ge et al., "Inhibition of influenza virus production in virus-infected mice by RNA interference." Proceedings of the National Academy of Sciences 101.23 (2004): 8676-8681.

Gebauer et al., "Molecular mechanisms of translational control." Nature reviews Molecular cell biology 5.10 (2004): 827-835.

Gernert et al., "Bypassing the blood-brain barrier: direct intracranial drug delivery in epilepsies." Pharmaceutics 12.12 (2020): 1-39.

Gershon D., "Microarrays go mainstream." Nature Methods 1.3 (2004): 263-270.

Geuze et al., "Reduced GABAA benzodiazepine receptor binding in veterans with post-traumatic stress disorder." Molecular psychiatry 13.1 (2008): 74-83.

Ghosal et al., "Prefrontal cortex GABAergic deficits and circuit dysfunction in the pathophysiology and treatment of chronic stress and depression." Current opinion in behavioral sciences 14 (2017): 1-8.

Ghosh et al., "Functional connectivity from the amygdala to the hippocampus grows stronger after stress." Journal of Neuroscience 33.17 (2013): 7234-7244.

Gibbs W., "The unseen genome: beyond DNA." Scientific American 289.6 (2003): 106-113.

Gibbs W., "The unseen genome: gems among the junk." Scientific American 289.5 (2003): 46-53.

Giordano et al., "RNAi triggered by symmetrically transcribed transgenes in *Drosophila melanogaster*." Genetics 160.2 (2002): 637-648.

Giraldez et al., "MicroRNAs regulate brain morphogenesis in zebrafish." Science 308.5723 (2005): 833-838.

Gitlin et al., "Poliovirus escape from RNA interference: short interfering RNA-target recognition and implications for therapeutic approaches." Journal of virology 79.2 (2005): 1027-1035.

Golden et al., "Short Integuments1/Suspensor1/Carpel Factory, a Dicer homolog, is a maternal effect gene required for embryo development in Arabidopsis." Plant Physiology 130.2 (2002): 808-822.

Gooch et al., "Recognition of Duplex RNA by Helix-Threading Peptides." Journal of the American Chemical Society 126.34 (2004): 10603-10610.

Gottesman S., "Stealth regulation: biological circuits with small RNA switches." Genes & development 16.22 (2002): 2829-2842.

(56) References Cited

OTHER PUBLICATIONS

Grad et al., "Computational and experimental identification of C. elegans microRNAs." Molecular cell 11.5 (2003): 1253-1263.
Gradus et al., "Associations between stress disorders and cardiovascular disease events in the Danish population." BMJ open 5.12 (2015): 1-7.
Gradus et al., "Posttraumatic stress disorder and completed suicide." American journal of epidemiology 171.6 (2010): 721-727.
Gradus J., "Prevalence and prognosis of stress disorders: a review of the epidemiologic literature." Clinical epidemiology (2017): 251-260.
Gras et al., "BCMAp: an integral membrane protein in the Golgi apparatus of human mature B lymphocytes." International immunology 7.7 (1995): 1093-1106.
Gregory et al., "MicroRNA biogenesis and cancer." Cancer research 65.9 (2005): 3509-3512.
Gregory et al., "The Microprocessor complex mediates the genesis of microRNAs." Nature 432.7014 (2004): 235-240.
Grey et al., "Cognitive restructuring within reliving: A treatment for peritraumatic emotional "hotspots" in posttraumatic stress disorder." Behavioural and cognitive psychotherapy 30.1 (2002): 37-56.
Griffiths-Jones S., "The microRNA registry." Nucleic acids research 32 (2004): D109-D111.
Grisaru et al., "Structural roles of acetylcholinesterase variants in biology and pathology." European Journal of Biochemistry 264.3 (1999): 672-686.
Grishok et al., "Genes and mechanisms related to RNA interference regulate expression of the small temporal RNAs that control C. elegans developmental timing." Cell 106.1 (2001): 23-34.
Grosshans et al., "Micro-RNAs: small is plentiful." The Journal of cell biology 156.1 (2002): 17-22.
Großhans et al., "The temporal patterning microRNA let-7 regulates several transcription factors at the larval to adult transition in C. elegans." Developmental cell 8.3 (2005): 321-330.
Guarguaglini et al., "The forkhead-associated domain protein Cep170 interacts with Polo-like kinase 1 and serves as a marker for mature centrioles." Molecular biology of the cell 16.3 (2005): 1095-1107.
Gupta et al., "Directly labeled mRNA produces highly precise and unbiased differential gene expression data." Nucleic acids research 31.4 (2003): 1-6.
Gustafson et al., "ASRP: the *Arabidopsis* small RNA project database." Nucleic acids research 33 (2005): D637-D640.
Hake S., "MicroRNAs: a role in plant development." Current Biology 13.21 (2003): R851-R852.
Hall J., "Unravelling the general properties of siRNAs: strength in numbers and lessons from the past." Nature Reviews Genetics 5.7 (2004): 552-557.
Hamann et al., "Amygdala activity related to enhanced memory for pleasant and aversive stimuli." Nature neuroscience 2.3 (1999): 289-293.
Hamilton et al., "Two classes of short interfering RNA in RNA silencing." The EMBO journal 21.17 (2002): 4671-4679.
Hammond et al., "An RNA-directed nuclease mediates post-transcriptional gene silencing in *Drosophila* cells." Nature 404.6775 (2000): 293-296.
Hammond et al., "Argonaute2, a link between genetic and biochemical analyses of RNAi." Science 293.5532 (2001): 1146-1150.
Han et al., "Relationship between small antisense RNAs and aberrant RNAs associated with sense transgene mediated gene silencing in tomato." The Plant Journal 29.4 (2002): 509-519.
Han et al., "The *Arabidopsis* double-stranded RNA-binding protein HYL1 plays a role in microRNA-mediated gene regulation." Proceedings of the National Academy of Sciences 101.4 (2004): 1093-1098.
Han et al., "The Drosha-DGCR8 complex in primary microRNA processing." Genes & development 18.24 (2004): 3016-3027.
Hannon G., "RNA interference." nature 418.6894 (2002): 244-251.
Hansen et al., "Global effects on gene expression in fission yeast by silencing and RNA interference machineries." Molecular and cellular biology 25.2 (2005): 590-601.
Hardy J., "Toward Alzheimer therapies based on genetic knowledge." Annu. Rev. Med. 55.1 (2004): 15-25.
Harlow et al., "Using Antibodies: A Laboratory Manual." Cold Spring Harbor Laboratory (1998) 1-3.
Harrell E., "Neuromarketing: What you need to know." Harvard Business Review 97.4 (2019): 64-70.
Harris et al., "Effects of benzodiazepine microinjection into the amygdala or periaqueductal gray on the expression of conditioned fear and hypoalgesia in rats." Behavioral neuroscience 109.2 (1995): 295-304.
Hartig et al., "Sequence-specific detection of MicroRNAs by signal-amplifying ribozymes." Journal of the American Chemical Society 126.3 (2004): 722-723.
Hatzoglou et al., "TNF receptor family member BCMA (B cell maturation) associates with TNF receptor-associated factor (TRAF) 1, TRAF2, and TRAF3 and activates NF-κB, elk-1, c-Jun N-terminal kinase, and p38 mitogen-activated protein kinase." The Journal of Immunology 165.3 (2000): 1322-1330.
Hayase T., "Putative epigenetic involvement of the endocannabinoid system in anxiety-and depression-related behaviors caused by nicotine as a stressor." PLoS One 11.7 (2016): 1-21.
Sugiyama et al., "RNA-dependent RNA polymerase is an essential component of a self-enforcing loop coupling heterochromatin assembly to siRNA production." Proceedings of the National Academy of Sciences 102.1 (2005): 152-157.
Suh et al., "Human embryonic stem cells express a unique set of microRNAs." Developmental biology 270.2 (2004): 488-498.
Sumimoto et al., "Gene therapy for human small-cell lung carcinoma by inactivation of Skp-2 with virally mediated RNA interference." Gene therapy 12.1 (2005): 95-100.
Sun et al., "Development of a micro-array to detect human and mouse microRNAs and characterization of expression in human organs." Nucleic acids research 32.22 (2004): e188-e188.
Sunkar et al., "Novel and stress-regulated microRNAs and other small RNAs from *Arabidopsis*." The Plant Cell 16.8 (2004): 2001-2019.
Sussman et al., "Neuroanatomical features in soldiers with post-traumatic stress disorder." BMC neuroscience 17.1 (2016): 1-11.
Suzuma et al., "Identification and characterization of novel small RNAs in the aspS-yrvM intergenic region of the Bacillus subtilis genome." Microbiology 148.8 (2002): 2591-2598.
Svennerholm et al., "Alzheimer disease—effect of continuous intracerebroventricular treatment with GM1 ganglioside and a systematic activation programme." Dementia and geriatric cognitive disorders 14.3 (2002): 128-136.
Swagerman et al., "The Computerized Neurocognitive Battery: Validation, aging effects, and heritability across cognitive domains." Neuropsychology 30.1 (2016): 53-64.
Sygnus® Implantable Connector System, Balseal.com, Retrieved from the Internet: <URL: https://www.balseal.com/contact/sygnus/> (2024): 1-13.
Szymanski et al., "Noncoding RNA transcripts." Journal of applied genetics 44.1 (2003): 1-20.
Tabara et al., "The dsRNA binding protein RDE-4 interacts with RDE-1, DCR-1, and a DExH-box helicase to direct RNAi in C. elegans." Cell 109.7 (2002): 861-871.
Tabara et al., "The rde-1 gene, RNA interference, and transposon silencing in C. elegans." Cell 99.2 (1999): 123-132.
Takamizawa et al., "Reduced expression of the let-7 microRNAs in human lung cancers in association with shortened postoperative survival." Cancer research 64.11 (2004): 3753-3756.
Tan et al., "RNAi, a new therapeutic strategy against viral infection." Cell research 14.6 (2004): 460-466.
Tang et al., "A biochemical framework for RNA silencing in plants." Genes & development 17.1 (2003): 49-63.
Tang, G. "siRNA and miRNA: an insight into RISCs." Trends in biochemical sciences 30.2 (2005): 106-114.
Tanno et al., "Silencing of endogenous IGFBP-5 by micro RNA interference affects proliferation, apoptosis and differentiation of neuroblastoma cells." Cell Death & Differentiation 12.3 (2005): 213-223.

(56) References Cited

OTHER PUBLICATIONS

Tanzer et al., "Evolution of microRNAs located within Hox gene clusters." Journal of Experimental Zoology Part B: Molecular and Developmental Evolution 304.1 (2005): 75-85.
Tanzer et al., "Molecular evolution of a microRNA cluster." Journal of molecular biology 339.2 (2004): 327-335.
Taylor et al., "The potential of RNA interference as a tool in the management of viral hepatitis." Journal of hepatology 42.1 (2005): 139-144.
Teixeira et al., "Multiple numerical chromosome aberrations in cancer: what are their causes and what are their consequences." Seminars in cancer biology. vol. 15. No. 1. Academic Press (2005): 3-12.
Teixeira et al., "Processing bodies require RNA for assembly and contain nontranslating mRNAs." Rna 11.4 (2005): 371-382.
Thiagarajan, T. "EEG and FMRI Papers by the Numbers," Sapien Labs, Retrieved from the Internet: <URL: https://sapienlabs.org/lab-talk/500000-human-neuroscience-papers/> (2016): 1-7.
Thomas et al., "Size constraints for targeting post-transcriptional gene silencing and for RNA-directed methylation in Nicotiana benthamiana using a potato virus X vector." The Plant Journal 25.4 (2001): 417-425.
Thomson et al., "A custom microarray platform for analysis of microRNA gene expression." Nature methods 1.1 (2004): 47-53.
Thurman et al., "Traumatic brain injury in the United States: a public health perspective." The Journal of head trauma rehabilitation 14.6 (1999): 602-615.
Tijsterman et al., "Dicers at RISC: the mechanism of RNAi." Cell 117.1 (2004): 1-3.
Tomari et al., "A protein sensor for siRNA asymmetry." Science 306.5700 (2004): 1377-1380.
Tomari et al., "MicroRNA biogenesis: drosha can't cut it without a partner." Current Biology 15.2 (2005): R61-R64.
Tomari et al., "Perspective: machines for RNAi." Genes & development 19.5 (2005): 517-529.
Tops et al., "RDE-2 interacts with MUT-7 to mediate RNA interference in Caenorhabditis elegans." Nucleic acids research 33.1 (2005): 347-355.
Trainor, P. "Developmental Biology Is "Cruzing"." Developmental Cell 7.4 (2004): 481-486.
Trivedi et al., "The Inventory of Depressive Symptomatology, Clinician Rating (IDS-C) and Self-Report (IDS-SR), and the Quick Inventory of Depressive Symptomatology, Clinician Rating (QIDS-C) and Self-Report (QIDS-SR) in public sector patients with mood disorders: a psychometric evaluation." Psychological medicine 34.1 (2004): 73-82.
Trousselard et al., "Is plasma GABA level a biomarker of post-traumatic stress disorder (PTSD) severity? A preliminary study." Psychiatry research 241 (2016): 273-279.
Tucker et al., "Efficacy and safety of topiramate monotherapy in civilian posttraumatic stress disorder: a randomized, double-blind, placebo-controlled study." Journal of Clinical Psychiatry 68.2 (2007): 201-206.
Turner et al., "Review of recent methodological developments in group-randomized trials: part 1—design." American journal of public health 107.6 (2017): 907-915.
Turner et al., "Review of recent methodological developments in group-randomized trials: part 2—analysis." American journal of public health 107.7 (2017): 1078-1086.
Tuschl et al., "Targeted mRNA degradation by double-stranded RNA in vitro." Genes & development 13.24 (1999): 3191-3197.
Tuschl T., "RNA sets the standard." Nature 421.6920 (2003): 220-221.
U.S. Appl. No. 17/380,415, filed Jul. 20, 2021, 71 pages.
U.S. Appl. No. 17/380,694, filed Jul. 20, 2021, 37 pages.
U.S. Appl. No. 17/868,321, filed Jul. 19, 2022, 24 pages.
U.S. Appl. No. 63/052,284, filed Jul. 15, 2020, 67 pages.
U.S. Appl. No. 63/053,864, filed Jul. 20, 2020, 39 pages.
U.S. Appl. No. 63/054,522, filed Jul. 21, 2020, 24 pages.
U.S. Appl. No. 63/166,705, filed Mar. 26, 2021, 21 pages.
U.S. Appl. No. 63/172,313, filed Apr. 8, 2021, 28 pages.
U.S. Appl. No. 63/223,629, filed Jul. 20, 2021, 26 pages.
U.S. Appl. No. 63/280,367, filed Nov. 17, 2021, 54 pages.
Boutet et al., "*Arabidopsis* HEN1: a genetic link between endogenous miRNA controlling development and siRNA controlling transgene silencing and virus resistance." Current Biology 13.10 (2003): 843-848.
Boutla et al., "Developmental defects by antisense-mediated inactivation of micro-RNAs 2 and 13 in *Drosophila* and the identification of putative target genes." Nucleic acids research 31.17 (2003): 4973-4980.
Boutla et al., "Induction of RNA interference in Caenorhabditis elegans by RNAs derived from plants exhibiting post-transcriptional gene silencing." Nucleic Acids Research 30.7 (2002): 1688-1694.
Bowman J., "Class III HD-Zip gene regulation, the golden fleece of ARGONAUTE activity." Bioessays 26.9 (2004): 938-942.
Bracht et al., "Trans-splicing and polyadenylation of let-7 microRNA primary transcripts." Rna 10.10 (2004): 1586-1594.
Bradley et al., "A multidimensional meta-analysis of psychotherapy for PTSD." American journal of Psychiatry 162.2 (2005): 214-227.
Brady et al., "Comorbidity of psychiatric disorders and post-traumatic stress disorder." Journal of clinical psychiatry 61 (2000): 22-32.
Brady et al., "Efficacy and safety of sertraline treatment of post-traumatic stress disorder: a randomized controlled trial." Jama 283.14 (2000): 1837-1844.
Brady et al., "Valproate treatment of comorbid panic disorder and affective disorders in two alcoholic patients." Journal of clinical psychopharmacology 14.1 (1994): 81-82.
Brandenberger et al., "Transcriptome characterization elucidates signaling networks that control human ES cell growth and differentiation." Nature biotechnology 22.6 (2004): 707-716.
Brantl S., "Antisense-RNA regulation and RNA interference." Biochimica et Biophysica Acta (BBA)-Gene Structure and Expression 1575.1-3 (2002): 15-25.
Brehm et al., "Parameters for establishing humanized mouse models to study human immunity: analysis of human hematopoietic stem cell engraftment in three immunodeficient strains of mice bearing the IL2rγnull mutation." Clinical immunology 135.1 (2010): 84-98.
Bremner et al., "Chronic PTSD in Vietnam combat veterans: course of illness and substance abuse." The American journal of psychiatry 153.3 (1996): 369-375.
Bremner et al., "Decreased benzodiazepine receptor binding in prefrontal cortex in combat-related posttraumatic stress disorder." American Journal of Psychiatry 157.7 (2000): 1120-1126.
Bremner et al., "MRI and PET study of deficits in hippocampal structure and function in women with childhood sexual abuse and posttraumatic stress disorder." American journal of psychiatry 160.5 (2003): 924-932.
Bremner et al., "Neural correlates of declarative memory for emotionally valenced words in women with posttraumatic stress disorder related to early childhood sexual abuse." Biological psychiatry 53.10 (2003): 879-889.
Bremner et al., "Positron emission tomographic imaging of neural correlates of a fear acquisition and extinction paradigm in women with childhood sexual-abuse-related post-traumatic stress disorder." Psychological medicine 35.6 (2005): 791-806.
Bremner J., "Alterations in brain structure and function associated with post-traumatic stress disorder." Seminars in clinical neuropsychiatry 4.4 (1999):249-255.
Bremner J., "Neuroimaging in posttraumatic stress disorder and other stress-related disorders." Neuroimaging Clinics of North America 17.4 (2007): 523-538.
Brennecke et al., "bantam encodes a developmentally regulated microRNA that controls cell proliferation and regulates the proapoptotic gene hid in *Drosophila*." Cell 113.1 (2003): 25-36.
Brennecke et al., "Principles of microRNA-target recognition." PLoS biology 3.3 (2005): 1-15.
Brenner et al., "Gene expression analysis by massively parallel signature sequencing (MPSS) on microbead arrays." Nature biotechnology 18.6 (2000): 630-634.

(56) References Cited

OTHER PUBLICATIONS

Brezinsky et al., "A simple method for enriching populations of transfected CHO cells for cells of higher specific productivity." Journal of immunological methods 277.1-2 (2003): 141-155.
Bridge et al., "Induction of an interferon response by RNAi vectors in mammalian cells." Nature genetics 34.3 (2003): 263-264.
Brill et al., "Chronic valproic acid treatment triggers increased neuropeptide y expression and signaling in rat nucleus reticularis thalami." Journal of Neuroscience 26.25 (2006): 6813-6822.
Brooks et al., "Long-term survival after traumatic brain injury part II: Life expectancy." Archives of physical medicine and rehabilitation 96.6 (2015): 1000-1005.
Brown et al., "A computational view of microRNAs and their targets." Drug Discovery Today 10.8 (2005): 595-601.
Brown et al., "Neural systems for cognitive and emotional processing in posttraumatic stress disorder." Frontiers in psychology 3 (2012): 1-14.
Brown et al., "The stepped wedge trial design: a systematic review." BMC medical research methodology 6.1 (2006): 1-9.
Bryant R., "Post-traumatic stress disorder: a state-of-the-art review of evidence and challenges." World psychiatry 18.3 (2019): 259-269.
Bucherelli et al., "Aversive memory reactivation engages in the amygdala only some neurotransmitters involved in consolidation." Learning & Memory 13.4 (2006): 426-430.
Buck et al., "Design strategies and performance of custom DNA sequencing primers." Biotechniques 27.3 (1999): 528-536.
Cai et al., "Human microRNAs are processed from capped, polyadenylated transcripts that can also function as mRNAs." Rna 10.12 (2004): 1957-1966.
Cai et al., "Kaposi's sarcoma-associated herpesvirus expresses an array of viral microRNAs in latently infected cells." Proceedings of the National Academy of Sciences 102.15 (2005): 5570-5575.
Calin et al., "Frequent deletions and down-regulation of micro-RNA genes miR15 and miR 16 at 13q14 in chronic lymphocytic leukemia." Proceedings of the national academy of sciences 99.24 (2002): 15524-15529.
Calin et al., "Human microRNA genes are frequently located at fragile sites and genomic regions involved in cancers." Proceedings of the National Academy of Sciences 101.9 (2004): 2999-3004.
Calin et al., "MicroRNA profiling reveals distinct signatures in B cell chronic lymphocytic leukemias." Proceedings of the National Academy of Sciences 101.32 (2004): 11755-11760.
Cao et al., "Role of the DRM and CMT3 methyltransferases in RNA-directed DNA methylation." Current biology 13.24 (2003): 2212-2217.
Carbothane® 134 HG—Product Data Sheet, Carboline.com, Retrieved from the Internet: <URL:https://msds.carboline.com/servlet/FeedFile/1/prod/0859/PDS%3A%7BPC%3A0859%3BMID%3A1%3BLID%3A1%7D/Carbothane_134_HG_PDS.pdf> (2023): 1-4.
Carmell et al., "Germline transmission of RNAi in mice." Nature structural biology 10.2 (2003): 91-92.
Carmell et al., "RNase III enzymes and the initiation of gene silencing." Nature structural & molecular biology 11.3 (2004): 214-218.
Carmell et al., "The Argonaute family: tentacles that reach into RNAi, developmental control, stem cell maintenance, and tumorigenesis." Genes & development 16.21 (2002): 2733-2742.
Carmichael G., "Antisense starts making more sense." Nature biotechnology 21.4 (2003): 371-372.
Carrington et al., "Role of microRNAs in plant and animal development." Science 301.5631 (2003): 336-338.
Carter et al., "A computational approach to identify genes for functional RNAs in genomic sequences." Nucleic acids research 29.19 (2001): 3928-3938.
Carthew R., "Making and breaking with nucleases and small RNAs." Nature Structural & Molecular Biology 10.10 (2003): 776-777.

Casaca-Carreira et al., "Transependymal cerebrospinal fluid flow: opportunity for drug delivery." Molecular neurobiology 55.4 (2018): 2780-2788.
Casset et al., "A peptide mimetic of an anti-CD4 monoclonal antibody by rational design." Biochemical and biophysical research communications 307.1 (2003): 198-205.
Catalanotto et al., "Involvement of small RNAs and role of the qde genes in the gene silencing pathway in Neurospora." Genes & development 16.7 (2002): 790-795.
Caudy et al., "A micrococcal nuclease homologue in RNAi effector complexes." Nature 425.6956 (2003): 411-414.
McHale et al., "MicroRNA-directed cleavage of Nicotiana sylvestris PHAVOLUTA mRNA regulates the vascular cambium and structure of apical meristems." The Plant Cell 16.7 (2004): 1730-1740.
McManus et al., "Gene silencing using micro-RNA designed hairpins." Rna 8.6 (2002): 842-850.
McManus, M. "MicroRNAs and cancer." Seminars in cancer biology. vol. 13. No. 4. Academic Press (2003): 253-258.
Mehta et al., "EEG abnormalities in children with speech and language impairment." Journal of Clinical and Diagnostic Research: JCDR 9.7 (2015): CC04-CC07.
Meister et al., "Human Argonaute2 mediates RNA cleavage targeted by miRNAs and siRNAs." Molecular cell 15.2 (2004): 185-197.
Meister et al., "Mechanisms of gene silencing by double-stranded RNA." Nature 431.7006 (2004): 343-349.
Meister et al., "Sequence-specific inhibition of microRNA-and siRNA-induced RNA silencing." Rna 10.3 (2004): 544-550.
Merkle et al., "Biological significance of a human enterovirus B-specific RNA element in the 3' nontranslated region." Journal of virology 76.19 (2002): 9900-9909.
Meshorer et al., "Alternative splicing and neuritic mRNA translocation under long-term neuronal hypersensitivity." Science 295.5554 (2002): 508-512.
Mette et al., "Transcriptional silencing and promoter methylation triggered by double-stranded RNA." The EMBO journal (2000): 5194-5201.
Metzler et al., "High expression of precursor microRNA-155/BIC RNA in children with Burkitt lymphoma." Genes, Chromosomes and Cancer 39.2 (2004): 167-169.
Meyerhoff et al., "Cortical gamma-aminobutyric acid and glutamate in posttraumatic stress disorder and their relationships to self-reported sleep quality." Sleep 37.5 (2014): 893-900.
Michael et al., "Reduced accumulation of specific microRNAs in colorectal neoplasia." Molecular cancer research 1.12 (2003): 882-891.
Milligan et al., "Turnover of primary transcripts is a major step in the regulation of mouse H19 gene expression." EMBO reports (2002): 774-779.
Miska et al., "Microarray analysis of microRNA expression in the developing mammalian brain." Genome biology 5.9 (2004): 1-13.
Mithoefer et al., "Durability of improvement in post-traumatic stress disorder symptoms and absence of harmful effects or drug dependency after 3, 4-methylenedioxymethamphetamine-assisted psychotherapy: a prospective long-term follow-up study." Journal of psychopharmacology 27.1 (2013): 28-39.
Mithoefer et al., "The safety and efficacy of±3, 4-methylenedioxymethamphetamine-assisted psychotherapy in subjects with chronic, treatment-resistant posttraumatic stress disorder: the first randomized controlled pilot study." Journal of psychopharmacology 25.4 (2011): 439-452.
Mlotshwa et al., "RNA silencing and the mobile silencing signal." The Plant Cell 14.suppl_1 (2002): S289-S301.
Mochizuki et al., "Analysis of a piwi-related gene implicates small RNAs in genome rearrangement in Tetrahymena." Cell 110.6 (2002): 689-699.
Modarres et al., "Strong correlation of novel sleep electroencephalography coherence markers with diagnosis and severity of post-traumatic stress disorder." Scientific reports 9.1 (2019): 1-10.
Mollinari et al., "Ablation of PRC1 by small interfering RNA demonstrates that cytokinetic abscission requires a central spindle bundle in mammalian cells, whereas completion of furrowing does not." Molecular biology of the cell 16.3 (2005): 1043-1055.

(56) References Cited

OTHER PUBLICATIONS

Moore et al., "Psychometric properties of the penn computerized neurocognitive battery." Neuropsychology 29.2 (2015): 235-246.
Morel et al., "Fertile hypomorphic ARGONAUTE (ago1) mutants impaired in post-transcriptional gene silencing and virus resistance." The Plant Cell 14.3 (2002): 629-639.
Morey et al., "Amygdala volume changes in posttraumatic stress disorder in a large case-controlled veterans group." Archives of general psychiatry 69.11 (2012): 1169-1178.
Morris et al., "Small interfering RNA-induced transcriptional gene silencing in human cells." Science 305.5688 (2004): 1289-1292.
Moss et al., "Conservation of the heterochronic regulator Lin-28, its developmental expression and microRNA complementary sites." Developmental biology 258.2 (2003): 432-442.
Moss et al., "The cold shock domain protein LIN-28 controls developmental timing in C. elegans and is regulated by the lin-4 RNA." Cell 88.5 (1997): 637-646.
Moss, E. "MicroRNAs: hidden in the genome." Current Biology 12.4 (2002): R138-R140.
Moss, E. "RNA interference: it's a small RNA world." Current Biology 11.19 (2001): R772-R775.
Mourelatos et al., "miRNPs: a novel class of ribonucleoproteins containing numerous microRNAs." Genes & development 16.6 (2002): 720-728.
Mourrain et al., "*Arabidopsis* SGS2 and SGS3 genes are required for posttranscriptional gene silencing and natural virus resistance." Cell 101.5 (2000): 533-542.
Muller et al., "The GAD65 knock out mouse-a model for GABAergic processes in fear-and stress-induced psychopathology." Genes, Brain and Behavior 14.1 (2015): 37-45.
Murchison et al., "miRNAs on the move: miRNA biogenesis and the RNAi machinery." Current opinion in cell biology 16.3 (2004): 223-229.
Nagy et al., "Anti-anxiety action op diazepam after intraamygdaloid application in the rat." Neuropharmacology 18.6 (1979): 573-576.
Nakahara et al., "Expanding roles for miRNAs and siRNAs in cell regulation." Current opinion in cell biology 16.2 (2004): 127-133.
Neilson et al., "Herpesviruses throw a curve ball: new insights into microRNA biogenesis and evolution." Nature Methods 2.4 (2005): 252-254.
Nelson et al., "Microarray-based, high-throughput gene expression profiling of microRNAs." Nature methods 1.2 (2004): 155-161.
Nelson et al., "miRNP: mRNA association in polyribosomes in a human neuronal cell line." Rna 10.3 (2004): 387-394.
Nelson et al., "The microRNA world: small is mighty." Trends in biochemical sciences 28.10 (2003): 534-540.
Neugebauer, R. "Reliability of seizure diaries in adult epileptic patients." Neuroepidemiology 8.5 (1989): 228-233.
Ngo et al., "Double-stranded RNA induces mRNA degradation in Trypanosoma brucei." Proceedings of the National Academy of Sciences 95.25 (1998): 14687-14692.
Nicholson et al., "Molecular characterization of a mouse cDNA encoding Dicer, a ribonuclease III ortholog involved in RNA interference." Mammalian Genome 13.2 (2002): 67-73.
Nijholt et al., "Stress-induced alternative splicing of acetylcholinesterase results in enhanced fear memory and long-term potentiation." Molecular psychiatry 9.2 (2004): 174-183.
Nikitin et al., "Protein synthesis inhibitor administration before a reminder caused recovery from amnesia induced by memory reconsolidation impairment with NMDA glutamate receptor antagonist." Brain Research Bulletin 171 (2021): 44-55.
Nilsson et al., "Enhanced detection and distinction of RNA by enzymatic probe ligation." Nature biotechnology 18.7 (2000): 791-793.
Nilsson et al., "Making ends meet in genetic analysis using padlock probes." Human mutation 19.4 (2002): 410-415.
Nishitsuji et al., "Expression of small hairpin RNA by lentivirus-based vector confers efficient and stable gene-suppression of HIV-1 on human cells including primary non-dividing cells." Microbes and infection 6.1 (2004): 76-85.
Noguchi et al., "Regulation of gene expression by sodium valproate in epithelial-to-mesenchymal transition." Lung 193.5 (2015): 691-700.
Novak et al., "Expression of BCMA, TACI, and BAFF-R in multiple myeloma: a mechanism for growth and survival." Blood 103.2 (2004): 689-694.
Novak et al., "Expression of BLyS and its receptors in B-cell non-Hodgkin lymphoma: correlation with disease activity and patient outcome." Blood 104.8 (2004): 2247-2253.
U.S. Appl. No. 63/294,611, filed Dec. 29, 2021, 38 pages.
U.S. Appl. No. 63/310,288, filed Feb. 15, 2022, 55 pages.
Uchida et al., "A novel role of the mammalian GSPT/eRF3 associating with poly (A)-binding protein in Cap/Poly (A)-dependent translation." Journal of Biological Chemistry 277.52 (2002): 50286-50292.
Ullman et al., "Psychosocial correlates of PTSD symptom severity in sexual assault survivors." Journal of traumatic stress 20.5 (2007): 821-831.
Vaiva et al., "Low posttrauma GABA plasma levels as a predictive factor in the development of acute posttraumatic stress disorder." Biological psychiatry 55.3 (2004): 250-254.
Vajdos et al., "Comprehensive functional maps of the antigen-binding site of an anti-ErbB2 antibody obtained with shotgun scanning mutagenesis." Journal of molecular biology 320.2 (2002): 415-428.
Valoczi et al., "Sensitive and specific detection of microRNAs by northern blot analysis using LNA-modified oligonucleotide probes." Nucleic acids research 32.22 (2004): e175-e175.
Van Hilten et al., "Intrathecal baclofen for the treatment of dystonia in patients with reflex sympathetic dystrophy." New England Journal of Medicine 343.9 (2000): 625-630.
Vance et al., "RNA silencing in plants—defense and counterdefense." science 292.5525 (2001): 2277-2280.
Varker et al., "Efficacy of psychoactive drugs for the treatment of posttraumatic stress disorder: a systematic review of MDMA, ketamine, LSD and psilocybin." Journal of Psychoactive Drugs 53.1 (2021): 85-95.
Vaucheret et al., "Post-transcriptional gene silencing in plants." Journal of cell science 114.17 (2001): 3083-3091.
Vaucheret et al., "The action of ARGONAUTE1 in the miRNA pathway and its regulation by the miRNA pathway are crucial for plant development." Genes & development 18.10 (2004): 1187-1197.
Vaucheret et al., "Transcriptional gene silencing in plants: targets, inducers and regulators." TRENDS in Genetics 17.1 (2001): 29-35.
Vella et al., "Architecture of a validated microRNA: target interaction." Chemistry & biology 11.12 (2004): 1619-1623.
Vella et al., "The C. elegans microRNA let-7 binds to imperfect let-7 complementary sites from the lin-41 3' UTR." Genes & development 18.2 (2004): 132-137.
Verbitsky et al., "Rodent models of post-traumatic stress disorder: behavioral assessment." Translational psychiatry 10.1 (2020): 1-28.
Verma et al., "Modified oligonucleotides: synthesis and strategy for users." Annual review of biochemistry 67.1 (1998): 99-134.
Vermeulen et al., "The contributions of dsRNA structure to Dicer specificity and efficiency." Rna 11.5 (2005): 674-682.
Villareal et al., "Efficacy of quetiapine monotherapy in post-traumatic stress disorder: a randomized, placebo-controlled trial." American Journal of Psychiatry 173.12 (2016): 1205-1212.
Villareal et al., "Reduced hippocampal volume and total white matter volume in posttraumatic stress disorder." Biological psychiatry 52.2 (2002): 119-125.
Voinnet et al., "A viral movement protein prevents spread of the gene silencing signal in Nicotiana benthamiana." Cell 103.1 (2000): 157-167.
Voinnet, O. "Induction and suppression of RNA silencing: insights from viral infections." Nature Reviews Genetics 6.3 (2005): 206-220.
Voinnet, O. "RNA silencing: small RNAs as ubiquitous regulators of gene expression." Current opinion in plant biology 5.5 (2002): 444-451.

(56) References Cited

OTHER PUBLICATIONS

Volpe et al., "Regulation of heterochromatic silencing and histone H3 lysine-9 methylation by RNAi." Science 297.5588 (2002): 1833-1837.
Vuillemenot et al., "Nonclinical evaluation of CNS-administered TPP1 enzyme replacement in canine CLN2 neuronal ceroid lipofuscinosis." Molecular genetics and metabolism 114.2 (2015): 281-293.
Walters et al., "RNAi-induced down-regulation of FLT3 expression in AML cell lines increases sensitivity to MLN518." Blood 105.7 (2005): 2952-2954.
Walters J., "The relationship between post traumatic stress disorder (PTSD) symptoms and career outcomes of army enlisted servicemembers." The Pardee RAND Graduate School (2014): 1-189.
Wang et al., "An attempt to identify reproducible high-density EEG markers of PTSD during sleep." Sleep 43.1 (2020): 1-12.
Wang et al., "Identification of 20 microRNAs from *Oryza sativa*." Nucleic Acids Research 32.5 (2004): 1688-1695.
Wang et al., "Inter-channel phase differences during sleep spindles are altered in Veterans with PTSD." NeuroImage: Clinical 28 (2020): 102390.
Wang et al., "Prediction and identification of *Arabidopsis thaliana* microRNAs and their mRNA targets." Genome biology 5.9 (2004): 1-15.
Wang et al., "Tumor necrosis factor a-dependent drug resistance to purine and pyrimidine analogues in human colon tumor cells mediated through IKK." Journal of Biological Chemistry 280.9 (2005): 7634-7644.
Wang et al., "Viral discovery and sequence recovery using DNA microarrays." PLoS biology 1.2 (2003): 257-260.
Watanabe et al., "Stage-specific expression of microRNAs during Xenopus development." FEBS letters 579.2 (2005): 318-324.
Waterhouse et al., "Virus resistance and gene silencing in plants can be induced by simultaneous expression of sense and antisense RNA." Proceedings of the National Academy of Sciences 95.23 (1998): 13959-13964.
Weathers et al., "The Clinician-Administered PTSD Scale for DSM-5 (CAPS-5): Development and initial psychometric evaluation in military veterans." Psychological assessment 30.3 (2018): 383-395.
Weber et al., "Quorum-sensing-based toolbox for regulatable transgene and siRNA expression in mammalian cells." Biotechnology progress 21.1 (2005): 178-185.
Weber, M. "New human and mouse microRNA genes found by homology search." The FEBS journal 272.1 (2005): 59-73.
Wei et al., "TTK/hMps1 participates in the regulation of DNA damage checkpoint response by phosphorylating CHK2 on threonine 68." Journal of Biological Chemistry 280.9 (2005): 7748-7757.
Wen et al., "Deep convolution neural network and autoencoders-based unsupervised feature learning of EEG signals." IEEE Access 6 (2018): 25399-25410.
Wesemann et al., "Clinical accuracy and safety using the SynchroMed II intrathecal drug infusion pump." Regional Anesthesia & Pain Medicine 39.4 (2014): 341-346.
Wesley et al., "Construct design for efficient, effective and high-throughput gene silencing in plants." The Plant Journal 27.6 (2001): 581-590.
Westhof et al., "From RNAi to epigenomes: how RNA rules the world." Chembiochem 6.2 (2005): 441-443.
White et al., "Antibody-targeted immunotherapy for treatment of malignancy." Annual review of medicine 52.1 (2001): 125-145.
Wideman et al., "Involvement of classical neurotransmitter systems in memory reconsolidation: Focus on destabilization." Neurobiology of learning and memory 156 (2018): 68-79.
Wienholds et al., "The microRNA-producing enzyme Dicer1 is essential for zebrafish development." Nature genetics 35.3 (2003): 217-218.
Wightman et al., "Posttranscriptional regulation of the heterochronic gene lin-14 by lin-4 mediates temporal pattern formation in C. elegans." Cell 75.5 (1993): 855-862.
Wilson et al., "RNA interference blocks gene expression and RNA synthesis from hepatitis C replicons propagated in human liver cells." Proceedings of the National Academy of Sciences 100.5 (2003): 2783-2788.
Winkler et al., "Control of gene expression by a natural metabolite-responsive ribozyme." Nature 428.6980 (2004): 281-286.
Wiznerowicz et al., "Conditional suppression of cellular genes: lentivirus vector-mediated drug-inducible RNA interference." Journal of virology 77.16 (2003): 8957-8961.
International Search Report and Written Opinion in PCT/US2022/054049, mailed Apr. 12, 2023, 14 pages.
International Search Report and Written Opinion in PCT/US2023/021974, mailed Nov. 24, 2023, 14 pages.
International Search Report and Written Opinion in PCT/US2023/036432, mailed Feb. 28, 2024, 12 pages.
Irani et al., "Production of scFv antibody fragments from a hybridoma with functional activity against human vascular endothelial growth factor." Hybridoma 28.3 (2009): 205-209.
Irving et al., "Top Tips for Overcoming Section 103 Obviousness Rejections." (2018): 1-25.
Isaacson et al., "Local and diffuse synaptic actions of GABA in the hippocampus." Neuron 10.2 (1993): 165-175.
Ishizuka et al., "A *Drosophila* fragile X protein interacts with components of RNAi and ribosomal proteins." Genes & development 16.19 (2002): 2497-2508.
Isken et al., "Complex signals in the genomic 3' nontranslated region of bovine viral diarrhea virus coordinate translation and replication of the viral RNA." Rna 10.10 (2004): 1637-1652.
Isoardi et al., "Increased fear learning coincides with neuronal dysinhibition and facilitated LTP in the basolateral amygdala following benzodiazepine withdrawal in rats." Neuropsychopharmacology 29.10 (2004): 1852-1864.
Itaya et al., "Potato spindle tuber viroid as inducer of RNA silencing in infected tomato." Molecular plant-microbe interactions 14.11 (2001): 1332-1334.
Ivanova et al., "Cost of post-traumatic stress disorder vs major depressive disorder among patients covered by medicaid or private insurance." The American journal of managed care 17.8 (2011): e314-23.
Iyadurai et al., "Intrusive memories of trauma: A target for research bridging cognitive science and its clinical application." Clinical psychology review 69 (2019): 67-82.
Iyer et al., "Evolutionary connection between the catalytic subunits of DNA-dependent RNA polymerases and eukaryotic RNA-dependent RNA polymerases and the origin of RNA polymerases." BMC structural biology 3.1 (2003): 1-23.
Jabri E., "RISCy business." Nature structural & molecular biology 11.4 (2004): 300-300.
Jack T., "Molecular and genetic mechanisms of floral control." The Plant Cell 16 (2004): S1-S17.
Jackson et al., "Expression profiling reveals off-target gene regulation by RNAi." Nature biotechnology 21.6 (2003): 635-637.
Jackson et al., "Noise amidst the silence: off-target effects of siRNAs." Trends in Genetics 20.11 (2004): 521-524.
Jacob et al., "Post-traumatic stress symptoms are associated with physical multimorbidity: Findings from the Adult Psychiatric Morbidity Survey 2007." Journal of Affective Disorders 232 (2018): 385-392.
Jacque et al., "Modulation of HIV-1 replication by RNA interference." Nature 418.6896 (2002): 435-438.
Jaronczyk et al., "Exploring the functions of RNA interference pathway proteins: some functions are more RISCy than others." Biochemical Journal 387.3 (2005): 561-571.
Ji et al., "A graph theoretical approach for predicting common RNA secondary structure motifs including pseudoknots in unaligned sequences." Bioinformatics 20.10 (2004): 1591-1602.
Jiang et al., "Selective silencing of viral gene expression in HPV-positive human cervical carcinoma cells treated with siRNA, a primer of RNA interference." Oncogene 21.39 (2002): 6041-6048.

(56) References Cited

OTHER PUBLICATIONS

Jimenez et al., "Contextual fear memory retrieval by correlated ensembles of ventral CA1 neurons." Nature communications 11.1 (2020): 3492.
Jin et al., "Biochemical and genetic interaction between the fragile X mental retardation protein and the microRNA pathway." Nature neuroscience 7.2 (2004): 113-117.
Jin et al., "Enhancer-dependent splicing of FGFR1 a-exon is repressed by RNA interference-mediated down-regulation of SRp55." Cancer research 64.24 (2004): 8901-8905.
Jin et al., "RNA and microRNAs in fragile X mental retardation." Nature cell biology 6.11 (2004): 1048-1053.
Jing et al., "Involvement of microRNA in AU-rich element-mediated mRNA instability." Cell 120.5 (2005): 623-634.
Jobst et al., "Intracranial EEG in the 21st century." Epilepsy currents 20.4 (2020): 180-188.
Johannessen C., "Mechanisms of action of valproate: a commentatory." Neurochemistry international 37.2-3 (2000): 103-110.
John et al., "Human microRNA targets." PLoS biology 2.11 (2004): 1-18.
Johnsen et al., "Consistent impaired verbal memory in PTSD: a meta-analysis." Journal of affective disorders 111.1 (2008): 74-82.
Johnson et al., "Kabat database and its applications: 30 years after the first variability plot." Nucleic acids research 28.1 (2000): 214-218.
Johnson et al., "RAS is regulated by the let-7 microRNA family." Cell 120.5 (2005): 635-647.
Johnson et al., "The time of appearance of the C. elegans let-7 microRNA is transcriptionally controlled utilizing a temporal regulatory element in its promoter." Developmental biology 259.2 (2003): 364-379.
Johnston Jr. et al., "A microRNA controlling left/right neuronal asymmetry in Caenorhabditis elegans." Nature 426.6968 (2003): 845-849.
Jones et al., "siRNA for gene silencing: a route to drug target discovery." Current opinion in pharmacology 4.5 (2004): 522-527.
Jones L., "Revealing micro-RNAs in plants." Trends in plant science 7.11 (2002): 473-475.
Jones-Rhoades et al., "Computational identification of plant microRNAs and their targets, including a stress-induced miRNA." Molecular cell 14.6 (2004): 787-799.
Joseph et al., "Validation of miRNA microarray data using MICROMAX ASAP miRNA chemical labeling kit by Northern blot analysis." PerkinElmer Life and Analytical Sciences (2004).
Ju et al., "Correlation of expression levels of BLyS and its receptors with multiple myeloma." Clinical biochemistry 42.4-5 (2009): 387-399.
Juarez et al., "microRNA-mediated repression of rolled leaf1 specifies maize leaf polarity." Nature 428.6978 (2004): 84-88.
Kadotani et al., "One of the two Dicer-like proteins in the filamentous fungi *Magnaporthe oryzae* genome is responsible for hairpin RNA-triggered RNA silencing and related small interfering RNA accumulation." Journal of Biological Chemistry 279.43 (2004): 44467-44474.
Kalled et al., "BAFF: B cell survival factor and emerging therapeutic target for autoimmune disorders." Expert Opinion on Therapeutic Targets 7.1 (2003): 115-123.
Kalled et al., "The biochemistry and biology of BAFF, APRIL and their receptors." Curr Dir Autoimmun 8 (2004): 206-242.
Kamath et al., "Systematic functional analysis of the Caenorhabditis elegans genome using RNAi." Nature 421.6920 (2003): 231-237.
Kan et al., "New tool for an old problem: can RNAi efficiently resolve the issue of genetic redundancy." Bioessays 27.1 (2005): 14-16.
Kanatsu-Shinohara et al., "Generation of pluripotent stem cells from neonatal mouse testis." Cell 119.7 (2004): 1001-1012.
Kanellopoulou et al., "Dicer-deficient mouse embryonic stem cells are defective in differentiation and centromeric silencing." Genes & development 19.4 (2005): 489-501.

Kang et al., "Induction of DMBT1 expression by reduced ERK activity during a gastric mucosa differentiation-like process and its association with human gastric cancer." Carcinogenesis 26.6 (2005): 1129-1137.
Kao et al., "BACE1 suppression by RNA interference in primary cortical neurons." Journal of Biological Chemistry 279.3 (2004): 1942-1949.
Lagos-Quintana et al., "Identification of novel genes coding for small expressed RNAs." Science 294.5543 (2001): 853-858.
Lagos-Quintana et al., "Identification of tissue-specific microRNAs from mouse." Current biology 12.9 (2002): 735-739.
Lagos-Quintana et al., "New microRNAs from mouse and human." Rna 9.2 (2003): 175-179.
Lai et al., "Complementary miRNA pairs suggest a regulatory role for miRNA: miRNA duplexes." Rna 10.2 (2004): 171-175.
Lai et al., "Computational identification of *Drosophila* microRNA genes." Genome biology 4.7 (2003): 1-20.
Lai et al., "Pervasive regulation of *Drosophila* Notch target genes by GY-box-, Brd-box-, and K-box-class microRNAs." Genes & development 19.9 (2005): 1067-1080.
Lai, E. "Micro RNAs are complementary to 3' UTR sequence motifs that mediate negative post-transcriptional regulation." Nature genetics 30.4 (2002): 363-364.
Lambert et al., "Measurement of antipsychotic-induced side effects: Support for the validity of a self-report (LUNSERS) versus structured interview (UKU) approach to measurement." Human Psychopharmacology: Clinical and Experimental 18.5 (2003): 405-411.
Lamminmaki et al., "Crystal structure of a recombinant anti-estradiol Fab fragment in complex with 17ß-estradiol." Journal of Biological Chemistry 276.39 (2001): 36687-36694.
Lamontagne et al., "Molecular requirements for duplex recognition and cleavage by eukaryotic RNase III: discovery of an RNA-dependent DNA cleavage activity of yeast Rnt1p." Journal of molecular biology 338.2 (2004): 401-418.
Landthaler et al., "The human DiGeorge syndrome critical region gene 8 and Its *D. melanogaster* homolog are required for miRNA biogenesis." Current biology 14.23 (2004): 2162-2167.
Lantto et al., "Functional consequences of insertions and deletions in the complementarity-determining regions of human antibodies." Journal of Biological Chemistry 277.47 (2002): 45108-45114.
Latchoumycandane et al., "Protein kinase Cd is a key downstream mediator of manganese-induced apoptosis in dopaminergic neuronal cells." The Journal of pharmacology and experimental therapeutics 313.1 (2005): 46-55.
Lau et al., "An abundant class of tiny RNAs with probable regulatory roles in Caenorhabditis elegans." Science 294.5543 (2001): 858-862.
Lau et al., "Censors of the genome." Scientific American 289.2 (2003): 34-41.
Laufs et al., "MicroRNA regulation of the CUC genes is required for boundary size control in *Arabidopsis meristems*." (2004): 4311-4322.
Laxminarayan et al., "Alterations in sleep electroencephalography synchrony in combat-exposed veterans with post-traumatic stress disorder." Sleep 43.7 (2020): 1-11.
Lecellier et al., "A cellular microRNA mediates antiviral defense in human cells." Science 308.5721 (2005): 557-560.
Ledoux, J. "The emotional brain, fear, and the amygdala." Cellular and molecular neurobiology 23.4 (2003): 727-738.
Lee et al., "An extensive class of small RNAs in Caenorhabditis elegans." science 294.5543 (2001): 862-864.
Lee et al., "Depletion of human micro-RNA miR-125b reveals that it is critical for the proliferation of differentiated cells but not for the down-regulation of putative targets during differentiation." Journal of Biological Chemistry 280.17 (2005): 16635-16641.
Lee et al., "Distinct roles for *Drosophila* Dicer-1 and Dicer-2 in the siRNA/miRNA silencing pathways." Cell 117.1 (2004): 69-81.
Lee et al., "Expression of small interfering RNAs targeted against HIV-1 rev transcripts in human cells." Nature biotechnology 20.5 (2002): 500-505.
Lee et al., "Independent cellular processes for hippocampal memory consolidation and reconsolidation." Science 304.5672 (2004): 839-843.

(56) References Cited

OTHER PUBLICATIONS

Lee et al., "MicroRNA genes are transcribed by RNA polymerase II." The EMBO journal 23.20 (2004): 4051-4060.
Lee et al., "MicroRNA maturation: stepwise processing and subcellular localization." The EMBO journal (2002): 4663-4670.
Lee et al., "Occupational post-traumatic stress disorder: an updated systematic review." BMC public health 20.1 (2020): 1-12.
Lee et al., "The C. elegans heterochronic gene lin-4 encodes small RNAs with antisense complementarity to lin-14." cell 75.5 (1993): 843-854.
Lee et al., "The nuclear RNase III Drosha initiates microRNA processing." Nature 425.6956 (2003): 415-419.
Legendre et al., "Profile-based detection of microRNA precursors in animal genomes." Bioinformatics 21.7 (2005): 841-845.
Leonard et al., "Computational design of antiviral RNA interference strategies that resist human immunodeficiency virus escape." Journal of Virology 79.3 (2005): 1645-1654.
Lesuis et al., "Glucocorticoids promote fear generalization by increasing the size of a dentate gyrus engram cell population." Biological psychiatry 90.7 (2021): 494-504.
Levanon et al., "Systematic identification of abundant A-to-I editing sites in the human transcriptome." Nature biotechnology 22.8 (2004): 1001-1005.
Lewis et al., "Conserved seed pairing, often flanked by adenosines, indicates that thousands of human genes are microRNA targets." cell 120.1 (2005): 15-20.
Lewis et al., "Prediction of mammalian microRNA targets." Cell 115.7 (2003): 787-798.
Lewis et al., "Psychological therapies for post-traumatic stress disorder in adults: Systematic review and meta-analysis." European journal of psychotraumatology 11.1 (2020): 1729633.
Li et al., "Computational identification of novel family members of microRNA genes in *Arabidopsis thaliana* and *Oryza sativa*." Acta biochimica et biophysica Sinica 37.2 (2005): 75-87.
Li et al., "EEG based emotion identification using unsupervised deep feature learning." (2015): 1-2.
Li et al., "Induction and suppression of RNA silencing by an animal virus." Science 296.5571 (2002): 1319-1321.
Li et al., "Specific inhibition of HIV-1 replication by short hairpin RNAs targeting human cyclin T1 without inducing apoptosis." FEBS letters 579.14 (2005): 3100-3106.
Liang et al., "A small yeast RNA inhibits HCV IRES mediated translation and inhibits replication of poliovirus in vivo." World Journal of Gastroenterology: WJG 9.5 (2003): 1008-1013.
Liang et al., "An oligonucleotide microarray for microRNA expression analysis based on labeling RNA with quantum dot and nanogold probe." Nucleic acids research 33.2 (2005): 1-8.
Liang et al., "Inhibitor RNA blocks the protein translation mediated by hepatitis C virus internal ribosome entry site in vivo." World Journal of Gastroenterology 10.5 (2004): 664-667.
Liao et al., "Biomembrane-permeable and ribonuclease-resistant siRNA with enhanced activity." Oligonucleotides 15.3 (2005): 196-205.
Lim et al., "Microarray analysis shows that some microRNAs downregulate large numbers of target mRNAs." Nature 433.7027 (2005): 769-773.
Lim et al., "The microRNAs of Caenorhabditis elegans." Genes & development 17.8 (2003): 991-1008.
Lim et al., "Vertebrate microRNA genes." Science 299.5612 (2003): 1540-1540.
Lin et al., "The C. elegans hunchback homolog, hbl-1, controls temporal patterning and is a probable microRNA target." Developmental cell 4.5 (2003): 639-650.
Lindley et al., "A randomized, double-blind, placebo-controlled trial of augmentation topiramate for chronic combat- related post-traumatic stress disorder." Journal of clinical psychopharmacology 27.6 (2007): 677-681.
Lingjaerde O., "The UKU side effect rating scale: a new comprehensive rating scale for psychotropic drugs and a cross-sectional study of side effects in neuroleptic-treated patients," Acta Psychiatrica Scandinavica 334.76 (1987): 1-95.
Ehret M., "Treatment of posttraumatic stress disorder: Focus on pharmacotherapy." Mental Health Clinician 9.6 (2019): 373-382.
Eichenbaum et al., "The hippocampus—what does it do." Behavioral and neural biology 57.1 (1992): 2-36.
Eichenbaum H., "The hippocampus and declarative memory: cognitive mechanisms and neural codes." Behavioural brain research 127.1-2 (2001): 199-207.
Einav et al., "shRNA-mediated RNA interference as a tool for genetic synthetic lethality screening in mouse embryo fibroblasts." FEBS letters 579.1 (2005): 199-202.
Eis et al., "Accumulation of miR-155 and BIC RNA in human B cell lymphomas." Proceedings of the National Academy of Sciences 102.10 (2005): 3627-3632.
Elbashir et al., "Analysis of gene function in somatic mammalian cells using small interfering RNAs." Methods 26.2 (2002): 199-213.
Elbashir et al., "Duplexes of 21-nucleotide RNAs mediate RNA interference in cultured mammalian cells." nature 411.6836 (2001): 494-498.
Elbashir et al., "Functional anatomy of siRNAs for mediating efficient RNAi in *Drosophila melanogaster* embryo lysate." The EMBO journal 20.23 (2001): 6877-6888.
Elbashir et al., "RNA interference is mediated by 21-and 22-nucleotide RNAs." Genes & development 15.2 (2001): 188-200.
Elmen et al., "Locked nucleic acid (LNA) mediated improvements in siRNA stability and functionality." Nucleic acids research 33.1 (2005): 439-447.
Emrick et al., "Different simultaneous sleep states in the hippocampus and neocortex." Sleep 39.12 (2016): 2201-2209.
Engdahl et al., "A two unit antisense RNA cassette test system for silencing of target genes." Nucleic acids research 25.16 (1997): 3218-3227.
Engstrom et al., "Promoter bashing, microRNAs, and Knox genes. New insights, regulators, and targets-of-regulation in the establishment of lateral organ polarity in *Arabidopsis*." Plant Physiology 135.2 (2004): 685-694.
Enright et al., "MicroRNA targets in *Drosophila*." Genome Biology 5.1 (2003): 1-27.
Epilepsy for Parents and Caregivers, Epilepsy.com, Retrieved from the Internet: < URL: https://www.epilepsy.com/living-epilepsy/epilepsy-and/professional-health-care-providers/about-epilepsy-seizures/idiopathic-4> (2024): 1-9.
Eriksdotter-Jonhagen et al., "Encapsulated cell biodelivery of nerve growth factor to the basal forebrain in patients with Alzheimer's disease." Dementia and geriatric cognitive disorders 33.1 (2012): 18-28.
Esau et al., "MicroRNA-143 regulates adipocyte differentiation." Journal of Biological Chemistry 279.50 (2004): 52361-52365.
Eshed et al., "MicroRNAs guide asymmetric DNA modifications guiding asymmetric organs." Developmental Cell 7.5 (2004): 629-630.
Esquela-Kerscher et al., "The age of high-throughput microRNA profiling." Nature Methods 1.2 (2004): 106-107.
Etkin et al., "Functional neuroimaging of anxiety: a meta-analysis of emotional processing in PTSD, social anxiety disorder, and specific phobia." American journal of Psychiatry 164.10 (2007): 1476-1488.
European Search Report for EP05774516.8, mailed Nov. 27, 2008, 5 pages.
European Search Report for EP16153513.3, mailed Jan. 17, 2020, 7 pages.
Fagard et al., "AGO1, QDE-2, and RDE-1 are related proteins required for post-transcriptional gene silencing in plants, quelling in fungi, and RNA interference in animals." Proceedings of the National Academy of Sciences 97.21 (2000): 11650-11654.
Famulok M., "Chemical biology: green fluorescent RNA." Nature 430 (2004): 976-977.
Fan et al., "RNA interference against a glioma-derived allele of EGFR induces blockade at G2M." Oncogene 24.5 (2005): 829-837.
Feder et al., "A randomized controlled trial of repeated ketamine administration for chronic posttraumatic stress disorder," American Journal of Psychiatry 178.2 (2021): 193-202.

(56) References Cited

OTHER PUBLICATIONS

Feder et al., "Efficacy of intravenous ketamine for treatment of chronic posttraumatic stress disorder: a randomized clinical trial." JAMA psychiatry 71.6 (2014): 681-688.
Fenoy et al., "Risks of common complications in deep brain stimulation surgery: management and avoidance." Journal of neurosurgery 120.1 (2014): 132-139.
Ferry et al., "The economic burden of PTSD in Northern Ireland." Journal of traumatic stress 28.3 (2015): 191-197.
Fesler F., "Valproate in combat-related posttraumatic stress disorder." The Journal of Clinical Psychiatry 52.9 (1991): 361-364.
Findley et al., "Maelstrom, a Drosophila spindle-class gene, encodes a protein that colocalizes with Vasa and RDE1/AGO1 homolog, Aubergine, in nuage." Development 130.5 (2003): 859-871.
Finnegan et al., "The small RNA world." Journal of cell science 116.23 (2003): 4689-4693.
Fire A., "RNA-triggered gene silencing." Trends in Genetics 15.9 (1999): 358-363.
Fire et al., "Potent and specific genetic interference by double-stranded RNA in Caenorhabditis elegans." nature 391.6669 (1998): 806-811.
Fisher et al., "Seizure diaries for clinical research and practice: limitations and future prospects." Epilepsy & Behavior 24.3 (2012): 304-310.
Fleischhack et al., "Pharmacokinetics following intraventricular administration of chemotherapy in patients with neoplastic meningitis." Clinical pharmacokinetics 44.1 (2005): 1-31.
Floriano-Sanchez et al., "Differential gene expression profile induced by valproic acid (VPA) in pediatric epileptic patients." Genes 9.7 (2018): 1-15.
Floyd et al., "Ancient microRNA target sequences in plants." Nature 428.6982 (2004): 485-486.
Foa et al., "Prolonged Exposure Therapy for PTSD: Emotional Processing of Traumatic Experiences," Therapist Guide, 2nd ed., Copyright page (2019) 1-2.
Forbes et al., "A guide to guidelines for the treatment of PTSD and related conditions." Journal of traumatic stress 23.5 (2010): 537-552.
Foreman et al., "Quantitative EEG for the detection of brain ischemia." Critical care 16.2 (2012): 1-9.
Forman-Hoffman et al., "Psychological and Pharmacological Treatments for Adults With Posttraumatic Stress Disorder: A Systematic Review Update." Agency for Healthcare Research and Quality (2018): 1-4.
Fortier et al., "Temperature-dependent gene silencing by an expressed inverted repeat in Drosophila." genesis 26.4 (2000): 240-244.
Fowler et al., "Intrathecal drug delivery in the era of nanomedicine." Advanced drug delivery reviews 165 (2020): 77-95.
Friedman et al., "Considering future pharmacotherapy for PTSD." Neuroscience letters 649 (2017): 181-185.
Friedrich et al., "RNA molecules as anti-cancer agents." Seminars in cancer biology 14.4 (2004): 223-230.
Froeyen et al., "RNA as a target for drug design, the example of Tat-TAR interaction." Current topics in medicinal chemistry 2.10 (2002): 1123-1145.
Gallinaro et al., "Structural Study of the 5' End of a Synthetic Premessenger RNA from Adenovirus: Evidence for a Long-range Exon-Intron Interaction." Journal of molecular biology 240.3 (1994): 205-225.
Galyam et al., "Complex host cell responses to antisense suppression of ACHE gene expression." Antisense and Nucleic Acid Drug Development 11.1 (2001): 51-57.
Garfinkel et al., "Impaired contextual modulation of memories in PTSD: an fMRI and psychophysiological study of extinction retention and fear renewal." Journal of Neuroscience 34.40 (2014): 13435-13443.
Baldino et al., "Sodium valproate enhancement of gamma-aminobutyric acid (GABA) inhibition: electrophysiological evidence for anticonvulsant activity." The Journal of Pharmacology and Experimental Therapeutics 217.2 (1981): 445-450.

Ball et al., "Signal quality of simultaneously recorded invasive and non-invasive EEG." Neuroimage 46.3 (2009): 708-716.
Ballantyne et al., "Comparative efficacy of epidural, subarachnoid, and intracerebroventricular opioids in patients with pain due to cancer (Cochrane Review)." Journal of the American College of Surgeons 200.6 (2005): 1-4.
Bandelow et al., "Biological markers for anxiety disorders, OCD and PTSD: A consensus statement. Part II: Neurochemistry, neurophysiology and neurocognition." The World Journal of Biological Psychiatry 18.3 (2017): 162-214.
Baner et al., "Parallel gene analysis with allele-specific padlock probes and tag microarrays." Nucleic Acids Research 31.17 (2003): e103-e103.
Banerjee et al., "Control of developmental timing by small temporal RNAs: a paradigm for RNA-mediated regulation of gene expression." Bioessays 24.2 (2002): 119-129.
Baniasadi et al., "Effect of pregabalin augmentation in treatment of patients with combat-related chronic posttraumatic stress disorder: a randomized controlled trial." Journal of Psychiatric Practice® 20.6 (2014): 419-427.
Bantounas et al., "RNA interference and the use of small interfering RNA to study gene function in mammalian systems." Journal of molecular endocrinology 33.3 (2004): 545-557.
Bao et al., "MicroRNA binding sites in Arabidopsis class III HD-ZIP mRNAs are required for methylation of the template chromosome." Developmental cell 7.5 (2004): 653-662.
Barad et al., "MicroRNA expression detected by oligonucleotide microarrays: system establishment and expression profiling in human tissues." Genome research 14.12 (2004): 2486-2494.
Barcia et al., "Anticonvulsant and neurotoxic effects of intracerebroventricular injection of phenytoin, phenobarbital and carbamazepine in an amygdala-kindling model of epilepsy in the rat." Epilepsy research 33.2-3 (1999): 159-167.
Barcia et al., "Intraventricular and intracerebral delivery of anti-epileptic drugs in the kindling model." Neurotherapeutics 6.2 (2009): 337-343.
Barrick et al., "New RNA motifs suggest an expanded scope for riboswitches in bacterial genetic control." Proceedings of the National Academy of Sciences 101.17 (2004): 6421-6426.
Bartel D., "MicroRNAs: genomics, biogenesis, mechanism, and function." cell 116.2 (2004): 281-297.
Bartel et al., "Micromanagers of gene expression: the potentially widespread influence of metazoan microRNAs." Nature reviews genetics 5.5 (2004): 396-400.
Bartel et al., "MicroRNAs: at the root of plant development." Plant physiology 132.2 (2003): 709-717.
Bashirullah et al., "Coordinate regulation of small temporal RNAs at the onset of Drosophila metamorphosis." Developmental biology 259.1 (2003): 1-8.
Baskerville et al., "Microarray profiling of microRNAs reveals frequent coexpression with neighboring miRNAs and host genes." Rna 11.3 (2005): 241-247.
Basyuk et al., "Human let-7 stem-loop precursors harbor features of RNase III cleavage products." Nucleic acids research 31.22 (2003): 6593-6597.
Baulcombe D., "An RNA microcosm." Science 297.5589 (2002): 2002-2003.
Baulcombe D., "RNA silencing in plants." Nature 431.7006 (2004): 356-363.
Beclin et al., "A branched pathway for transgene-induced RNA silencing in plants." Current Biology 12.8 (2002): 684-688.
Bedell et al., "Sorghum genome sequencing by methylation filtration." PLoS Biology 3.1 (2005): 1-13.
Bejerano et al., "Ultraconserved elements in the human genome." Science 304.5675 (2004): 1321-1325.
Bellucci et al., "Graft-versus-tumor response in patients with multiple myeloma is associated with antibody response to BCMA, a plasma-cell membrane receptor." Blood 105.10 (2005): 3945-3950.
Belostotsky D., "mRNA turnover meets RNA interference." Molecular cell 16.4 (2004): 498-500.
Bennasser et al., "HIV-1 encoded candidate micro-RNAs and their cellular targets." Retrovirology 1.1 (2004): 1-5.

(56) References Cited

OTHER PUBLICATIONS

Berezikov et al., "Phylogenetic shadowing and computational identification of human microRNA genes." Cell 120.1 (2005): 21-24.
Bergmann et al., "HIDden targets of microRNAs for growth control." Trends in biochemical sciences 28.9 (2003): 461-463.
Bernstein et al., "Role for a bidentate ribonuclease in the initiation step of RNA interference." Nature 409.6818 (2001): 363-366.
Best et al., "In vitro synthesized small interfering RNAs elicit RNA interference in african trypanosomes: an in vitro and in vivo analysis." Journal of Biological Chemistry 280.21 (2005): 20573-20579.
Bettencourt et al., "Hemolin gene silencing by ds-RNA injected into Cecropia pupae is lethal to next generation embryos." Insect Molecular Biology 11.3 (2002): 267-271.
Better et al., "*Escherichia coli* secretion of an active chimeric antibody fragment." Science 240.4855 (1988): 1041-1043.
Bignold L., "The cell-type-specificity of inherited predispositions to tumours: review and hypothesis." Cancer letters 216.2 (2004): 127-146.
Bisson et al., "Prevention and treatment of PTSD: the current evidence base." European Journal of Psychotraumatology 12.1 (2021): 1-5.
Bisson et al., "Psychological therapies for chronic post-traumatic stress disorder (PTSD) in adults." Cochrane database of systematic reviews 12 (2013): 1-167.
Bitko et al., "Inhibition of respiratory viruses by nasally administered siRNA." Nature medicine 11.1 (2005): 50-55.
Blaszczyk et al., "Crystallographic and modeling studies of RNase III suggest a mechanism for double-stranded RNA cleavage." Structure 9.12 (2001): 1225-1236.
Biran et al., "Interaction of temporal lobe epilepsy and post-traumatic stress disorder: network analysis of a single case." Frontiers in Psychology 11 (2020): 1-7.
Bluett et al., "Does change in distress matter? Mechanisms of change in prolonged exposure for PTSD." Journal of behavior therapy and experimental psychiatry 45.1 (2014): 97-104.
Boden et al., "Enhanced gene silencing of HIV-1 specific siRNA using microRNA designed hairpins." Nucleic acids research 32.3 (2004): 1154-1158.
Boffelli et al., "Phylogenetic shadowing of primate sequences to find functional regions of the human genome." Science 299.5611 (2003): 1391-1394.
Bohnsack et al., "Exportin 5 is a RanGTP-dependent dsRNA-binding protein that mediates nuclear export of pre-miRNAs." Rna 10.2 (2004): 185-191.
Bonnet et al., "Detection of 91 potential conserved plant microRNAs in *Arabidopsis thaliana* and *Oryza sativa* identifies important target genes." Proceedings of the National Academy of Sciences 101.31 (2004): 11511-11516.
Bonnet et al., "Evidence that microRNA precursors, unlike other non-coding RNAs, have lower folding free energies than random sequences." Bioinformatics 20.17 (2004): 2911-2917.
Borghans et al., "Animal models for posttraumatic stress disorder: an overview of what is used in research." World journal of psychiatry 5.4 (2015): 387-396.
Borodina et al., "Ligation-based synthesis of oligonucleotides with block structure." Analytical biochemistry 318.2 (2003): 309-313.
Boscarino J., "Posttraumatic stress disorder and physical illness: results from clinical and epidemiologic studies." Annals of the New York Academy of sciences 1032.1 (2004): 141-153.
Bothe et al., "How expensive are post-traumatic stress disorders? Estimating incremental health care and economic costs on anonymised claims data." The European Journal of Health Economics 21.6 (2020): 917-930.
Bottros et al., "Current perspectives on intrathecal drug delivery." Journal of pain research (2014): 615-626.
Novina et al., "siRNA-directed inhibition of HIV-1 infection." Nature medicine 8.7 (2002): 681-686.
Novina et al., "The rnai revolution." Nature 430.6996 (2004): 161-164.

O'Connor et al., "BCMA is essential for the survival of long-lived bone marrow plasma cells." The Journal of experimental medicine 199.1 (2004): 91-98.
O'Loghlen et al., "Suppression of human Mnk1 by small interfering RNA increases the eukaryotic initiation factor 4F activity in HEK293T cells." FEBS letters 578.1-2 (2004): 31-35.
O'Toole et al., "Stability of 3' double nucleotide overhangs that model the 3' ends of siRNA." Rna 11.4 (2005): 512-516.
Ogita et al., "Application of RNAi to confirm theobromine as the major intermediate for caffeine biosynthesis in coffee plants with potential for construction of decaffeinated varieties." Plant molecular biology 54.6 (2004): 931-941.
Ohler et al., "Patterns of flanking sequence conservation and a characteristic upstream motif for microRNA gene identification." Rna 10.9 (2004): 1309-1322.
Ohno et al., "BACE1 deficiency rescues memory deficits and cholinergic dysfunction in a mouse model of Alzheimer's disease." Neuron 41.1 (2004): 27-33.
Okamura et al., "Distinct roles for Argonaute proteins in small RNA-directed RNA cleavage pathways." Genes & development 18.14 (2004): 1655-1666.
Okazaki et al., "FANTOM Consortium; RIKEN Genome Exploration Research Group Phase I & II Team. Analysis of the mouse transcriptome based on functional annotation of 60,770 full-length cDNAs." (2002): 563-573.
Olsen et al., "The lin-4 regulatory RNA controls developmental timing in Caenorhabditis elegans by blocking LIN-14 protein synthesis after the initiation of translation." Developmental biology 216.2 (1999): 671-680.
Omoto et al., "HIV-1 nef suppression by virally encoded microRNA." Retrovirology 1.1 (2004): 1-12.
Omoto et al., "Regulation of human immunodeficiency virus 1 transcription by nef microRNA." Journal of General Virology 86.3 (2005): 751-755.
Onishi et al., "Withdrawn: Molecular evolution of a microRNA cluster in the PWS/AS region among mammals." (2005): 1-1.
Opdyke et al., "GadY, a small-RNA regulator of acid response genes in *Escherichia coli*." Journal of bacteriology 186.20 (2004): 6698-6705.
Orban et al., "Decay of mRNAs targeted by RISC requires XRN1, the Ski complex, and the exosome." Rna 11.4 (2005): 459-469.
Ostberg et al., "The etiological agent of Lyme disease, Borrelia burgdorferi, appears to contain only a few small RNA molecules." Journal of bacteriology 186.24 (2004): 8472-8477.
Osuch et al., "Regional cerebral blood flow correlated with flashback intensity in patients with posttraumatic stress disorder." Biological psychiatry 50.4 (2001): 246-253.
Ota et al., "Complete sequencing and characterization of 21,243 full-length human cDNAs." Nature genetics 36.1 (2004): 40-45.
Ota et al., "Identification and characterization of a novel gene, C13orf25, as a target for 13q31-q32 amplification in malignant lymphoma." Cancer research 64.9 (2004): 3087-3095.
Otte et al., "Valproate monotherapy in the treatment of civilian patients with non-combat-related posttraumatic stress disorder: an open-label study." Journal of clinical psychopharmacology 24.1 (2004): 106-108.
Overhoff et al., "Local RNA target structure influences siRNA efficacy: a systematic global analysis." Journal of molecular biology 348.4 (2005): 871-881.
Paddison et al., "Short hairpin RNAs (shRNAs) induce sequence-specific silencing in mammalian cells." Genes & development 16.8 (2002): 948-958.
Paddison et al., "Stable suppression of gene expression by RNAi in mammalian cells." Proceedings of the National Academy of Sciences 99.3 (2002): 1443-1448.
Padlan et al., "Structure of an antibody-antigen complex: crystal structure of the HyHEL-10 Fab-lysozyme complex." Proceedings of the National Academy of Sciences 86.15 (1989): 5938-5942.
Palatnik et al., "Control of leaf morphogenesis by microRNAs." Nature 425.6955 (2003): 257-263.
Panagioti et al., "Post-traumatic stress disorder and suicidal behavior: A narrative review." Clinical psychology review 29.6 (2009): 471-482.

(56) References Cited

OTHER PUBLICATIONS

Pang et al., "RNAdb—a comprehensive mammalian noncoding RNA database." Nucleic acids research 33.suppl_1 (2005): D125-D130.
Parizotto et al., "In vivo investigation of the transcription, processing, endonucleolytic activity, and functional relevance of the spatial distribution of a plant miRNA." Genes & development 18.18 (2004): 2237-2242.
Park et al., "Carpel Factory, a Dicer homolog, and HEN1, a novel protein, act in microRNA metabolism in *Arabidopsis thaliana*." Current biology 12.17 (2002): 1484-1495.
Parker et al., "Sequence and transcription of Raji Epstein-Barr virus DNA spanning the B95-8 deletion region." Virology 179.1 (1990): 339-346.
Pasquinelli et al., "Conservation of the sequence and temporal expression of let-7 heterochronic regulatory RNA." Nature 408.6808 (2000): 86-89.
Pasquinelli et al., "Control of developmental timing by microRNAs and their targets." Annual review of cell and developmental biology 18.1 (2002): 495-513.
Pasquinelli et al., "MicroRNAs: a developing story." Current opinion in genetics & development 15.2 (2005): 200-205.
Pasquinelli, A. "MicroRNAs: deviants no longer." Trends in Genetics 18.4 (2002): 171-173.
Paykel, E. "Achieving gains beyond response." Acta Psychiatrica Scandinavica 106 (2002): 12-17.
Pearson et al., "Creation of "humanized" mice to study human immunity." Current protocols in immunology 81.1 (2008): 15-21.
Perumal et al., "Inhibitory circuits in the basolateral amygdala in aversive learning and memory." Frontiers in Neural Circuits 15 (2021): 633235.
Pfeffer et al., "Identification of microRNAs of the herpesvirus family." Nature methods 2.4 (2005): 269-276.
Pfeffer et al., "Identification of virus-encoded microRNAs." Science 304.5671 (2004): 734-736.
Piccin et al., "Efficient and heritable functional knock-out of an adult phenotype in *Drosophila* using a GAL4-driven hairpin RNA incorporating a heterologous spacer." Nucleic acids research 29.12 (2001): 1-5.
Pillai et al., "Tethering of human Ago proteins to mRNA mimics the miRNA-mediated repression of protein synthesis." Rna 10.10 (2004): 1518-1525.
Pissiota et al., "Neurofunctional correlates of posttraumatic stress disorder: a PET symptom provocation study." European archives of psychiatry and clinical neuroscience 252.2 (2002): 68-75.
Pitt et al., "P granules in the germ cells of Caenorhabditis elegans adults are associated with clusters of nuclear pores and contain RNA." Developmental biology 219.2 (2000): 315-333.
Pocivavsek et al., "Fluctuations in endogenous kynurenic acid control hippocampal glutamate and memory." Neuropsychopharmacology 36.11 (2011): 2357-2367.
Pomerantz et al., "Two pathways to NF-κB." Molecular cell 10.4 (2002): 693-695.
Pomerantz R., "RNA interference meets HIV-1: will silence be golden." Nature Medicine 8.7 (2002): 659-660.
Ponniah et al., "Empirically supported psychological treatments for adult acute stress disorder and posttraumatic stress disorder: a review." Depression and anxiety 26.12 (2009): 1086-1109.
Pooggin et al., "Fighting geminiviruses by RNAi and vice versa." Plant molecular biology 55.2 (2004): 149-152.
Popoli et al., "The stressed synapse: the impact of stress and glucocorticoids on glutamate transmission." Nature Reviews Neuroscience 13.1 (2012): 22-37.
Abbott A. L., "Heterochronic genes." Current Biology 13.21 (2003): R824-R825.
Abrahante et al., "The Caenorhabditis elegans hunchback-like gene lin-57/hbl-1 controls developmental time and is regulated by microRNAs." Developmental cell 4.5 (2003): 625-637.

Abrams D., "Feasibility of Delivery of Anti-Epilepsy Medications into the Cerebrospinal Fluid (10802)." Neuromodulation 19.3 (2015): e107.
Achard et al., "Modulation of floral development by a gibberellin-regulated microRNA." Development 131.14 (2004): 3357-3365.
Adai et al., "Computational prediction of miRNAs in *Arabidopsis thaliana*." Genome research 15.1 (2005): 78-91.
Adamou et al., "Valproate in the treatment of PTSD: systematic review and meta analysis." Current medical research and opinion 23.6 (2007): 1285-1291.
Agrawal et al., "Role of Toll-like receptors in antisense and siRNA [corrected]." Nature biotechnology 22.12 (2004): 1533-1537.
Akaneya et al., "RNAi-induced gene silencing by local electroporation in targeting brain region." Journal of neurophysiology 93.1 (2005): 594-602.
Albott et al., "Efficacy, safety, and durability of repeated ketamine infusions for comorbid posttraumatic stress disorder and treatment-resistant depression." The Journal of clinical psychiatry 79.3 (2018): 17462.
Albright et al., "Intraventricular baclofen for dystonia: techniques and outcomes." Journal of Neurosurgery: Pediatrics 3.1 (2009): 11-14.
Albright L., "Technique for insertion of intraventricular baclofen catheters." Journal of Neurosurgery: Pediatrics 8.4 (2011): 394-395.
Alibu et al., "A doubly inducible system for RNA interference and rapid RNAi plasmid construction in Trypanosoma brucei." Molecular and biochemical parasitology 139.1 (2005): 75-82.
Allawi et al., "Quantitation of microRNAs using a modified Invader assay." Rna 10.7 (2004): 1153-1161.
Allen et al., "Evolution of microRNA genes by inverted duplication of target gene sequences in *Arabidopsis thaliana*." Nature genetics 36.12 (2004): 1282-1290.
Allinson et al., "ADAMs family members as amyloid precursor protein a-secretases." Journal of neuroscience research 74.3 (2003): 342-352.
Allshire R., "RNAi and heterochromatin—a hushed-up affair." Science 297.5588 (2002): 1818-1819.
Alonso et al., "Days out of role due to common physical and mental conditions: results from the WHO World Mental Health surveys." Molecular psychiatry 16.12 (2011): 1234-1246.
Alsford et al., "Multiplex analysis of RNA interference defects in Trypanosoma brucei." Molecular and biochemical parasitology 139.1 (2005): 1-8.
Altuvia et al., "Clustering and conservation patterns of human microRNAs." Nucleic acids research 33.8 (2005): 2697-2706.
Altuvia S., "Regulatory small RNAs: the key to coordinating global regulatory circuits." Journal of Bacteriology 186.20 (2004): 6679-6680.
Alzoubi et al., "Pentoxifylline prevents post-traumatic stress disorder induced memory impairment." Brain research bulletin 139 (2018): 263-268.
Alzoubi et al., "Prevention of memory impairment induced by post-traumatic stress disorder by cerebrolysin." Psychiatry Research 270 (2018): 430-437.
Ambinder et al., "Epstein-Barr virus genome B95-8." XP002500226. Retrieved from EBI Database accession No. ADN12161 (2004).
Ambros V., "A uniform system for microRNA annotation." Rna 9.3 (2003): 277-279.
Ambros V., "MicroRNA pathways in flies and worms: growth, death, fat, stress, and timing." Cell 113.6 (2003): 673-676.
Ambros V., "MicroRNAs and other tiny endogenous RNAs in C. elegans." Current Biology 13.10 (2003): 807-818.
Ambros V., "microRNAs: tiny regulators with great potential." Cell 107.7 (2001): 823-826.
Ambros V., "The functions of animal microRNAs." Nature 431. 7006 (2004): 350-355.
Anandalakshmi et al., "A calmodulin-related protein that suppresses posttranscriptional gene silencing in plants." Science 290.5489 (2000): 142-144.
Anonymous. "Whither RNAi" Nat Cell Biol 5 (2003): 489-490.
Antonarakis et al., "Chromosome 21 and down syndrome: from genomics to pathophysiology." Nature reviews genetics 5.10 (2004): 725-738.

(56) References Cited

OTHER PUBLICATIONS

Aoun et al., "Impact of traumatic brain injury on sleep: an overview." Nature and science of sleep (2019): 131-140.
Arai et al., "Establishment of stable hFis1 knockdown cells with an siRNA expression vector." Journal of biochemistry 136.4 (2004): 421-425.
Aravin et al., "Dissection of a natural RNA silencing process in the Drosophila melanogaster germ line." Molecular and cellular biology 24.15 (2004): 6742-6750.
Aravin et al., "The small RNA profile during Drosophila melanogaster development." Developmental cell 5.2 (2003): 337-350.
Arditte Hall et al., "Plasma gamma-aminobutyric acid (GABA) levels and posttraumatic stress disorder symptoms in trauma-exposed women: a preliminary report." Psychopharmacology 238.6 (2021): 1541-1552.
Argaman et al., "Novel small RNA-encoding genes in the intergenic regions of Escherichia coli." Current Biology 11.12 (2001): 941-950.
Arias et al., "RNA silencing of rotavirus gene expression." Virus research 102.1 (2004): 43-51.
Ashrafi et al., "Genome-wide RNAi analysis of Caenorhabditis elegans fat regulatory genes." Nature 421.6920 (2003): 268-272.
Atkinson A., "Intracerebroventricular drug administration." Translational and Clinical Pharmacology 25.3 (2017): 117-124.
Atwoli et al., "Epidemiology of posttraumatic stress disorder: prevalence, correlates and consequences." Current opinion in psychiatry 28.4 (2015): 307-311.
Augustinsson et al., "Intracerebroventricular administration of GM1 ganglioside to presenile Alzheimer patients." Dementia and geriatric cognitive disorders 8.1 (1997): 26-33.
Aukerman et al., "Regulation of flowering time and floral organ identity by a microRNA and its APETALA2-like target genes." The Plant Cell 15.11 (2003): 2730-2741.
Averill et al., "Glutamate dysregulation and glutamatergic therapeutics for PTSD: Evidence from human studies." Neuroscience letters 649 (2017): 147-155.
Avery et al., "BAFF selectively enhances the survival of plasmablasts generated from human memory B cells." The Journal of clinical investigation 112.2 (2003): 286-297.
Ayash-Rashkovsky et al., "Generation of Th1 immune responses to inactivated, gp120-depleted HIV-1 in mice with a dominant Th2 biased immune profile via imunostimulatory oligonucleotides—relevance to AIDS vaccines in developing countries." Vaccine 20.21-22 (2002): 2684-2692.
Baba et al., "Solution structure of an RNA stem-loop derived from the 3' conserved region of eel LINE UnaL2." Rna 10.9 (2004): 1380-1387.
Babak et al., "Probing microRNAs with microarrays: tissue specificity and functional inference." Rna 10.11 (2004): 1813-1819.
Bagasra et al., "RNA interference: the molecular immune system." Journal of molecular histology 35.6 (2004): 545-553.
Bahramian et al., "GENE impedance: a natural process for control of gene expression and the origin of RNA interference." Journal of theoretical biology 233.3 (2005): 301-314.
Shim et al., "Machine-learning-based classification between posttraumatic stress disorder and major depressive disorder using P300 features." NeuroImage: Clinical 24 (2019): 1-8.
Shin et al., "Amygdala, medial prefrontal cortex, and hippocampal function in PTSD." Annals of the New York Academy of Sciences 1071.1 (2006): 67-79.
Shin et al., "Hippocampal function in posttraumatic stress disorder." Hippocampus 14.3 (2004): 292-300.
Shin et al., "Regional cerebral blood flow in the amygdala and medial prefrontalcortex during traumatic imagery in male and female vietnam veterans with ptsd." Archives of general psychiatry 61.2 (2004): 168-176.
Shin et al., "Resting metabolic activity in the cingulate cortex and vulnerability to posttraumatic stress disorder." Archives of general psychiatry 66.10 (2009): 1099-1107.

Shin et al., "The neurocircuitry of fear, stress, and anxiety disorders." Neuropsychopharmacology 35.1 (2010): 169-191.
Shin et al., "Transcriptional and post-transcriptional regulation of the PKCd gene by etoposide in L1210 murine leukemia cells: implication of PKCd autoregulation." Journal of molecular biology 340.4 (2004): 681-693.
Shiner et al., "A retrospective comparative effectiveness study of medications for posttraumatic stress disorder in routine practice." The Journal of clinical psychiatry 79.5 (2018): 1-20.
Shiner et al., "Anticonvulsant medication use in veterans with posttraumatic stress disorder." The Journal of clinical psychiatry 78.5 (2017): e545-e552.
Shivakumar et al., "Targeting B-lymphocyte stimulator/B-cell activating factor and a proliferation-inducing ligand in hematologic malignancies." Clinical Lymphoma and Myeloma 7.2 (2006): 106-108.
Sigova et al., "A single Argonaute protein mediates both transcriptional and posttranscriptional silencing in Schizosaccharomyces pombe." Genes & development 18.19 (2004): 2359-2367.
Sijen et al., "Post-transcriptional gene-silencing: RNAs on the attack or on the defense." Bioessays 22.6 (2000): 520-531.
Silhavy et al., "A viral protein suppresses RNA silencing and binds silencing-generated, 21-to 25-nucleotide double-stranded RNAs." The EMBO journal (2002): 1-11.
Silvestri et al., "Rotavirus replication: plus-sense templates for double-stranded RNA synthesis are made in viroplasms." Journal of virology 78.14 (2004): 7763-7774.
Simmonds et al., "Detection of genome-scale ordered RNA structure (GORS) in genomes of positive-stranded RNA viruses: Implications for virus evolution and host persistence." Rna 10.9 (2004): 1337-1351.
Sims et al., "Identification and characterization of circulating human transitional B cells." Blood 105.11 (2005): 4390-4398.
Siolas et al., "Synthetic shRNAs as potent RNAi triggers." Nature biotechnology 23.2 (2005): 227-231.
Slack et al., "The lin-41 RBCC gene acts in the C. elegans heterochronic pathway between the let-7 regulatory RNA and the LIN-29 transcription factor." Molecular cell 5.4 (2000): 659-669.
Sledz et al., "Activation of the interferon system by short-interfering RNAs." Nature cell biology 5.9 (2003): 834-839.
Smale S., "The establishment and maintenance of lymphocyte identity through gene silencing." Nature immunology 4.7 (2003): 607-615.
Smalheiser et al., "A population-based statistical approach identifies parameters characteristic of human microRNA-mRNA interactions." BMC bioinformatics 5.1 (2004): 1-8.
Smalheiser, N. "EST analyses predict the existence of a population of chimeric microRNA precursor-mRNA transcripts expressed in normal human and mouse tissues." Genome biology 4.7 (2003): 1-3.
Smallridge R., "A small fortune." Nature Reviews Molecular Cell Biology 2.12 (2001): 867-867.
Smirnova et al., "Regulation of miRNA expression during neural cell specification." European Journal of Neuroscience 21.6 (2005): 1469-1477.
Smith et al., "Intrathecal drug delivery." Pain physician 11.2S (2008): S89-S104.
Smith et al., "The early detection of prostate carcinoma with prostate specific antigen: the Washington University experience." Cancer: Interdisciplinary International Journal of The American Cancer Society 80.9 (1997): 1852-1856.
Smith et al., "Total silencing by intron-spliced hairpin RNAs." Nature 407.6802 (2000): 319-320.
Soldan et al., "La Crosse virus nonstructural protein NSs counteracts the effects of short interfering RNA." Journal of virology 79.1 (2005): 234-244.
Song et al., "Crystal structure of Argonaute and its implications for RISC slicer activity." science 305.5689 (2004): 1434-1437.
Sontheimer et al., "Argonaute journeys into the heart of RISC." Science 305.5689 (2004): 1409-1410.
Sosin et al., "Trends in death associated with traumatic brain injury, 1979 through 1992: success and failure." Jama 273.22 (1995): 1778-1780.

(56) References Cited

OTHER PUBLICATIONS

Souret et al., "AtXRN4 degrades mRNA in *Arabidopsis* and its substrates include selected miRNA targets." Molecular cell 15.2 (2004): 173-183.
Soutschek et al., "Therapeutic silencing of an endogenous gene by systemic administration of modified siRNAs." Nature 432.7014 (2004): 173-178.
Spira et al., "Generation of mutant monoclonal antibodies." Methods of Hybridoma Formation. Totowa, NJ: Humana Press (1987): 379-397.
Spiridon et al., "A comparison of the in vitro and in vivo activities of IgG and F (ab') 2 fragments of a mixture of three monoclonal anti-Her-2 antibodies." Clinical Cancer Research 10.10 (2004): 3542-3551.
Spitzer et al., "Trauma, posttraumatic stress disorder, and physical illness: findings from the general population." Psychosomatic medicine 71.9 (2009): 1012-1017.
Stark et al., "Identification of *Drosophila* microRNA targets." PLoS biology 1.3 (2003): 397-409.
Staubli et al., "Facilitation of glutamate receptors enhances memory." Proceedings of the National Academy of Sciences 91.2 (1994): 777-781.
Steenkamp et al., "Psychotherapy for military-related PTSD: A review of randomized clinical trials." Jama 314.5 (2015): 489-500.
Stein et al., "Genetic programming by the proteolytic fragments of the amyloid precursor protein: somewhere between confusion and clarity." Reviews in the neurosciences 14.4 (2003): 317-342.
Stein et al., "Ketamine for PTSD: well, isn't that special." American Journal of Psychiatry 178.2 (2021): 116-118.
Stein et al., "Randomized, placebo-controlled trial of the angiotensin receptor antagonist losartan for posttraumatic stress disorder." Biological Psychiatry 90.7 (2021): 473-481.
Steinman et al., "Transcriptional analysis of targets in multiple sclerosis." Nature Reviews Immunology 3.6 (2003): 483-492.
Stevens et al., "Episodic memory after trauma exposure: Medial temporal lobe function is positively related to re-experiencing and inversely related to negative affect symptoms." NeuroImage: Clinical 17 (2018): 650-658.
Stevenson M., "Dissecting HIV-1 through RNA interference." Nature Reviews Immunology 3.11 (2003): 851-858.
Stix G., "Hitting the genetic off switch." Scientific American 291.4 (2004): 98-101.
Storz et al., "Controlling mRNA stability and translation with small, noncoding RNAs." Current opinion in microbiology 7.2 (2004): 140-144.
Stoutjesdijk et al., "hpRNA-mediated targeting of the *Arabidopsis* FAD2 gene gives highly efficient and stable silencing." Plant physiology 129.4 (2002): 1723-1731.
Straud et al., "Examining military population and trauma type as moderators of treatment outcome for first-line psychotherapies for PTSD: A meta-analysis." Journal of anxiety disorders 67 (2019): 1-26.
Stremlau et al., "The cytoplasmic body component TRIM5a restricts HIV-1 infection in Old World monkeys." Nature 427.6977 (2004): 848-853.
Wong et al., "Computationally efficient epileptic seizure prediction based on extremely randomised trees." Proceedings of the Australasian Computer Science Week Multiconference (2020): 1-3.
Wood N., "Unravelling the molecular basis of viral suppression of PTGS." Trends in Plant Science 7.9 (2002): 384-385.
Woodman et al., "Panic disorder: treatment with valproate." The Journal of clinical psychiatry 55.4 (1994): 134-136.
Written Opinion in PCT/US2021/041763, mailed May 30, 2022, 9 pages.
Written Opinion in PCT/US2021/041772, mailed May 30, 2022, 8 pages.
Written Opinion in PCT/US2021/042315, mailed Jun. 8, 2022, 8 pages.
Written Opinion in PCT/US2022/054049, mailed Nov. 16, 2023, 9 pages.
Wrocklage et al., "Neuropsychological functioning in veterans with posttraumatic stress disorder: Associations with performance validity, comorbidities, and functional outcomes." Journal of the International Neuropsychological Society 22.4 (2016): 399-411.
Wu et al., "An electroencephalographic signature predicts antidepressant response in major depression." Nature biotechnology 38.4 (2020): 439-447.
Wu et al., "Humanization of a murine monoclonal antibody by simultaneous optimization of framework and CDR residues." Journal of Molecular Biology 294.1 (1999): 151-162.
Wu et al., "Inhibition of SARS-CoV replication by siRNA." Antiviral research 65.1 (2005): 45-48.
Wu et al., "Unsupervised feature learning via non-parametric instance discrimination." Proceedings of the IEEE conference on computer vision and pattern recognition (2018): 3733-3742.
Wuchty et al., "Complete suboptimal folding of RNA and the stability of secondary structures." Biopolymers: Original Research on Biomolecules 49.2 (1999): 145-165.
Xayaphoummine et al., "Prediction and statistics of pseudoknots in RNA structures using exactly clustered stochastic simulations." Proceedings of the National Academy of Sciences 100.26 (2003): 15310-15315.
Xiang et al., "Amine-modified random primers to label probes for DNA microarrays." nature biotechnology 20.7 (2002): 738-742.
Xiao et al., "A novel mechanism of checkpoint abrogation conferred by Chk1 downregulation." Oncogene 24.8 (2005): 1403-1411.
Xie et al., "Genetic and functional diversification of small RNA pathways in plants." PLoS biology 2.5 (2004): 642-652.
Xie et al., "Negative feedback regulation of Dicer-Like1 in *Arabidopsis* by microRNA-guided mRNA degradation." Current Biology 13.9 (2003): 784-789.
Xie et al., "Systematic discovery of regulatory motifs in human promoters and 3' UTRs by comparison of several mammals." Nature 434.7031 (2005): 338-345.
Xu et al., "B-cell maturation protein, which binds the tumor necrosis factor family members BAFF and APRIL, is dispensable for humoral immune responses." Molecular and Cellular Biology 21.12 (2001): 4067-4074.
Xu et al., "MicroRNAs and the regulation of cell death." Trends in Genetics 20.12 (2004): 617-624.
Xu et al., "The *Drosophila* microRNA Mir-14 suppresses cell death and is required for normal fat metabolism." Current Biology 13.9 (2003): 790-795.
Yang et al., "Dicer is required for embryonic angiogenesis during mouse development." Journal of Biological Chemistry 280.10 (2005): 9330-9335.
Yang et al., "Evidence that processed small dsRNAs may mediate sequence-specific mRNA degradation during RNAi in *Drosophila embryos*." Current Biology 10.19 (2000): 1191-1200.
Yang et al., "Intracranial hemorrhage risk factors of deep brain stimulation for Parkinson's disease: a 2-year follow-up study." Journal of International Medical Research 48.5 (2020): 1-10.
Ye et al., "Recognition of small interfering RNA by a viral suppressor of RNA silencing." Nature 426.6968 (2003): 874-878.
Yee et al., "GABAA receptors containing the a5 subunit mediate the trace effect in aversive and appetitive conditioning and extinction of conditioned fear." European Journal of Neuroscience 20.7 (2004): 1928-1936.
Yeh et al., "A double-blind randomized controlled trial to study the efficacy of topiramate in a civilian sample of PTSD." CNS neuroscience & therapeutics 17.5 (2011): 305-310.
Yehuda et al., "Learning and memory in Holocaust survivors with posttraumatic stress disorder." Biological psychiatry 55.3 (2004): 291-295.
Yekta et al., "MicroRNA-directed cleavage of HOXB8 mRNA." Science 304.5670 (2004): 594-596.
Yelin et al., "Widespread occurrence of antisense transcription in the human genome." Nature biotechnology 21.4 (2003): 379-386.
Yi et al., "Exportin-5 mediates the nuclear export of pre-microRNAs and short hairpin RNAs." Genes & development 17.24 (2003): 3011-3016.

(56) References Cited

OTHER PUBLICATIONS

Yi et al., "Overexpression of exportin 5 enhances RNA interference mediated by short hairpin RNAs and microRNAs." Rna 11.2 (2005): 220-226.

Ying et al., "Intron-derived microRNAs—fine tuning of gene functions." Gene 342.1 (2004): 25-28.

Ying et al., "Intronic microRNAs." Biochemical and biophysical research communications 326.3 (2005): 515-520.

Yoo et al., "A systemic small RNA signaling system in plants." The Plant Cell 16.8 (2004): 1979-2000.

YouTube video entitled: "Biomarker Terminology: Speaking the Same Language," uploaded Jan. 27, 2017 by user "U.S. Food and Drug Administration," [retrieved on Jun. 24, 2020]. Retrieved from the Internet: <URL: https://www.youtube.com/watch?v=OXo5E0R7zBc>, 1 page.

Yu et al., "Methylation as a crucial step in plant microRNA biogenesis." Science 307.5711 (2005): 932-935.

Yuan et al., "Adaptive design for staggered-start clinical trial." The International Journal of Biostatistics 12.2 (2016): 1-17.

Yun et al., "Both ERK and Wnt/ß-catenin pathways are involved in Wnt3a-induced proliferation." Journal of cell science 118.2 (2005): 313-322.

Zamore, P. "Ancient pathways programmed by small RNAs." Science 296.5571 (2002): 1265-1269.

Zamore, P. "Plant RNAi: How aViral silencing suppressor inactivates siRNA." Current Biology 14.5 (2004): R198- R200.

Zamvil et al., "Diverse targets for intervention during inflammatory and neurodegenerative phases of multiple sclerosis." Neuron 38.5 (2003): 685-688.

Zanatta et al., "Valproic acid interactions with the NavMs voltage-gated sodium channel." Proceedings of the National Academy of Sciences 116.52 (2019): 26549-26554.

Zandvakili et al., "Use of machine learning in predicting clinical response to transcranial magnetic stimulation in comorbid post-traumatic stress disorder and major depression: a resting state electroencephalography study." Journal of affective disorders 252 (2019): 47-54.

Zeng et al., "Both natural and designed micro RNAs can inhibit the expression of cognate mRNAs when expressed in human cells." Molecular cell 9.6 (2002): 1327-1333.

Zeng et al., "MicroRNAs and small interfering RNAs can inhibit mRNA expression by similar mechanisms." Proceedings of the National Academy of Sciences 100.17 (2003): 9779-9784.

Zeng et al., "Recognition and cleavage of primary microRNA precursors by the nuclear processing enzyme Drosha." The EMBO journal 24.1 (2005): 138-148.

Zeng et al., "RNA interference in human cells is restricted to the cytoplasm." Rna 8.7 (2002): 855-860.

Zeng et al., "Sequence requirements for micro RNA processing and function in human cells." Rna 9.1 (2003): 112-123.

Posner et al., "The Columbia—Suicide Severity Rating Scale: initial validity and internal consistency findings from three multisite studies with adolescents and adults." American journal of psychiatry 168.12 (2011): 1266-1277.

Post et al., "Sensitization and kindling: implications for the evolving neural substrates of post-traumatic stress disorder." Neurobiological and Clinical Consequences of Stress: From Normal Adaptation to PTSD (1995): 1-22.

Post-Traumatic Stress Disorder (PTSD), National Institute of Mental Health, Retrieved from the Internet: <URL: https://www.nimh.nih.gov/health/statistics/post-traumatic-stress-disorder-ptsd> (2017): 1-4.

Poy et al., "A pancreatic islet-specific microRNA regulates insulin secretion." Nature 432.7014 (2004): 226-230.

Primeau et al., "Valproic acid and panic disorder." The Canadian Journal of Psychiatry 35.3 (1990): 248-250.

Provost et al., "Ribonuclease activity and RNA binding of recombinant human Dicer." The EMBO journal (2002): 1-11.

Puerta-Fernandez et al., "Anchoring hairpin ribozymes to long target RNAs by loop—loop RNA interactions." Antisense and Nucleic Acid Drug Development 12.1 (2002): 1-9.

Puetz et al., "Effects of pharmacotherapy on combat-related PTSD, anxiety, and depression: a systematic review and meta-regression analysis." PloS one 10.5 (2015): 1-18.

Qassem et al., "Psychiatric co-morbidities in post-traumatic stress disorder: detailed findings from the adult psychiatric morbidity survey in the English population." Psychiatric Quarterly 92.1 (2021): 321-330.

Qi et al., "Inhibition of cell growth and shoot development by a specific nucleotide sequence in a noncoding viroid RNA." The Plant Cell 15.6 (2003): 1360-1374.

Rajewsky et al., "Computational identification of microRNA targets." Genome Biology 5.2 (2004): 1-34.

Rao, M. "Conserved and divergent paths that regulate self-renewal in mouse and human embryonic stem cells." Developmental biology 275.2 (2004): 269-286.

Rapaport et al., "Posttraumatic stress disorder and quality of life: results across 64 weeks of sertraline treatment." Journal of Clinical Psychiatry 63.1 (2002): 59-65.

Rapaport et al., "Quality-of-life impairment in depressive and anxiety disorders." American Journal of Psychiatry 162.6 (2005): 1171-1178.

Rapozzi et al., "Efficient silencing of bcr/abl oncogene by single- and double-stranded siRNAs targeted against b2a2 transcripts." Biochemistry 43.51 (2004): 16134-16141.

Raskind et al., "Trial of prazosin for post-traumatic stress disorder in military veterans." New England Journal of Medicine 378.6 (2018): 507-517.

Rauch et al., "Neurocircuitry models of posttraumatic stress disorder and extinction: human neuroimaging research—past, present, and future." Biological psychiatry 60.4 (2006): 376-382.

Ravindran et al., "Pharmacotherapy of PTSD: premises, principles, and priorities." Brain research 1293 (2009): 24-39.

Reff et al., "Depletion of B cells in vivo by a chimeric mouse human monoclonal antibody to CD20." (1994): 435-445.

Rehmsmeier et al., "Fast and effective prediction of microRNA/target duplexes." Rna 10.10 (2004): 1507-1517.

Reiner et al., "Identifying differentially expressed genes using false discovery rate controlling procedures." Bioinformatics 19.3 (2003): 368-375.

Reinhart et al., "MicroRNAs in plants." Genes & development 16.13 (2002): 1616-1626.

Reinhart et al., "Small RNAs correspond to centromere heterochromatic repeats." science 297.5588 (2002): 1831-1831.

Reinhart et al., "The 21-nucleotide let-7 RNA regulates developmental timing in Caenorhabditis elegans." nature 403.6772 (2000): 901-906.

Rhoades et al., "Prediction of plant microRNA targets." cell 110.4 (2002): 513-520.

Rhoda et al., "Studies with staggered starts: multiple baseline designs and group-randomized trials." American Journal of Public Health 101.11 (2011): 2164-2169.

Richards et al., "Sleep disturbance in PTSD and other anxiety-related disorders: an updated review of clinical features, physiological characteristics, and psychological and neurobiological mechanisms." Neuropsychopharmacology 45.1 (2020): 55-73.

Richter-Levin et al., "Animal models of PTSD: a challenge to be met." Molecular psychiatry 24.8 (2019): 1135-1156.

Riedel et al., "Glutamate receptor function in learning and memory." Behavioural brain research 140.1-2 (2003): 1-47.

Rinker et al., "Outcomes of short-gap sensory nerve injuries reconstructed with processed nerve allografts from a multicenter registry study." Journal of reconstructive microsurgery 31.05 (2015): 384-390.

Rivas et al., "Purified Argonaute2 and an siRNA form recombinant human RISC." Nature structural & molecular biology 12.4 (2005): 340-349.

Robb et al., "Specific and potent RNAi in the nucleus of human cells." Nature structural & molecular biology 12.2 (2005): 133-137.

(56) References Cited

OTHER PUBLICATIONS

Robins et al., "Incorporating structure to predict microRNA targets." Proceedings of the National Academy of Sciences 102.11 (2005): 4006-4009.
Robinson et al., "Genomic and proteomic analysis of multiple sclerosis: Opinion." Current opinion in immunology 15.6 (2003): 660-667.
Rodriguez et al., "Identification of mammalian microRNA host genes and transcription units." Genome research 14.10a (2004): 1902-1910.
Rose et al., "Blocking memory reconsolidation reverses memory-associated changes in glutamate receptor expression." Journal of Neuroscience 26.45 (2006): 11582-11587.
Roseboom et al., "Evidence in primates supporting the use of chemogenetics for the treatment of human refractory neuropsychiatric disorders." Molecular Therapy 29.12 (2021): 3484-3497.
Rosenbaum et al., "Ventriculostomy: Frequency, length of stay and in-hospital mortality in the United States of America, 1988-2010." Journal of Clinical Neuroscience 21.4 (2014): 623-632.
Rosok et al., "Systematic identification of sense-antisense transcripts in mammalian cells." Nature biotechnology 22.1 (2004): 104-108.
Rosso et al., "Insula and anterior cingulate GABA levels in post-traumatic stress disorder: preliminary findings using magnetic resonance spectroscopy." Depression and anxiety 31.2 (2013): 1-9.
Roth et al., "Expression profiling using a hexamer-based universal microarray." Nature biotechnology 22.4 (2004): 418-426.
Roy et al., "Deep learning-based electroencephalography analysis: a systematic review." Journal of neural engineering 16.5 (2019): 1-38.
Rudikoff et al., "Single amino acid substitution altering antigen-binding specificity." Proceedings of the National Academy of Sciences 79.6 (1982): 1979-1983.
Rush et al., "Clinical research challenges posed by difficult-to-treat depression." Psychological Medicine 52.3 (2022): 419-432.
Ruvkun et al., "The 20 years it took to recognize the importance of tiny RNAs." Cell 116 (2004): S93-S98.
Ruvkun G., "Glimpses of a tiny RNA world." Science 294.5543 (2001): 797-799.
Ryan et al., "Antibody targeting of B-cell maturation antigen on malignant plasma cells." Molecular cancer therapeutics 6.11 (2007): 3009-3018.
Rye et al., "Interfering with cancer: a brief outline of advances in RNA interference in oncology." Tumor Biology 25.5-6 (2004): 329-336.
Ryo et al., "Identification and characterization of differentially expressed mRNAs in HIV type 1-infected human T cells." AIDS research and human retroviruses 16.10 (2000): 995-1005.
Ryo et al., "Serial analysis of gene expression in HIV-1-infected T cell lines." FEBS letters 462.1-2 (1999): 182-186.
Zeng et al., "Structural requirements for pre-microRNA binding and nuclear export by Exportin 5." Nucleic acids research 32.16 (2004): 4776-4785.
Zerhouni et al., "Isolation of CD4-independent primary human immunodeficiency virus type 1 isolates that are syncytium inducing and acutely cytopathic for CD8+ lymphocytes." Journal of virology 78.3 (2004): 1243-1255.
Zhang et al., "BAFF supports human B cell differentiation in the lymphoid follicles through distinct receptors." International immunology 17.6 (2005): 779-788.
Zhang et al., "Fathoming fragile X in fruit flies." Trends in Genetics 21.1 (2005): 37-45.
Zhang et al., "Human Dicer preferentially cleaves dsRNAs at their termini without a requirement for ATP." The EMBO journal (2002): 5875-5885.
Zhang et al., "Inhibition of respiratory syncytial virus infection with intranasal siRNA nanoparticles targeting the viral NS1 gene." Nature medicine 11.1 (2005): 56-62.
Zhang, M. "Large-scale gene expression data analysis: a new challenge to computational biologists." Genome Research 9.8 (1999): 681-688.
Zhou et al., "Identification of NF-κB-regulated genes induced by TNFa utilizing expression profiling and RNA interference." Oncogene 22.13 (2003): 2054-2064.
Zoellner et al., "Doubly randomized preference trial of prolonged exposure versus sertraline for treatment of PTSD." American Journal of Psychiatry 176.4 (2019): 287-296.
Liu et al., "Emotion detection from EEG recordings." 12th International Conference on Natural Computation, Fuzzy Systems and Knowledge Discovery (2016): 1-6.
Vaiva et al., "Relationship between posttrauma GABA plasma levels and PTSD at 1-year follow-up." American Journal of Psychiatry 163.8 (2006): 1446-1448.
Couzin J., "Human RNA Slows Down a Primate Retrovirus." Science 308.5721 (2005): 480-481.
Couzin J., "RNAi shows cracks in its armor." Science 306.5699 (2004): 1124-1125.
Craik et al., "Deep learning for electroencephalogram (EEG) classification tasks: a review." Journal of neural engineering 16.3 (2019): 1-29.
Crawford et al., "Serum prostate-specific antigen and digital rectal examination for early detection of prostate cancer in a national community-based program." Urology 47.6 (1996): 863-869.
Crestani et al., "Decreased GABAA-receptor clustering results in enhanced anxiety and a bias for threat cues." Nature neuroscience 2.9 (1999): 833-839.
Crestani et al., "Trace fear conditioning involves hippocampal a5 GABAA receptors." Proceedings of the National Academy of Sciences 99.13 (2002): 8980-8985.
Crete et al., "Graft transmission of induced and spontaneous post-transcriptional silencing of chitinase genes." The Plant Journal 28.5 (2001): 493-501.
Cullen B., "RNA interference: antiviral defense and genetic tool." Nature immunology 3.7 (2002): 597-599.
Cullen B., "Transcription and processing of human microRNA precursors." Molecular cell 16.6 (2004): 861-865.
Czeh et al., "Chronic stress reduces the number of GABAergic interneurons in the adult rat hippocampus, dorsal-ventral and region-specific differences." Hippocampus 25.3 (2015): 393-405.
Dandekar et al., "HIV-1 Tat directly binds to NFκB enhancer sequence: role in viral and cellular gene expression." Nucleic acids research 32.4 (2004): 1270-1278.
Darce et al., "Regulated expression of BAFF-binding receptors during human B cell differentiation." The Journal of Immunology 179.11 (2007): 7276-7286.
Database GenBank: XP523298.2, "tumor necrosis factor receptor superfamily member 17 [Pan troglodytes]." NCBI.com, Retrieved from the Internet: <URL:https://www.ncbi.nlm.nih.gov/protein/XP_523298.2/> (2006): 1-2.
Davidson et al., "Highly efficient small interfering RNA delivery to primary mammalian neurons induces MicroRNA-like effects before mRNA degradation." Journal of Neuroscience 24.45 (2004): 10040-10046.
Davidson et al., "Molecular medicine for the brain: silencing of disease genes with RNA interference." The Lancet Neurology 3.3 (2004): 145-149.
Davidson et al., "The efficacy and tolerability of tiagabine in adult patients with post-traumatic stress disorder." Journal of clinical psychopharmacology 27.1 (2007): 85-88.
Davidson et al., "Treatment of posttraumatic stress disorder with venlafaxine extended release: a 6-month randomized controlled trial." Archives of general psychiatry 63.10 (2006): 1158-1165.
Davies et al., "Affinity improvement of single antibody VH domains: residues in all three hypervariable regions affect antigen binding." Immunotechnology 2.3 (1996): 169-179.
Davis et al., "Comprehensive review of the psychiatric uses of valproate." Journal of clinical psychopharmacology 20.1 (2000): 1S-17S.

(56) References Cited

OTHER PUBLICATIONS

Davis et al., "Divalproex in the treatment of posttraumatic stress disorder: a randomized, double-blind, placebo-controlled trial in a veteran population." Journal of clinical psychopharmacology 28.1 (2008): 84-88.
Davis et al., "Phasic vs sustained fear in rats and humans: role of the extended amygdala in fear vs anxiety." Neuropsychopharmacology 35.1 (2010): 105-135.
De Barros et al., "Gender differences in prevalence of psychiatric disorders, levels of alexithymia, and coping strategies in patients with refractory mesial temporal epilepsy and comorbid psychogenic nonepileptic seizures." Epilepsy & Behavior 82 (2018): 1-5.
De Pascalis et al., "Grafting of "abbreviated" complementarity-determining regions containing specificity-determining residues essential for ligand contact to engineer a less immunogenic humanized monoclonal antibody." The Journal of Immunology 169.6 (2002): 3076-3084.
Deer et al., "Polyanalgesic consensus conference 2007: recommendations for the management of pain by intrathecal (intraspinal) drug delivery: report of an interdisciplinary expert panel." Neuromodulation: Technology at the neural interface 10.4 (2007): 300-328.
Definition of Between, Dictionary.com, Retrieved from the Internet <URL: https://www.dictionary.com/browse/between> (2021): 1-3.
Demidov et al., "Two sides of the coin: affinity and specificity of nucleic acid interactions." Trends in biochemical sciences 29.2 (2004): 62-71.
Denli et al., "Processing of primary microRNAs by the Microprocessor complex." Nature 432.7014 (2004): 231-235.
Dennis C., "Gene regulation: The brave new world of RNA." Nature 418.6894 (2002): 122-125.
Dennis C., "Small RNAs: the genome's guiding hand." Nature 420 (2002): 732.
Di Serio et al., "Sense-and antisense-mediated gene silencing in tobacco is inhibited by the same viral suppressors and is associated with accumulation of small RNAs." Proceedings of the National Academy of Sciences 98.11 (2001): 6506-6510.
Diagnostic and Statistical Manual of Mental Disorders, 5th ed., DSM-5, American Psychiatric Association (2013) 1-13.
Diergaarde et al., "Pharmacological manipulation of memory reconsolidation: Towards a novel treatment of pathogenic memories." European journal of pharmacology 585.2-3 (2008): 453-457.
Digraham et al., "Ischaemic brain damage is still common in fatal non-missile head injury." Journal of neurology, neurosurgery & Psychiatry 52.3 (1989): 346-350.
Doench et al., "siRNAs can function as miRNAs." Genes & development 17.4 (2003): 438-442.
Doench et al., "Specificity of microRNA target selection in translational repression." Genes & development 18.5 (2004): 504-511.
Domingo-Fernandez et al., "PTSD Biomarker Database: Deep dive metadatabase for PTSD biomarkers, visualizations and analysis tools." Database (2019): 1-8.
Dorsett et al., "siRNAs: applications in functional genomics and potential as therapeutics." Nature reviews Drug discovery 3.4 (2004): 318-329.
Dostie et al., "Numerous microRNPs in neuronal cells containing novel microRNAs." Rna 9.2 (2003): 180-186.
Draghici S., "Statistical intelligence: effective analysis of high-density microarray data." Drug discovery today 7.11 (2002): S55-S63.
Dresios et al., "Cold stress-induced protein Rbm3 binds 60S ribosomal subunits, alters microRNA levels, and enhances global protein synthesis." Proceedings of the National Academy of Sciences 102.6 (2005): 1865-1870.
Dsouza et al., "Searching for patterns in genomic data." Trends in Genetics 13.12 (1997): 497-498.
Duensing et al., "Cyclin-dependent kinase inhibitor indirubin-3'-oxime selectively inhibits human papillomavirus type 16 E7-induced numerical centrosome anomalies." Oncogene 23.50 (2004): 8206-8215.
Dugas et al., "MicroRNA regulation of gene expression in plants." Current opinion in plant biology 7.5 (2004): 512-520.
Dunlop et al., "Assessing treatment-resistant posttraumatic stress disorder: The Emory treatment resistance interview for PTSD (E-Trip)." Behavioral Sciences 4.4 (2014): 511-527.
Dunoyer et al., "Probing the MicroRNA and small interfering RNA pathways with virus-encoded suppressors of RNA silencing." The Plant Cell 16.5 (2004): 1235-1250.
Duxbury et al., "Systemic siRNA-mediated gene silencing: a new approach to targeted therapy of cancer." Annals of surgery 240.4 (2004): 667-676.
Dykxhoorn et al., "Killing the messenger: short RNAs that silence gene expression." Nature reviews Molecular cell biology 4.6 (2003): 457-467.
Eddy S., "Computational genomics of noncoding RNA genes." Cell 109.2 (2002): 137-140.
Eddy S., "Non-coding RNA genes and the modern RNA world." Nature Reviews Genetics 2.12 (2001): 919-929.
Edwards et al., "Epstein-Barr virus BART microRNAs are produced from a large intron prior to splicing." Journal of virology 82.18 (2008): 9094-9106.
He et al., "siRNAs and miRNAs": A meeting report on RNA silencing. RNA (2004): 1165-1173.
He et al., "Lymphoma B cells evade apoptosis through the TNF family members BAFF/BLyS and APRIL." The Journal of Immunology 172.5 (2004): 3268-3279.
He et al., "MicroRNAs: small RNAs with a big role in gene regulation." Nature reviews genetics 5.7 (2004): 522-531.
Heetebrij et al., "Platinum (II)-Based Coordination Compounds as Nucleic Acid Labeling Reagents: Synthesis, Reactivity, and Applications in Hybridization Assays." Chembiochem 4.7 (2003): 573-583.
Hemming et al., "The stepped wedge cluster randomised trial: rationale, design, analysis, and reporting." Bmj 350 (2015): 1-7.
Henigsberg et al., "Neuroimaging research in posttraumatic stress disorder—Focus on amygdala, hippocampus and prefrontal cortex." Progress in Neuro-Psychopharmacology and Biological Psychiatry 90 (2019): 37-42.
Hershberg et al., "A survey of small RNA-encoding genes in *Escherichia coli*." Nucleic acids research 31.7 (2003): 1813-1820.
Hertzberg et al., "A preliminary study of lamotrigine for the treatment of posttraumatic stress disorder." Biological psychiatry 45.9 (1999): 1226-1229.
Hipfner et al., "The bantam gene regulates *Drosophila* growth." Genetics 161.4 (2002): 1527-1537.
Hobert O., "Common logic of transcription factor and microRNA action." Trends in biochemical sciences 29.9 (2004): 462-468.
Hobert O., "MicroRNAs: all gone and then what." Current Biology 15.10 (2005): R387-R389.
Hofacker et al., "Prediction of locally stable RNA secondary structures for genome-wide surveys." Bioinformatics 20.2 (2004): 186-190.
Holt et al., "Domain antibodies: proteins for therapy." Trends in biotechnology 21.11 (2003): 484-490.
Holway et al., "Systematic, RNA-interference-mediated identification of mus-101 modifier genes in Caenorhabditis elegans." Genetics 169.3 (2005): 1451-1460.
Hooper et al., "The search for a-secretase and its potential as a therapeutic approach to Alzheimer's disease." Current medicinal chemistry 9.11 (2002): 1107-1119.
Houbaviy et al., "Embryonic stem cell-specific MicroRNAs." Developmental cell 5.2 (2003): 351-358.
Howard et al., "Efficient stimulation of site-specific ribosome frameshifting by antisense oligonucleotides." Rna 10.10 (2004): 1653-1661.
Huang et al., "CPEC induces erythroid differentiation of human myeloid leukemia K562 cells through CTP depletion and p38 MAP kinase." Leukemia 18.11 (2004): 1857-1863.
Huang et al., "Homeostatic cell-cycle control by BLyS: Induction of cell-cycle entry but not G1/S transition in opposition to p18INK4c and p27Kip1." Proceedings of the National Academy of Sciences 101.51 (2004): 17789-17794.

(56) References Cited

OTHER PUBLICATIONS

Hughes et al., "Functional neuroimaging studies of post-traumatic stress disorder." Expert review of neurotherapeutics 11.2 (2011): 275-285.
Huhn et al., "Efficacy of pharmacotherapy and psychotherapy for adult psychiatric disorders: a systematic overview of meta-analyses." JAMA psychiatry 71.6 (2014): 706-715.
Human herpesvirus 4 complete wild type genome, XP002500227. Retrieved from EBI Database accession No. AJ507799 (2002).
Huppi et al., "Defining and assaying RNAi in mammalian cells." Molecular cell 17.1 (2005): 1-10.
Huse et al., "Generation of a large combinatorial library of the immunoglobulin repertoire in phage lambda." Science 246.4935 (1989): 1275-1281.
Huttenhofer et al., "RNomics: identification and function of small, non-messenger RNAs." Current opinion in chemical biology 6.6 (2002): 835-843.
Hutvagner et al., "A cellular function for the RNA-interference enzyme Dicer in the maturation of the let-7 small temporal RNA." Science 293.5531 (2001): 834-838.
Hutvagner et al., "A microRNA in a multiple-turnover RNAi enzyme complex." Science 297.5589 (2002): 2056-2060.
Hutvagner et al., "RNAi: nature abhors a double-strand." Current opinion in genetics & development 12.2 (2002): 225-232.
Hutvagner et al., "Sequence-specific inhibition of small RNA function." PLoS biology 2.4 (2004): 465-475.
Hydrocephalus and Shunts, Ausmed.com, Retrieved from the Internet: <URL: https://www.ausmed.com/cpd/articles/hydrocephalus-and-shunts> (2023): 1-6.
International Preliminary Report on Patentability in PCT/US2016/019523, mailed Sep. 5, 2017, 12 pages.
International Preliminary Report on Patentability in PCT/US2017/013881, mailed Jul. 24, 2018, 6 pages.
International Preliminary Report on Patentability in PCT/US2018/014387, mailed Jul. 23, 2019, 8 pages.
International Preliminary Report on Patentability in PCT/US2019/068592, mailed Jun. 16, 2021, 9 pages.
International Preliminary Report on Patentability in PCT/US2021/042315, mailed Oct. 4, 2022, 6 pages.
International Preliminary Report on Patentability in PCT/US2021/042351, mailed Oct. 28, 2022, 11 pages.
International Preliminary Report on Patentability in PCT/US2022/054049, mailed Jan. 24, 2024, 7 pages.
International Preliminary Report on Patentability in PCT/US2023/012940, mailed Apr. 2, 2024, 9 pages.
International Preliminary Report on Patentability in PCT/US2023/021974, mailed Nov. 7, 2024, 9 pages.
International Preliminary Report on Patentability in PCT/US2023/036432, mailed Apr. 29, 2025, 9 pages.
International Search Report and Written Opinion in PCT/US2016/019523, mailed Jun. 30, 2016, 15 pages.
International Search Report and Written Opinion in PCT/US2017/013881, mailed May 3, 2017, 9 pages.
International Search Report and Written Opinion in PCT/US2017/044452, mailed Nov. 2, 2017, 15 pages.
International Search Report and Written Opinion in PCT/US2018/014387, mailed Apr. 9, 2018, 11 pages.
International Search Report and Written Opinion in PCT/US2019/068592, mailed Apr. 24, 2020, 12 pages.
International Search Report and Written Opinion in PCT/US2021/041763, mailed Nov. 15, 2021, 15 pages.
International Search Report and Written Opinion in PCT/US2021/041772, mailed Nov. 17, 2021, 14 pages.
International Search Report and Written Opinion in PCT/US2021/042315, mailed Oct. 8, 2021, 10 pages.
International Search Report and Written Opinion in PCT/US2021/042351, mailed Oct. 25, 2021, 13 pages.
International Search Report and Written Opinion in PCT/US2022/047860, mailed Feb. 17, 2023, 8 pages.
Liriano et al., "Ketamine as treatment for post-traumatic stress disorder: a review." Drugs in context 8 (2019): 1-7.
Litinskiy et al., "DCs induce CD40-independent immunoglobulin class switching through BLyS and APRIL." Nature immunology 3.9 (2002): 822-829.
Liu et al., "An oligonucleotide microchip for genome-wide microRNA profiling in human and mouse tissues." Proceedings of the National Academy of Sciences 101.26 (2004): 9740-9744.
Liu et al., "Argonaute2 is the catalytic engine of mammalian RNAi." Science 305.5689 (2004): 1437-1441.
Liu et al., "Chimeric mouse-human IgG1 antibody that can mediate lysis of cancer cells." Proceedings of the National Academy of Sciences 84.10 (1987): 3439-3443.
Liu et al., "High-oleic and high-stearic cottonseed oils: nutritionally improved cooking oils developed using gene silencing." Journal of the american College of nutrition 21.sup3 (2002): 205S-211S.
Liu et al., "High-stearic and high-oleic cottonseed oils produced by hairpin RNA-mediated post-transcriptional gene silencing." Plant physiology 129.4 (2002): 1732-1743.
Liu et al., "Optogenetic stimulation of a hippocampal engram activates fear memory recall." Nature 484.7394 (2012): 381-385.
Llave et al., "Cleavage of Scarecrow-like mRNA targets directed by a class of *Arabidopsis* miRNA." Science 297.5589 (2002): 2053-2056.
Llave et al., "Endogenous and silencing-associated small RNAs in plants." The Plant Cell 14.7 (2002): 1605-1619.
Llave et al., "Virus-encoded suppressor of posttranscriptional gene silencing targets a maintenance step in the silencing pathway." Proceedings of the National Academy of Sciences 97.24 (2000): 13401-13406.
Lolle et al., "Genome-wide non-mendelian inheritance of extra-genomic information in *Arabidopsis*." Nature 434.7032 (2005): 505-509.
Loscher, W. "Basic pharmacology of valproate: a review after 35 years of clinical use for the treatment of epilepsy." CNS drugs 16.10 (2002): 669-694.
Lovett-Racke et al., "Silencing T-bet defines a critical role in the differentiation of autoreactive T lymphocytes." Immunity 21.5 (2004): 719-731.
Lu et al., "Adenovirus VA1 noncoding RNA can inhibit small interfering RNA and MicroRNA biogenesis." Journal of virology 78.23 (2004): 12868-12876.
Lu et al., "Characterization of small nontranslated polyadenylylated RNAs in vaccinia virus-infected cells." Proceedings of the National Academy of Sciences 93.5 (1996): 2037-2042.
Lu et al., "Modulation of angiogenesis with siRNA inhibitors for novel therapeutics." Trends in molecular medicine 11.3 (2005): 104-113.
Luciano et al., "RNA editing of a miRNA precursor." Rna 10.8 (2004): 1174-1177.
Lund et al., "Nuclear export of microRNA precursors." science 303.5654 (2004): 95-98.
Lutz, A. "Who joins the military? A look at race, class, and immigration status." Journal of Political & Military Sociology (2008): 167-188.
Ma et al., "Intrinsic direct repeats generate consistent post-transcriptional gene silencing in tobacco." The Plant Journal 31.1 (2002): 37-49.
Ma et al., "Structural basis for 5'-end-specific recognition of guide RNA by the A. fulgidus Piwi protein." Nature 434.7033 (2005): 666-670.
MacCallum et al., "Antibody-antigen interactions: contact analysis and binding site topography." Journal of molecular biology 262.5 (1996): 732-745.
Macdiarmid R., "RNA silencing in productive virus infections." Annu. Rev. Phytopathol. 43.1 (2005): 523-544.
Magruder et al., "The prevalence of PTSD across war eras and the effect of deployment on PTSD: A systematic review and meta-analysis." Psychiatric Annals 39.8 (2009): 778-788.
Mallory et al., "A viral suppressor of RNA silencing differentially regulates the accumulation of short interfering RNAs and micro-RNAs in tobacco." Proceedings of the National Academy of Sciences 99.23 (2002): 15228-15233.

(56) References Cited

OTHER PUBLICATIONS

Mallory et al., "HC-Pro suppression of transgene silencing eliminates the small RNAs but not transgene methylation or the mobile signal." The Plant Cell 13.3 (2001): 571-583.
Mallory et al., "MicroRNA control of PHABULOSA in leaf development: importance of pairing to the microRNA 5' region." The EMBO journal 23.16 (2004): 3356-3364.
Mallory et al., "MicroRNA regulation of NAC-domain targets is required for proper formation and separation of adjacent embryonic, vegetative, and floral organs." Current Biology 14.12 (2004): 1035-1046.
Mallory et al., "MicroRNAs: something important between the genes." Current opinion in plant biology 7.2 (2004): 120-125.
Maniataki et al., "Viroid RNA systemic spread may depend on the interaction of a 71-nucleotide bulged hairpin with the host protein VirP1." Rna 9.3 (2003): 346-354.
Mansfield et al., "MicroRNA-responsive 'sensor' transgenes uncover Hox-like and other developmentally regulated patterns of vertebrate microRNA expression." Nature genetics 36.10 (2004): 1079-1083.
Maquat L., "Nonsense-mediated mRNA decay: splicing, translation and mRNP dynamics." Nature reviews Molecular cell biology 5.2 (2004): 89-99.
Marillonnet et al., "In planta engineering of viral RNA replicons: efficient assembly by recombination of DNA modules delivered by Agrobacterium." Proceedings of the National Academy of Sciences 101.18 (2004): 6852-6857.
Markowitz et al., "Is exposure necessary? A randomized clinical trial of interpersonal psychotherapy for PTSD." American Journal of Psychiatry 172.5 (2015): 430-440.
Martens et al., "RNAi in Dictyostelium: the role of RNA-directed RNA polymerases and double-stranded RNase." Molecular biology of the cell 13.2 (2002): 445-453.
Martinez et al., "Single-stranded antisense siRNAs guide target RNA cleavage in RNAi." Cell 110.5 (2002): 563-574.
Masse et al., "Regulatory roles for small RNAs in bacteria." Current opinion in microbiology 6.2 (2003): 120-124.
Mathews et al., "Expanded sequence dependence of thermodynamic parameters improves prediction of RNA secondary structure." Journal of molecular biology 288.5 (1999): 911-940.
Mathews, D. "Using an RNA secondary structure partition function to determine confidence in base pairs predicted by free energy minimization." Rna 10.8 (2004): 1178-1190.
Mattick et al., "Small regulatory RNAs in mammals." Human molecular genetics 14 (2005): R121-R132.
Mattick et al., "The evolution of controlled multitasked gene networks: the role of introns and other noncoding RNAs in the development of complex organisms." Molecular biology and evolution 18.9 (2001): 1611-1630.
Mattick, J. "Challenging the dogma: the hidden layer of non-protein-coding RNAs in complex organisms." Bioessays 25.10 (2003): 930-939.
Mattick, J. "Non-coding RNAs: the architects of eukaryotic complexity." EMBO reports (2001): 986-991.
Mattick, J. "The hidden genetic program of complex organisms." Scientific American 291.4 (2004): 60-67.
Matzke et al., "Genetic analysis of RNA-mediated transcriptional gene silencing." Biochimica et Biophysica Acta (BBA)-Gene Structure and Expression 1677.1-3 (2004): 129-141.
Matzke et al., "RNA-based silencing strategies in plants." Current opinion in genetics & development 11.2 (2001): 221-227.
Matzke et al., "RNA: guiding gene silencing." Science 293.5532 (2001): 1080-1083.
Max et al., "The lifetime cost of injury." Inquiry (1990): 332-343.
McCaffrey et al., "RNA interference in adult mice." Nature 418.6893 (2002): 38-39.
Sackeim et al., "The benefits and costs of changing treatment technique in electroconvulsive therapy due to insufficient improvement of a major depressive episode." Brain stimulation 13.5 (2020): 1284-1295.
Sackeim et al., "The cognitive effects of electroconvulsive therapy in community settings." Neuropsychopharmacology 32.1 (2007): 244-254.
Sackeim, H. "Autobiographical memory and electroconvulsive therapy: do not throw out the baby." The journal of ECT 30.3 (2014): 177-186.
Saito et al., "Gene knockdown: RNA-interference is coming of age." Transfusion 45.1 (2005): 111-114.
Samuelson et al., "Neuropsychological functioning in posttraumatic stress disorder and alcohol abuse." Neuropsychology 20.6 (2006): 1-19.
Sanders et al., "The place of the hippocampus in fear conditioning." European journal of pharmacology 463.1-3 (2003): 217-223.
Sandsmark et al., "Sleep-wake disturbances after traumatic brain injury: synthesis of human and animal studies." Sleep 40.5 (2017): zsx044.
Sanz-Garcia et al., "Identifying causal relationships between EEG activity and intracranial pressure changes in neurocritical care patients." Journal of Neural Engineering 15.6 (2018): 1-10.
Sareen et al., "Anxiety disorders associated with suicidal ideation and suicide attempts in the National Comorbidity Survey." The Journal of nervous and mental disease 193.7 (2005): 450-454.
Saunders et al., "The dsRNA binding protein family: critical roles, diverse cellular functions." The FASEB Journal 17.9 (2003): 961-983.
Saxena et al., "Small RNAs with imperfect match to endogenous mRNA repress translation: implications for off-target activity of small inhibitory RNA in mammalian cells." Journal of Biological Chemistry 278.45 (2003): 44312-44319.
Scacheri et al., "Short interfering RNAs can induce unexpected and divergent changes in the levels of untargeted proteins in mammalian cells." Proceedings of the National Academy of Sciences 101.7 (2004): 1892-1897.
Scangos et al., "Closed-loop neuromodulation in an individual with treatment-resistant depression." Nature medicine 27.10 (2021): 1696-1700.
Schauer et al., "DICER-LIKE1: blind men and elephants in *Arabidopsis* development." Trends in plant science 7.11 (2002): 487-491.
Schein et al., "Prevalence of post-traumatic stress disorder in the United States: a systematic literature review." Current medical research and opinion 37.12 (2021): 2151-2161.
Scherr et al., "Stable RNA interference (RNAi) as an option for anti-bcr-abl therapy." Gene Therapy 12.1 (2005): 12-21.
Schiemann et al., "An essential role for BAFF in the normal development of B cells through a BCMA-independent pathway." Science 293.5537 (2001): 2111-2114.
Schisa et al., "Analysis of RNA associated with P granules in germ cells of C. elegans adults." Development 128.8 (2001): 1287-1298.
Schmittgen et al., "A high-throughput method to monitor the expression of microRNA precursors." Nucleic acids research 32.4 (2004): e43-e43.
Schmitz et al., "Hippocampal GABA enables inhibitory control over unwanted thoughts." Nature communications 8.1 (2017): 1-12.
Schneider et al., "Increased cortical gamma-aminobutyric acid precedes incomplete extinction of conditioned fear and increased hippocampal excitatory tone in a mouse model of mild traumatic brain injury." Journal of neurotrauma 33.17 (2016): 1614-1624.
Schneier et al., "Combined prolonged exposure therapy and paroxetine for PTSD related to the World Trade Center attack: a randomized controlled trial." American Journal of Psychiatry 169.1 (2012): 80-88.
Schnurr et al., "Longitudinal analysis of the relationship between symptoms and quality of life in veterans treated for posttraumatic stress disorder." Journal of consulting and clinical psychology 74.4 (2006): 707-713.
Schnurr et al., "Posttraumatic stress disorder and quality of life: Extension of findings to veterans of the wars in Iraq and Afghanistan." Clinical psychology review 29.8 (2009): 727-735.
Schouby Bock et al., "Clinical validation of the self-reported Glasgow Antipsychotic Side-effect Scale using the clinician-rated UKU side-effect scale as gold standard reference." Journal of Psychopharmacology 34.8 (2020): 820-828.

(56) References Cited

OTHER PUBLICATIONS

Schramke et al., "Hairpin RNAs and retrotransposon LTRs effect RNAi and chromatin-based gene silencing." Science 301.5636 (2003): 1069-1074.
Schubert et al., "Local RNA target structure influences siRNA efficacy: systematic analysis of intentionally designed binding regions." Journal of molecular biology 348.4 (2005): 883-893.
Schwabe et al., "Neural signature of reconsolidation impairments by propranolol in humans." Biological psychiatry 71.4 (2012): 380-386.
Schwarz et al., "Asymmetry in the assembly of the RNAi enzyme complex." Cell 115.2 (2003): 199-208.
Schwarz et al., "Why do miRNAs live in the miRNP." Genes & development 16.9 (2002): 1025-1031.
Scott et al., "Associations between lifetime traumatic events and subsequent chronic physical conditions: a cross-national, cross-sectional study." PloS one 8.11 (2013): 1-11.
Seggerson et al., "Two genetic circuits repress the Caenorhabditis elegans heterochronic gene lin-28 after translation initiation." Developmental biology 243.2 (2002): 215-225.
Seidenbecher et al., "Amygdalar and hippocampal theta rhythm synchronization during fear memory retrieval." Science 301.5634 (2003): 846-850.
Seitz et al., "A large imprinted microRNA gene cluster at the mouse Dlk1-Gtl2 domain." Genome research 14.9 (2004): 1741-1748.
Seitz et al., "Imprinted microRNA genes transcribed antisense to a reciprocally imprinted retrotransposon-like gene." Nature genetics 34.3 (2003): 261-262.
Semkovska et al., "Bitemporal versus high-dose unilateral twice-weekly electroconvulsive therapy for depression (EFFECT-Dep): a pragmatic, randomized, non-inferiority trial." American Journal of Psychiatry 173.4 (2016): 408-417.
Sempere et al., "Expression profiling of mammalian microRNAs uncovers a subset of brain-expressed microRNAs with possible roles in murine and human neuronal differentiation." Genome biology 5.3 (2004): 1-11.
Sempere et al., "Temporal regulation of microRNA expression in *Drosophila melanogaster* mediated by hormonal signals and broad-Complex gene activity." Developmental biology 259.1 (2003): 9-18.
Sen et al., "Argonaute 2/RISC resides in sites of mammalian mRNA decay known as cytoplasmic bodies." Nature cell biology 7.6 (2005): 633-636.
Sengupta P., "Taking sides in the nervous system with miRNA." Nature neuroscience 7.2 (2004): 100-102.
Serralta et al., "Effect of intracerebroventricular continuous infusion of valproic acid versus single ip and icv injections in the amygdala kindling epilepsy model." Epilepsy research 70.1 (2006): 15-26.
Shabalina et al., "The mammalian transcriptome and the function of non-coding DNA sequences." Genome biology 5.4 (2004): 1-8.
Shafer et al., "A consensus-based approach to patient safety in epilepsy monitoring units: recommendations for preferred practices." Epilepsy & Behavior 25.3 (2012): 449-456.
Shah et al., "Light-activated RNA interference." Angewandte Chemie International Edition 44.9 (2005): 1328-1332.
Shapiro, F. "Efficacy of the eye movement desensitization procedure in the treatment of traumatic memories." Journal of traumatic stress 2.2 (1989): 199-223.
Sharp, P. "RNA interference—2001." Genes & development 15.5 (2001): 485-490.
Shen et al., "Uridine addition after microRNA-directed cleavage." Science 306.5698 (2004): 997-997.
Sheynin et al., "Circuit dysregulation and circuit-based treatments in posttraumatic stress disorder." Neuroscience Letters 649 (2017): 133-138.
Shi et al., "Selection and characterization of RNA interference-deficient trypanosomes impaired in target mRNA degradation." Eukaryotic Cell 3.6 (2004): 1445-1453.
Shi, Y. "Mammalian RNAi for the masses." Trends in Genetics 19.1 (2003): 9-12.

Karlas et al., "Inhibition of porcine endogenous retroviruses by RNA interference: increasing the safety of xenotransplantation." Virology 325.1 (2004): 18-23.
Karube et al., "Reduced expression of Dicer associated with poor prognosis in lung cancer patients." Cancer science 96.2 (2005): 111-115.
Kasashima et al., "Altered expression profiles of microRNAs during TPA-induced differentiation of HL-60 cells." Biochemical and biophysical research communications 322.2 (2004): 403-410.
Kasschau et al., "P1/HC-Pro, a viral suppressor of RNA silencing, interferes with *Arabidopsis* development and miRNA function." Developmental cell 4.2 (2003): 205-217.
Katyal et al., "The relationship of triphasic waves with intracranial pressure as a possible prognostic marker in traumatic brain injury." Case reports in neurological medicine 2017.1 (2017): 1-4.
Kawasaki et al., "Hes1 is a target of microRNA-23 during retinoic-acid-induced neuronal differentiation of NT2 cells." Nature 423. 6942 (2003): 838-842.
Kawasaki et al., "Retraction: Hes1 is a target of microRNA-23 during retinoic-acid-induced neuronal differentiation of NT2 cells." Nature 426 (2003): 100.
Kawasaki et al., "Short hairpin type of dsRNAs that are controlled by tRNA Val promoter significantly induce RNAi-mediated gene silencing in the cytoplasm of human cells." Nucleic acids research 31.2 (2003): 700-707.
Kawasaki et al., "siRNAs generated by recombinant human Dicer induce specific and significant but target site-independent gene silencing in human cells." Nucleic acids research 31.3 (2003): 981-987.
Kawasaki et al., "World of small RNAs: from ribozymes to siRNA and miRNA." Differentiation 72.2-3 (2004): 58-64.
Kazdin A., "Mediators and mechanisms of change in psychotherapy research." Review of Clinical Psychology 3.1 (2007): 1-27.
Keck Jr et al., "Valproate and carbamazepine in the treatment of panic and posttraumatic stress disorders, withdrawal states, and behavioral dyscontrol syndromes." Journal of Clinical psychopharmacology 12.1 (1992): 36S-41S.
Keck Jr et al., "Valproate treatment of panic disorder and lactate-induced panic attacks." Biological Psychiatry 33.7 (1993): 542-546.
Kelmendi et al., "PTSD: from neurobiology to pharmacological treatments." European journal of psychotraumatology 7.1 (2016): 1-12.
Kennerdell et al., "Heritable gene silencing in Drosophila using double-stranded RNA." Nature biotechnology 18.8 (2000): 896-898.
Kent et al., "Conservation, regulation, synteny, and introns in a large-scale C. briggsae-C. elegans genomic alignment." Genome research 10.8 (2000): 1115-1125.
Kent et al., "RNAi: running interference for the cell." Organic & biomolecular chemistry 2.14 (2004): 1957-1961.
Kent W., "BLAT—the BLAST-like alignment tool." Genome research 12.4 (2002): 656-664.
Kessler et al., "Posttraumatic stress disorder in the National Comorbidity Survey." Archives of General Psychiatry 52.12 (1995):1048-1060.
Kessler et al., "Probing the role of compartmentation of glycolysis in procyclic form Trypanosoma brucei: RNA interference studies of PEX14, hexokinase, and phosphofructokinase." Journal of Biological Chemistry 280.10 (2005): 9030-9036.
Ketting et al., "Dicer functions in RNA interference and in synthesis of small RNA involved in developmental timing in C. elegans." Genes & development 15.20 (2001): 2654-2659.
Khvorova et al., "Functional siRNAs and miRNAs exhibit strand bias." Cell 115.2 (2003): 209-216.
Kida S., "Reconsolidation/destabilization, extinction and forgetting of fear memory as therapeutic targets for PTSD." Psychopharmacology 236.1 (2019): 49-57.
Kidner et al., "Spatially restricted microRNA directs leaf polarity through ARGONAUTE1." Nature 428.6978 (2004): 81-84.
Kidner et al., "The developmental role of microRNA in plants." Current opinion in plant biology 8.1 (2005): 38-44.

(56) References Cited

OTHER PUBLICATIONS

Kim et al., "Identification of many microRNAs that copurify with polyribosomes in mammalian neurons." Proceedings of the National Academy of Sciences 101.1 (2004): 360-365.
Kim et al., "Stress effects on the hippocampus: a critical review." Learning & memory 22.9 (2015): 411-416.
Kim et al., "Synthetic dsRNA Dicer substrates enhance RNAi potency and efficacy." Nature biotechnology 23.2 (2005): 222-226.
Kim V., "MicroRNA biogenesis: coordinated cropping and dicing." Nature reviews Molecular cell biology 6.5 (2005): 376-385.
Kim V., "MicroRNA precursors in motion: exportin-5 mediates their nuclear export." Trends in cell biology 14.4 (2004): 156-159.
Kiriakidou et al., "A combined computational-experimental approach predicts human microRNA targets." Genes & development 18.10 (2004): 1165-1178.
Kittler et al., "An endoribonuclease-prepared siRNA screen in human cells identifies genes essential for cell division." Nature 432.7020 (2004): 1036-1040.
Klahre et al., "High molecular weight RNAs and small interfering RNAs induce systemic posttranscriptional gene silencing in plants." Proceedings of the National Academy of Sciences 99.18 (2002): 11981-11986.
Klein et al., "RSEARCH: finding homologs of single structured RNA sequences." BMC bioinformatics 4.1 (2003): 1-16.
Knott et al., "Transgenic RNA interference reveals role for mouse sperm phospholipase C? in triggering Ca2+ oscillations during fertilization." Biology of reproduction 72.4 (2005): 992-996.
Komano et al., "Inhibiting the Arp2/3 complex limits infection of both intracellular mature vaccinia virus and primate lentiviruses." Molecular biology of the cell 15.12 (2004): 5197-5207.
Kondziella et al., "Continuous EEG monitoring in aneurysmal subarachnoid hemorrhage: a systematic review." Neurocritical care 22.3 (2015): 450-461.
Konforti B., "The news and you." Nature structural biology 10.3 (2003): 1-1.
Koziczak et al., "Cooperation between fibroblast growth factor receptor-4 and ErbB2 in regulation of cyclin D1 translation." Journal of Biological Chemistry 279.48 (2004): 50004-50011.
Krediet et al., "Reviewing the potential of psychedelics for the treatment of PTSD." International Journal of Neuropsychopharmacology 23.6 (2020): 385-400.
Krek et al., "Combinatorial microRNA target predictions." Nature genetics 37.5 (2005): 495-500.
Krichevsky et al., "A microRNA array reveals extensive regulation of microRNAs during brain development." Rna 9.10 (2003): 1274-1281.
Krol et al., "Structural features of microRNA (miRNA) precursors and their relevance to miRNA biogenesis and small interfering RNA/short hairpin RNA design." Journal of Biological Chemistry 279.40 (2004): 42230-42239.
Krugers et al., "Chronic stress effects on hippocampal structure and synaptic function: relevance for depression and normalization by anti-glucocorticoid treatment." Frontiers in synaptic neuroscience 2 (2010): 24.
Krutzfeldt et al., "Silencing of microRNAs in vivo with 'antagomirs'." nature 438.7068 (2005): 1-5.
Krysinska et al., "Post-traumatic stress disorder and suicide risk: a systematic review." Archives of suicide research 14.1 (2010): 1-23.
Krystal et al., "Adjunctive risperidone treatment for antidepressant-resistant symptoms of chronic military service-related PTSD: A randomized trial." Jama 306.5 (2011): 493-502.
Kuhn et al., "Gray matter correlates of posttraumatic stress disorder: a quantitative meta-analysis." Biological psychiatry 73.1 (2013): 70-74.
Kurihara et al., "*Arabidopsis* micro-RNA biogenesis through Dicer-like 1 protein functions." Proceedings of the National Academy of Sciences 101.34 (2004): 12753-12758.
Kuwabara et al., "A small modulatory dsRNA specifies the fate of adult neural stem cells." Cell 116.6 (2004): 779-793.

\* cited by examiner

MEDICAL SYSTEM INCLUDING TWO ACCESS PORTS

RELATED APPLICATIONS

This application claims the benefit of U.S. Provisional Patent Application No. 63/052,284, filed on Jul. 15, 2020, and U.S. Provisional Patent Application No. 63/209,835, filed on Jun. 11, 2021, which provisional patent applications are hereby incorporated herein by reference in their respective entireties to the extent that they do not conflict with the disclosure presented herein.

FIELD

The present disclosure relates to, among other things, medical systems, such as devices for delivering fluid to cerebrospinal fluid (CSF), withdrawing fluid from CSF, or delivering fluid to CSF and withdrawing fluid from CSF.

INTRODUCTION

Delivery of therapeutic agents to the central nervous system (CNS) and treatment of diseases of the CNS present challenges. For example, many therapeutic agents are not able to reach the CNS at therapeutic concentrations when administered through traditional routes due to the difficulty of crossing the blood-brain-barrier (BBB). In addition, systemic concentrations of therapeutic agents, or metabolites or degradation products thereof, may be undesirably high to achieve therapeutic levels in the CNS when therapeutic agents that do cross the BBB are systemically administered, for instance orally or vascular injection.

Some devices and therapies have been developed to administer therapeutic agents to CSF to address some of these challenges. Such devices and therapies have typically been configured to deliver a bolus of therapeutic agent to a cerebral ventricle or to chronically administer the therapeutic agent to intrathecal space of the spinal canal. Such approaches have shortcomings for treatment of diseases of the brain. For example, such approaches lack the ability to achieve adequate spatial and temporal exposure of a therapeutic agent. Bolus administration of a therapeutic agent may not provide consistent, distributed, or therapeutically effective concentrations of the therapeutic agent, and intrathecal administration may not provide for sufficiently high concentrations of therapeutic agent in the brain due to, for example, gravitational forces and relatively limited CSF circulation in and near the spinal column.

Monitoring of a state a disease, subject, or therapy, such as concentrations of therapeutic agents in the brain, may also present challenges. For example, accurate estimates of concentrations of therapeutic agents in the brain may not always be readily achieved through routine blood or urine analysis. In addition, withdrawing CSF to obtain more accurate estimates of central therapeutic agent concentrations is invasive and may present risks.

For those therapies that include direct intracerebral ventricular delivery of therapeutic agents through, for example, an implantable infusion pump or port, CSF may be withdrawn through a catheter configured to deliver the therapeutic agent to the CSF from the pump or port. However, withdrawing CSF through the same lumen of a catheter that has been used to deliver therapeutic agent may not provide a clean sample of CSF. That is, the CSF may include therapeutic agent that was present in the lumen of the catheter and thus may not provide for accurate estimates of concentration of the therapeutic agent in the CSF. In addition, the CSF or the components of the CSF that may be measured may interact with the material defining the lumen of the catheter, which may adversely affect subsequent delivery of the therapeutic agent. Furthermore, withdrawing CSF through the same lumen of the catheter that has been used to delivery therapeutic agent requires an interruption in the delivery of the therapeutic agent. The interruption of delivery can lead to cessation of therapy and other substantial consequences.

The use of separate catheters or separate lumens of a catheter for delivering therapeutic agents to the cerebral ventricles and for withdrawing CSF from the cerebral ventricles has been proposed. However, designing and manufacturing devices, such as access ports, that may couple to two or more catheters or a catheter having more than one lumen for delivering fluid to or from cerebral ventricles presents challenges, particularly if the devices are configured to be implanted under the scalp or skin of a subject. For example, a subject, such as a human patient, may tolerate a limited height of a device, such as a port that is coupled to the catheter or catheters, above the skull when the device is implanted under the scalp. In addition, devices implanted under the scalp or skin should have an external shape and profile configured to minimize erosion of the skin and patient discomfort and facilitate safe and efficient surgical implantation. An additional challenge relates to ensuring a secure connection between catheters and the devices to which they are connected. For example, it may be difficult to couple a catheter to an access port after the port is positioned in a subject. Further challenges relate to reproducible access to the implanted port. For example, proper positioning of the port should be maintained to ensure repeated access through the skin of a subject over extended periods of time. Such challenges result from the limited space available for such devices to be implanted, multifunctionality of the devices, and the need for secure connection between a catheter and the access port. In addition, catheters permitting efficient and proper surgical placement are also currently lacking.

In addition, the ability to determine whether a subject may respond to therapy that involves direct CNS administration of an agent, such as administration to a CSF-containing space, is limited. Complex surgery may be required to administer even a single dose, particularly if the administration is intracerebroventricular (ICV). It may be desirable to ensure that delivery of an agent to the CSF, such as with ICV-based therapy, is effective before subjecting the subject to further surgical procedures and treatments.

SUMMARY

The present disclosure relates to, among other things, medical systems, such as devices for delivering fluid to cerebrospinal fluid (CSF), withdrawing fluid from CSF, or delivering fluid to cerebral ventricles and withdrawing fluid from CSF. The system comprises a first implantable access and infusion port having separate fluid pathways for introducing and withdrawing fluid from a CSF-containing space of a subject in which the first port is implanted. The system may further comprise a second infusion port that is positioned a distance from the first port. The second port may be implantable or may be configured to be external to the subject. A port catheter couples the second port to the infusion pathway of the first port.

The second port may be placed at a location to allow convenient access for introduction of therapeutic fluid into the CSF-containing space of the subject. For example, the second port may be located in proximity to the subject's ear ("auricular") or in proximity to the subject's clavicle ("clavicular"). The second port may be configured to be implanted subcutaneously on the skull in proximity to an ear or in implanted subcutaneously in proximity to a clavicle.

The second port may be used to introduce a fluid to a CSF-containing space via the first port. The fluid may be a therapeutic fluid. The second port may be used to deliver the therapeutic fluid until the therapy is determined to be effective. For example, the second port may be used to determine an appropriate therapeutic agent for use in the therapeutic fluid, an appropriate dose range, or the like. Once the therapy is determined effective, an infusion device may be operatively coupled to the first port to deliver the therapeutic fluid to the CSF-containing space. The second port may be replaced with the infusion device. Alternatively, the second port and the infusion device may both be operatively coupled with the first port.

Some therapies involve periodic, rather than continuous, infusion of therapeutic fluid. For such therapies, the second port may be used to chronically deliver periodic infusions of the therapeutic fluid to a CSF-containing space via the first port.

Some therapies involve infusion of more than one therapeutic fluid. For such therapies, an infusion device operatively coupled to the first port may be used to deliver a first therapeutic fluid to a CSF-containing space via the first port, and the second port may be used deliver a second a second therapeutic fluid to the CSF-containing space via the first port. The second port may be used to deliver auxiliary therapeutic fluids, to treat symptoms that may arise during infusion of the first therapeutic fluid, or the like.

In some aspects described herein, a system comprises a first port, one or more CSF catheters, a second port, and a port catheter. The first port comprises a first fluid pathway and a second fluid pathway. The first fluid pathway is configured for withdrawal of CSF from a CSF-containing space, the second fluid pathway is configured to introduce fluid to the CSF-containing space. The one or more CSF catheters comprise a first lumen and a second lumen. The first lumen is in fluid communication with, or is configured to be placed in fluid communication with, the first fluid pathway. The second lumen is in fluid communication with, or is configured to be placed in fluid communication with, the second fluid pathway. The one or more CSF catheters comprise a first distal opening and a second distal opening. The first distal opening is in fluid communication with the first lumen and is configured to be placed in a CSF-containing space. The second distal opening is in fluid communication with the second lumen and in configured to be placed in the CSF-containing space. The second port comprises a third fluid pathway. The port catheter is configured to operatively couple the first and second ports by operatively coupling the third fluid pathway of the second port to the second fluid pathway of the first port.

The first port may be configured to be implanted in any suitable location of a subject. For example, the first port may be implanted in proximity to a skull. In some embodiments, at least a portion of the first port is configured to be implanted in a burr hole in the skull. In some embodiments, at least a portion of the first port is configured to be affixed to the skull using fasteners, such as cranial screws. In some embodiments, at least a portion of the first port is configured to be implanted in a burr hole in the skull and at least a portion of the first port is configured to be affixed to the skull using fasteners.

Also disclosed herein are methods of treating, monitoring, or treating and monitoring a disease or state of a subject using the systems described herein.

The details of one or more aspects of the disclosure are set forth in the accompanying drawings and the description below. Other features, objects, and advantages of the techniques described in this disclosure will be apparent from the description and drawings, and from the claims.

Figure 1:
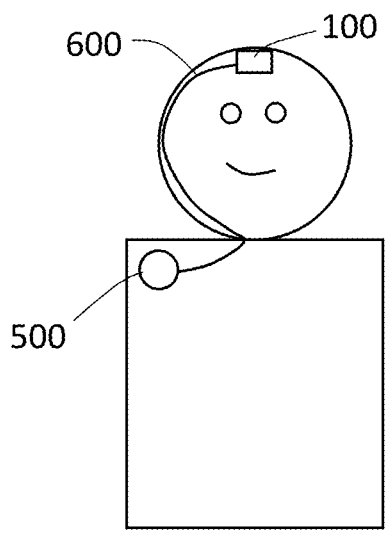
FIGS. 1-4 are schematic illustrations of some components of embodiments of systems described herein.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

Like numbers used in the figures refer to like components and steps. However, it will be understood that the use of a number to refer to a component in a given figure is not intended to limit the component in another figure labeled with the same number. In addition, the use of different numbers to refer to components in different figures is not intended to indicate that the different numbered components cannot be the same or similar to other numbered components.

DETAILED DESCRIPTION

The present disclosure relates to, among other things, medical systems, such as devices for delivering fluid to a cerebrospinal fluid (CSF)-containing space, withdrawing CSF from the CSF-containing space, or delivering fluid to, and withdrawing CSF from, the CSF-containing space. The system comprises a first implantable access and infusion port having separate fluid pathways for introducing and withdrawing fluid from a CSF-containing space, such as an intrathecal space, a cisterna magna, a subarachnoid space, or a cerebral ventricle, of a subject in which the first port is implanted. The system further comprises a second infusion port. A port catheter may couple the second port to the infusion pathway of the first port.

The first port comprises two separate and distinct fluid pathways. The first fluid pathway may be used to withdraw CSF fluid from a CSF-containing space. The second pathway may be used to introduce fluid, such as therapeutic fluid, to the CSF-containing space or to another location of the subject. Preferably, the second pathway is used to introduce fluid to the CSF-containing space.

The first port may comprise a housing. The housing may define an exterior surface of the port. The housing may be formed from one or more parts. As an example, different parts of the housing may be secured relative to one another by threaded engagement, snap fit engagement, interference fit engagement, may be welded, adhered, or otherwise bonded to one another, or the like, or combinations thereof. Preferably, different parts of the housing are connected to one another in a fluid tight manner. Preferably, different parts of the housing are welded together.

The housing of the first port may comprise any suitable material. For example, the housing of the first port may be formed from one or more of a metallic material, a plastic material, a ceramic material, and a glass material. For example, the housing may comprise one or more of a high performance thermoplastic or relatively rigid plastic material, such as polyurethane, polycarbonate, polysulfone, polyether ether ketone (PEEK), nylon, and Ultra High Molecular Weight Polyethylene (UHMWPE); and a biocompatible metal, such as a stainless steel alloy, titanium, and nitinol. Preferably, the material is compatible with magnetic resonance imaging (MRI). Preferably, the housing comprises a biocompatible material or comprises an exterior biocompatible coating.

In some embodiments, the first port is configured to be implanted in proximity to a skull of the subject. In some embodiments, at least a portion of the first port is implanted in a burr hole in the skull. The port may comprise an upper flange portion and a lower portion. The lower portion may be sized and shaped to be disposed within the burr hole. Accordingly, the size and shape of the lower portion may vary depending on the size and shape of the burr hole. Preferably, the clearance between an exterior side surface of the lower portion and the skull is small when the lower portion is positioned in the burr hole. Smaller clearances between the exterior side surface of the lower portion and the burr hole allow may maximize volume of the device and may improve stability of the port relative to the skull. Improved stability may be manifest in less movement of the port relative to the skull.

A bottom major surface of the lower portion preferably does not extend beyond, or does not extend substantially beyond, the bottom of the burr hole.

The upper flange portion is preferably configured to rest on a skull of a subject above the burr hole. For purposes of this disclosure, the upper flange portion will be considered to rest on the skull if one or more intervening structures are placed between the bottom of the upper flange portion and the skull. The upper flange portion preferably has a width greater than the burr hole so that the upper flange portion may rest on the skull above the burr hole when the lower portion is positioned in the burr hole. Accordingly, the upper flange portion preferably has a width greater than the lower portion. In some embodiments, the upper flange is affixed to the skull using fasteners, such as cranial screws.

The upper flange portion may have a top surface and a bottom surface. The bottom surface of the upper flange portion may laterally extend relative to the lower portion. The bottom surface of the upper flange portion may be annular. The bottom surface of the upper flange portion may be generally flat ("generally flat" includes slightly curved to approximate curvature of the skull). The bottom surface may be generally flat and annular.

The top surface of the upper flange portion may have any suitable shape. Preferably, the top surface or the transition from a side surface to the top surface has no sharp edges. In some embodiments, the top surface of the housing has a generally convex shape.

In some embodiments, the bottom surface of the upper flange portion of the housing is generally flat and annular and the top surface is generally convex.

In some embodiments, the thickness or height of the upper flange portion increases moving from an outer edge of the upper flange portion towards the center the upper flange portion. The first port may comprise a housing.

In some embodiments, first port comprises a sleeve configured to cover one or more portions of the housing. The sleeve may be formed from one or more materials that are softer, more compliant, or softer and more compliant than the housing. The sleeve may be formed from any suitable material or materials. For example, the sleeve may comprise one or more of silicone and a thermoplastic elastomer. The sleeve is preferably biocompatible. The sleeve may be coated with or comprise a lubricious material, such as a hydrogel. The sleeve may serve to absorb impact that may occur to the patient's skin over the first port, which may reduce potential damage to the port or the patient. The sleeve may serve to reduce tissue erosion over time, particularly if the sleeve is formed from lubricious material or a material that is softer or more compliant than the housing. The sleeve may comprise one or more antimicrobial agent, such as antimicrobial silver and antibiotics. For example, the sleeve may be impregnated with one or antibiotics, such as minocycline and rifampin.

The first and second fluid pathways of the first port may be configured in any suitable manner. Preferably, the first and second fluid pathways each extend within an interior of the housing. For example, the first fluid pathway may extend from a first inlet in the housing to a first outlet in the housing, and the second fluid pathway may extend from a second inlet in the housing to a second outlet in the housing.

The fluid flow paths may be formed in any suitable manner and form any suitable material or materials. The fluid flow paths, or portions thereof, may comprise passageways formed from one or more parts. In some examples, the passageway is formed from a lumen within tubing. In some examples, the passageway is formed from a channel in a solid part that is coupled to a second part to enclose the passageway. In some embodiments, the fluid pathways are formed by the housing. For example, the fluid pathways may be formed in a mold of the housing, micromachined in a component of the housing, may be formed by void spaced generated by assembling components of the housing, or the like. Preferably, the material lining the interior of the fluid pathway is compatible with fluid that flows through the pathway, such as a fluid containing a therapeutic agent or CSF. Preferably, the therapeutic agent or excipients or CSF do not sorb to or react with the material defining the fluid pathways. For purposes of the present disclosure, "sorb" refers to one or both of adsorb and absorb.

The structural material forming the fluid pathways may be compatible with the fluid or the structural material may be coated with a compatible material.

Any suitable material or materials may define the fluid pathways of the implantable cranial medical device. In some embodiments, the material defining the fluid pathways comprises one or more of metallic material, polymeric material, ceramic material, or glass material. For example, the material defining the fluid pathways may comprise one or more of a high performance thermoplastic or relatively rigid plastic material, such as polyurethane, polycarbonate, polysulfone, PEEK, nylon, and UHMWPE; and a biocompatible metal, such as a stainless steel alloy, titanium, and nitinol.

The first pathway extends from a first inlet to a first outlet of the first port. The first inlet may be configured to receive a needle. Preferably, the first port is implanted such that the first inlet is accessible by the needle when the needle is inserted through the skin of the subject. For example, the first port may be implanted such that the first inlet is implanted subcutaneously, and the needle may percutaneously access the first inlet. The first inlet is preferably configured to receive and engage the needle such that the needle may be used to aspirate CSF through the first fluid pathway.

The first port may comprise a self-sealing septum disposed across the first inlet. The septum may allow a percutaneously inserted needle to enter the inlet and may seal once the needle is withdrawn. The self-sealing septum may be made of any suitable material or materials. For example, the self-sealing septum may be formed from an elastomeric material. The self-sealing septum may comprise silicone, a polyethylene, or the like, and combinations thereof.

The first inlet may be tapered or comprise one or more tapered components, such as a ferrule, to guide the needle into proper position and fit in the inlet. The tapered nature of the inlet may accommodate needles of a variety of sizes. For example, a ferrule or funnel-shaped inlet may accommodate needles with a range of sizes from about 16 gauge to about 25 gauge, such as from about 18 gauge to about 22 gauge. The gauge of needle employed may vary depending on the material introduced or withdrawn from the port. For example, a smaller gauge needle may be more desirable for more viscous fluids of fluids containing larger molecules or particles, such as cells or proteins.

Preferably, port is configured to receive non-coring needles, such as Huber needles or butterfly needles. Non-coring needles may be designed with a deflected or offset 'B' bevel point. Such a tip has the advantage of parting rather than cutting a plug from or coring the septum and may create a more comfortable injection. Using a non-coring needle, such as a Huber needle, may preserve the integrity of the septum and may prevent a plug of septum material from being cut and passed into the CSF.

The first inlet may comprise a seal, such as an O-ring or the like, to sealingly engage an outer surface of the needle when the needle is received in the inlet. Preferably, a sufficient seal is created to allow a relative negative pressure in the first passageway to cause CSF to flow into the needle received in the first inlet.

The first port may comprise a port catheter connector. The port catheter connector may be configured to couple to a catheter configured to operatively couple the first and second ports (a "port" catheter). The port catheter connector preferably defines the second inlet. The first port may comprise one or more CSF catheter connectors. The one or more CSF catheter connectors may be configured to couple to a catheter configured to extend from the first port to a CSF-containing location of a subject (a "CSF" catheter). The one or more CSF catheter connector preferably define the first and second outlets. Preferably, the CSF catheter connector is configured to couple to a CSF multi-lumen catheter having a first lumen and a second lumen. When connected to the CSF catheter connector, the first lumen is placed in fluid communication with the first fluid pathway, and the second lumen is placed in fluid communication with the second fluid pathway.

A catheter connector (e.g. port catheter connector or CSF catheter connector) may be coupled to a catheter (e.g., port catheter or CSF catheter) in any suitable manner. For example, the catheter and the catheter connector may comprise quick-release couplings, luer lock fittings, snap connect couplings, or the like. In some examples, the catheter is configured to be coupled to the catheter connector via interference fit. The catheter connector may comprise a fitting, which may comprise external barbs, configured to be inserted into a lumen of the catheter to retain the catheter relative to the catheter connector and to place the lumen of the catheter in fluid communication with an appropriate fluid pathway of the first port.

In some embodiments, a catheter connector comprises a first portion of a compression fitting and a second portion of the compression fitting is placed over the catheter. Connecting the first and second portion of the compression fitting may compress the catheter to secure the catheter to the catheter connector. For example, the compression fitting may cause the catheter to compress against external barbs. The second portion of the compression fitting may comprise a compression ferrule and a connection element to connect to the first portion of the fitting on the catheter connector.

In some embodiments, the one or more CSF catheters are coupled to the first port by a manufacturer. In some embodiments, the one or more CSF catheters are coupled to the first port prior to implanting the one or more CSF catheters. In some embodiments, the one or more CSF catheters are coupled to the first port after the one or more CSF catheters are implanted (i.e., after a distal portion of a CSF catheter is placed in the CSF-containing space). A CSF catheter may be permanently or reversibly coupled to the CSF catheter connector.

At least one lumen (the "first lumen") of at least CSF catheter may be placed in fluid communication with a subject's CSF such that CSF may be withdrawn from a CSF-containing space through the first pathway of the first port. In some embodiments, first and second lumens of one or more CSF catheters are placed in fluid communication with a CSF-containing space of a subject such that fluid may be withdrawn from and introduced to the CSF-containing space. The CSF catheter or catheters are preferably configured such that fluid may be withdrawn from or delivered to the CSF-containing space through the first and second pathways of the first port, respectively, without interference or mixing of the fluids that are being withdrawn from or delivered to the CSF-containing space through the other of the first and second pathways. In some embodiments, the CSF catheter or catheters are configured such that the first lumen may be used to withdraw CSF-containing fluid and a second lumen may be used to deliver fluid to tissue other than a CSF-containing space, such as brain parenchyma. Preferably, the CSF catheter or catheters are configured such that the second lumen delivers fluid to the CSF-containing space.

Preferably, the one or more CSF catheters are configured such that the first lumen may be placed in fluid communication with a cerebral ventricle, such as a lateral ventricle. Preferably, the one or more CSF catheters are configured such that the second lumen may be placed in fluid communication with a cerebral ventricle, such as a lateral ventricle.

Preferably, the CSF catheter is a dual lumen catheter in which the first and second lumens are configured to be placed in fluid communication with a cerebral ventricle, such as a lateral ventricle.

A CSF catheter may have any suitable length to extend from a location in which the first port is implanted to a CSF-containing location of the subject. For example, if the first port is implanted in proximity to a skull of the subject and the CSF catheter is configured to extend to a lateral cerebral ventricle, the CSF catheter may have a length from about 55 millimeters to about 80 millimeters, such as from about 60 millimeters to about 70 millimeters, or from about 62 millimeters to about 68 millimeters.

The CSF catheter may have any suitable outer diameter. Preferably, the outer diameter is from about 2 mm to about 4 mm, such as from about 2 mm to about 3 mm, or from about 2 mm to about 2.5 mm.

Preferably, the CSF catheter comprises two lumens. The two lumens may be oriented in any suitable manner. For example, the two lumens may be concentric, such as a lumen within a lumen (or catheter within a catheter) or may be side-by-side. Preferably, the outer surface of the brain catheter has a substantially circular cross-sectional shape.

The CSF catheter may comprise an inner wall running along the length of the catheter. The inner wall may separate the two lumens of the CSF catheter. The CSF catheter may comprise two semicircular (or D-shaped) cross-sectional shaped lumens running along the length of the catheter. The semicircular lumens may be of any suitable size. For example, the inner dimension of the semicircular lumens at their largest width may be in a range from about 0.9 millimeters to about 1.5 millimeters, such as from about 1.1 millimeters to about 1.5 millimeters, or from about 1.2 millimeters to about 1.4 millimeters. The inner dimension of the semicircular lumens at their smallest width may be in a range from about 0.4 millimeters to about 0.7 millimeters, such as from about 0.5 millimeters to about 0.6 millimeters, or from about 0.55 millimeters to about 0.6 millimeters. The inner dimensions of the first and second lumens may be the same or different. Preferably, the inner diameter of the first and second lumen are the same or substantially the same (e.g., do not vary by more than 10%).

The CSF catheter may comprise any suitable material. The material is preferably biocompatible and compatible with a therapeutic fluid that may be delivered through a lumen of the catheter. The material is preferably biocompatible and compatible with CSF that may be flow through a lumen of the catheter. Preferably, the material is biodurable. A biodurable material is a material that is compositionally and structurally stable for extended periods of time in a biological environment. Products made from such materials should not exhibit substantial breakdown, degradation, erosion, or deterioration of mechanical properties relevant to their employment when exposed to biological environments for periods of time commensurate with the use of the implantable device. An intended biological environment can be understood to be in vivo, i.e., associated with an implantable device in a patient. The period of implantation of a CSF catheter described herein may be weeks, months, or years. For example, a CSF catheter may be made from materials that are biodurable for at least 29 days, such as at least one year, at least three years, or at least five years.

Any suitable homopolymer, copolymer, blends of polymers or combinations of polymers may be used to form the CSF catheter. Preferably, the polymers used to make the catheters are flexible during both fabrication and assembly. Preferably, the CSF catheters are formed from materials that result in a flexible and soft catheter during its in vivo implantation period.

Preferably, the chemical composition and molecular structure is selected so that the catheter materials are flexible and soft but still remain biodurable and resist substantial breakdown, degradation, erosion, or deterioration of mechanical properties when exposed to therapeutic agents or excipients delivered over extended periods of time. Flexibility and softness are characteristics that tend to cause a catheter to lack biodurability and long-term compatibility in oxidative, hydrolytic, and body fluid contact environments. Accordingly, the choice of polymers should be carefully selected to achieve sufficient compatibility with the therapeutic agent and excipients, biodurability, flexibility, and softness.

Depending on compatibility with the therapeutic agent and excipients to be employed, the CSF catheter may comprise cross-linked silicone, which may form flexible catheters. The glass transition temperature (Tg) of cross-linked silicone may depend on the cross-link density. In some embodiments, the brain catheter may comprise cross-linked silicone having a Tg below −40° C., such as below −90° C. In some instances, components of therapeutic fluids may interact with a cross-linked silicone catheter. In some instances, components of therapeutic fluids may leach or extract components or parts of a cross-linked silicone catheter. Swelling and leaching or extraction may affect the biodurable nature of soft and flexible cross-linked silicone and its capability to maintain dimensions or wall thickness and structure to provide multiple stable fluid paths over extended periods of time.

In some embodiments, a CSF catheter comprises polyurethane. Preferably, the CSF catheter comprising polyurethane resists degradation in oxidative, hydrolytic, and body fluid contact environments. The polyurethane may comprise biostable hard and soft segments. The polyurethane may comprise a higher hard segment content. Such polyurethanes may resist degradation in oxidative, hydrolytic, and enzymatic changes under physiological conditions and body fluid contact. In some embodiments, the CSF catheter comprises a polyurethane containing hard and soft segments that are formed by reacting a diol or polyol (an alcohol with more than two reactive hydroxyl groups per molecule) with a diisocyanate or a polymeric isocyanate in the presence of suitable catalysts and additives. The isocyanates (sometime chain extended with diols) form the hard segments and the polyols form the soft segments, with the segments linked by the urethane bonds formed from the reaction between the polyols and diisocyanate.

In some embodiments, the hard segment of the polyurethane comprises of an aromatic isocyanate. In some embodiment, the hard segment of the polyurethane comprises an aliphatic isocyanate. Preferably, the hard segment comprises an aromatic isocyanate as.

In some embodiments, the soft segment of the polyurethane comprises of a polyether. In some embodiments, the soft segment of the polyurethane comprises of a polycarbonate. The soft segment may provide suitable flexibility for use in single lumen catheters and multi-lumen catheters.

In some embodiments, a CSF catheter comprises a polyurethane that is semi-crystalline with higher hardness. The semi-crystalline nature of the polyurethane polymers makes them resistant to swelling and leaching when in contact with CSF, therapeutic fluids, and therapeutic fluids having high concentration therapeutic agents. Semi-crystalline polyurethanes may be resistant to degradation in oxidative, hydrolytic, and enzymatic changes and body fluid contact environments. Higher hardness may provide a polyurethane resistant to swelling and leaching when in contact with CSF, therapeutic agents, and highly concentrated therapeutic agents. Higher hardness polyurethanes may be resistant to degradation in oxidative, hydrolytic, and enzymatic changes and body fluid contact environments. A polyurethane with a higher hardness (i.e., higher A or preferably D hardness scale) may have less soft segment and higher crystallinity, which may slow diffusion and interaction with solvents and solutions. Accordingly, CSF catheters comprising polyurethane may be less susceptible to swelling or attack by solvents and solutions of therapeutic fluids.

A CSF catheter comprising a polyurethane with higher hardness may allow for reduced wall thickness and may provide for processing advantages for single lumen brain catheters and multi-lumen brain catheters.

In some embodiments, the catheter may be formed from a material having a Shore A hardness in a range from about 70 A to about 110 A. In some embodiments, the catheter may be formed from a material having a Shore A hardness above 80 A or preferably above 90 A. In some embodiments, the catheter is formed from a material having a Shore D hardness of about 30 D to about 70 D, such as from about 40 D to about 60 D, or from about 50 D to about 60 D.

The CSF catheter may comprise a semicrystalline polymer other than a polyurethane. The semicrystalline polymers may be selected to provide resistance to degradation in oxidative, hydrolytic, and enzymatic changes and body fluid contact environments while maintaining the desired flexibility through thinner wall or lower wall thickness. In some embodiments, a CSF catheter comprises one or more of polyolefin, polyethylene, a fluorinated polymer, a fluorinated homopolymer, a fluorinated copolymer, a homopolymer of polyvinylidene difluoride (PVDF), a copolymer of PVDF, a copolymer of tetrafluoroethylene (TFE) and hexafluoro propylene (HFP), and polychlorotrifluoroethylene. A polyolefin may provide resistance to change during its in vivo life through its high crystallinity and long hydrocarbon chains, and a fluorinated polymer may provide resistance to change during its in vivo life through its high crystallinity and the inert nature of fluorine.

Some examples, of polymers that may be used to form a CSF catheter as described herein include aliphatic or aromatic, polycarbonate-based thermoplastic polyurethane, such as CARBOTHANE (available from Lubrizol, Wickliffe, Ohio, USA), perfluoroelastomers, such as KALREZ (available from DuPont, Wilmington, Del., USA); PVDF, such as KYNAR FLEX (available from Daikin, Osaka, Japan) or KYNAR ULTRAFLEX (available from Arkema, Colombes, France); fluorinated ethylene propylenes, such as NEOFLON (available from Daikin, Osaka, Japan).

It should be understood that identifying a polymer or polymers that provide resistance to substantial breakdown, degradation, erosion, or deterioration of mechanical properties but at the same time is flexible while maintaining catheter dimensions, wall thickness, and structure is not trivial, in particular if the catheter is intended for implanted use over extended periods of time. In addition, it should be understood that the design challenges associated in identifying a suitable polymer or polymers for forming the catheters in combination with design concerns associated with the first port described herein, some of which are described above, present substantial challenges. Accordingly, the design of a suitable first port as described herein with a suitable CSF catheter was not a trivial task.

In some embodiments multiple single lumen CSF catheters are made from the same polymer or polymers. In other embodiments, the multiple single lumen CSF catheters are made from different polymers. In some embodiments, multiple single lumen CSF catheters are separated from each other. In other embodiments, the two single lumen CSF catheters are bonded to each other, such as via chemical bonding or thermal bonding. In some embodiments, more than one lumen of a multi-lumen CSF catheter is made from the same polymer or polymers. In other embodiments, lumens of a multi-lumen lumen CSF catheter are made from different polymers. In some embodiment, all lumens of a multi-lumen CSF catheter are made from the same polymer or polymers. In other embodiments, two or more lumens of a multi-lumen CSF catheter are made from two or more different polymers.

Exterior surfaces of the CSF catheter preferably comprise a material or materials that are biocompatible. Preferably, exterior surfaces of the CSF catheter inhibit tissue adhesion. Preferably, exterior surfaces of the CSF catheter are easily inserted. A hydrophilic coating, such as a hydrogel, may be applied to an exterior surface to cause the exterior surface to be lubricious to facilitate insertion of the catheter during implantation. The exterior surface of the catheter may be coated with polytetrafluorethylene (PTFE) or another polymer to improve insertability, decrease adhesion, or increase insertability and decrease adhesion. In some embodiments, the structural material of the catheter is sufficiently insertable and sufficiently resists tissue adhesion without an additional coating. If a coating is applied, the surface of the catheter preferably includes functional groups that may covalently bind with a coating. The surface of the catheter may be treated to introduce functional groups, or the functional groups may be present in the material forming the catheter.

The CSF catheter may include or may be coated with an antimicrobial material, such as antimicrobial silver or an antibiotic. In some embodiments the CSF catheter includes or is coated with a composition comprising a combination of minocycline and rifampin. In some embodiments, the CSF catheter is soaked in a solution comprising an antimicrobial agent, and the antimicrobial agent is taken up by the material forming the CSF catheter.

The CSF catheter may comprise radiopaque material visible by imaging, such as X-ray or fluoroscopy. The CSF catheter may comprise radiopaque material throughout the catheter, may comprise a concentrated area of radiopaque material, or may comprise radiopaque material throughout the catheter and may comprise a concentrated area of radiopaque material. The CSF catheter may comprise a concentrated radiopaque material at a distal end portion. The CSF catheter may comprise one or more concentrated radiopaque bands or markings along the length of the marker that may be used to determine the depth of the catheter during or after implantation.

The CSF catheter may comprise any suitable radiopaque material. Examples of suitable radiopaque material includes barium sulfate or tantalum.

In some embodiments, barium sulfate is blended with a polymer forming the catheter such that the barium sulfate is distributed through the catheter. Any suitable concentration of barium sulfate may be used. In some examples, about 5% barium sulfate by weight to about 20% barium sulfate by weight is blended into the polymer forming the catheter. For example, about 10% barium sulfate by weight to about 15% barium sulfate by weight, or about 12% barium sulfate may be blended into the polymer forming the catheter. 12% barium sulfate blended into the polymer was empirically determined to provide a suitable balance of a number of factors, including (i) ability to visualize the catheter throughout the implant process as it penetrates, (ii) manufacturability of thin-walled dual lumen catheter, and (iii) compatibility with fluids comprising high concentration therapeutic agents that may be infused through the catheter. Balancing these factors may achieve biocompatibility and biostability for the life of its implant, such as 5 years or more. In some embodiments, a tantalum marker, such as a tantalum bead, is positioned in the CSF catheter at the distal end portion.

The CSF catheter may comprise one or more openings in communication with a lumen of the catheter through which fluid may flow. The CSF catheter may comprise any suitable number of openings in communication with each lumen. For example, the CSF catheter may comprise one to ten or more openings in communication with each lumen, such as two to six openings or three to four openings in communication with each lumen. The CSF catheter may have the same number of openings in communication with the first lumen as in communication with the second lumen. The CSF catheter may have a different number of openings in communication with the first lumen than in communication with the second lumen.

The openings may be of any suitable size and may be configured in any suitable manner. The openings have a diameter or width of from about 0.2 millimeters to about 1 millimeter, such as from about 0.4 millimeters to about 0.6 millimeters, or about 0.5 millimeters. The openings may have the same or different diameters or widths.

The openings may be any suitable shape. For example, the openings may have circular or elliptical cross-sectional shapes, rectangular cross-sectional shape, triangular cross-sectional shape, or the like, or combinations thereof.

The openings may always be open or may be configured to open due to a pressure differential in the lumen of the catheter and CSF in which the distal portion of the brain catheter is implanted. For example, the openings may comprise slits that open due to relative positive pressure in the lumen when fluid is infused through the lumen to the CSF or due to relative negative pressure in the lumen when CSF is aspirated through the lumen. The slit may be cut into a resilient material that flexes when under pressure but returns to an original shape as pressure equalizes.

The openings may be positioned at any suitable location of the catheter. In some embodiments, the one or more openings of the CSF catheter in communication with a lumen configured to infuse therapeutic fluid (e.g., the lumen in communication with the second fluid pathway of the first port) may be positioned a short distance from the distal tip of the CSF catheter. The one or more openings of the CSF catheter in communication with a lumen through which CSF is configured to be aspirated (e.g., the lumen in communication with the first fluid pathway of the first port) may be positioned at or in proximity to the distal tip. Distancing infusion openings from aspiration openings may allow for infused fluid to mix with CSF so that aspirated CSF better represents concentrations of therapeutic agent in CSF than if the infusion and aspiration openings were in proximity to each other. If the infusion and aspiration openings are located adjacent to one another, then aspirated CSF may have higher concentration that CSF at a location more remote from the aspiration lumen. If the aspiration and infusion openings are located further apart from one another, then the aspirated fluid would be more representative of the entire CSF.

In addition to positioning aspiration and infusion openings longitudinally apart (closer to or further from the distal tip), the aspiration openings and the infusion openings may be placed on generally opposing sides of the CSF catheter. For example, the aspiration openings and the infusion openings may be positioned from about 160 degrees to about 180 degrees radially apart from one another. By positioning the infusion and aspiration lumens radially apart, substantial mixing of CSF with therapeutic fluid infused through an infusion opening may occur prior to aspirating the CSF through an aspiration opening.

In addition to positioning aspiration and infusion openings away from each other in a staggered manner in the cerebral ventricle, the position of the openings may be substantially separated such that the infusion holes are placed within a tissue location in the central nervous system, such as in the brain, other than a CSF-containing location, such as the cerebral ventricle, but the aspiration openings remain in the CSF-containing space.

The lumens of the CSF catheter may have the same or different lengths. The lumens of the CSF catheter may have a length that extends from a proximal end portion, which may be coupled to the CSF catheter connector of the first port, to the distal-most opening in the catheter in communication with the respective lumen. If the lumens of the CSF catheter are configured to carry fluid to or from the same CSF-containing location, such as a cerebral ventricle, the lumens may have the same or substantially similar lengths. If the lumens of the CSF catheter are configured to carry fluid to or from different locations, such as a cerebral ventricle and brain parenchyma, the lumens may be of substantially different lengths. For purposes of the present disclosure, lumens having "substantially different" lengths are lumens that have lengths that differ by more than 10 percent. Lumens that have "substantially similar" lengths are lumens that have lengths that differ by 10 percent or less.

In some embodiments, the CSF catheter comprises multiple infusion openings positioned a distance from the distal tip, such as from about 3 millimeters from the distal tip to about 15 millimeters from the distal dip. For example, all the infusion openings may be positioned from about 3 millimeters to about 10 millimeters from the distal dip, or from about 4 millimeters to about 8 millimeters from the distal tip. In some embodiments, at least one aspiration lumen is positioned at the distal tip of the CSF catheter.

The system described herein includes a port catheter configured to operatively couple the first port to the second port. The port catheter may comprise a body defining a distal opening and a proximal opening and a lumen extending from the distal opening (configured to be coupled to the first port) to the proximal opening (configured to be coupled to the first opening). The port catheter may be formed from any suitable material or materials, such as those described above regarding the CSF catheter.

The port catheter may have any suitable length. For example, the port catheter may have a length sufficient to extend from the implanted location of the first port to the location of the second port.

The port catheter may be configured to operatively couple to the first and second ports in any suitable manner. For example, a distal end portion of the port catheter may couple to a port catheter connector of the first port in a manner as described above. Preferably, the port catheter is coupled to the first port after the first port is implanted or during the implant procedure of the first port.

The second port may comprise a port catheter connector configured to couple with proximal end of the port catheter.

The proximal end of the port catheter may couple to a port catheter connector or the second port in a manner as described above.

The port catheter may be subcutaneously tunneled to a location in proximity to the second port. If the second port is external to the subject, the port catheter may exit the subject at a suitable location. If the second port is implanted, the entire port catheter may be implanted.

The second port comprises a third inlet, a third outlet, and a third fluid pathway extending from the third inlet to the third outlet. When coupled to the second port and the first port, the port catheter places the third fluid pathway of the second port in fluid communication with the second fluid pathway of the first port.

The second port may comprise a housing. The housing may define an exterior surface of the second port. The housing may be formed from one or more parts. As an example, different parts of the housing may be secured relative to one another by threaded engagement, snap fit engagement, interference fit engagement, may be welded, adhered, or otherwise bonded to one another, or the like, or combinations thereof. Preferably, different parts of the housing are connected to one another in a fluid tight manner. Preferably, different parts of the housing are welded together.

The housing of the second port may comprise any suitable material. For example, the housing of the second port may be formed from materials as described above regarding the first port. If the second port is implanted, the housing is preferably formed from biocompatible materials.

In some embodiments, the second port comprises a sleeve configured to cover one or more portions of the housing. The sleeve may be formed from one or more materials that are softer, more compliant, or softer and more compliant than the housing. The sleeve may be formed from any suitable material or materials. For example, the sleeve may comprise or be formed from materials as described above regarding the sleeve of the first port.

Fluid pathways of the second port, such as the third fluid pathway, may be configured in any suitable manner and may be formed from any suitable material or materials, such as described above regarding fluid pathways of the first port.

The third inlet of the second port may be configured to receive a needle. If the second port is implanted, the second port is preferably implanted such that the third inlet is accessible by the needle when the needle is inserted through the skin of the subject. For example, the second port may be implanted such that the third inlet is implanted subcutaneously, and the needle may percutaneously access the third inlet. The third inlet is preferably configured to receive and engage the needle such that the needle may be used to introduce fluid, such as therapeutic fluid, to the subject through the third fluid pathway of the second port, the lumen of the port catheter, the second fluid pathway of the first port, the second lumen of a CSF catheter, and a distal opening of a CSF catheter that is in communication with the second lumen.

The second port may comprise a self-sealing septum disposed across the third inlet. The septum may allow a needle to enter the inlet and may seal once the needle is withdrawn. The self-sealing septum may be made of any suitable material or materials such as those described above regarding the self-sealing septum of the first port.

The third inlet may be tapered or comprise tapered components to guide the needle into proper position and fit in the inlet. The third inlet may comprise a seal, such as an O-ring or the like, to sealingly engage an outer surface of the needle when the needle is received in the inlet. Preferably, a sufficient seal is created to allow a relative positive pressure in the third fluid pathway to cause fluid introduced by the needle to eventually flow out of the distal opening of the CSF catheter.

The second port may comprise an external catheter connector configured to operatively couple to a catheter external to a subject (an "external catheter"). The external catheter connector may define the third inlet. The external catheter connector may be a catheter connector as described above regarding the catheter connectors of the first port. If the external catheter connector is external to the subject, the external catheter connector is preferably configured to reversibly connect to the external catheter. For example, the external catheter connector may comprise a luer fitting configured to couple to a complementary luer fitting on the external catheter.

The third fluid pathway of the second port may comprise a one-way valve configured to allow fluid to flow from the third inlet to the third outlet and to prevent fluid from flowing from the third outlet to the third inlet. The third fluid pathway may comprise a microbial filter. For example, the third fluid pathway may comprise a 0.22 micron or 0.2 micron filter that may effectively filter microbes such as bacteria.

The second port may comprise a fourth inlet and a fourth fluid pathway that extends from the fourth inlet to the third outlet. The fourth pathway may comprise a one-way valve configured to allow fluid to flow from the fourth inlet to the third outlet and to prevent fluid from flowing from the third outlet to the fourth inlet. The fourth fluid pathway may comprise a microbial filter. For example, the fourth fluid pathway may comprise a 0.22 micron or 0.2 micron microbial filter.

The fourth inlet may allow for the second port to be coupled to an infusion device such that the infusion device may infuse fluid through the second port via the fourth fluid pathway through the lumen of the port catheter, through the second fluid pathway of the first port, and through a distal opening of a CSF catheter that is in fluid communication with the second lumen of the CSF catheter.

The second port may comprise an infusion device catheter connector configured to operatively couple a catheter from an infusion device (an "infusion device" catheter) to the second port. The infusion device catheter connector may define the fourth inlet of the second port. The infusion device catheter connector may be a catheter connector such as described above regarding catheter connectors of the first port.

The second port may be placed at a location to allow convenient access for introduction of therapeutic fluid into the subject. For example, the second port may be located in proximity to the subject's ear ("auricular") or in proximity to the subject's clavicle ("clavicular"). The second port may be implanted, partially implanted, or may remain external to a subject in which the first port is implanted. In some embodiments, the second port is implanted under a scalp of the subject. The second port may be considered a modified Ommaya or Rickman reservoir. The reservoirs may be modified to couple to a port catheter rather than a catheter that extends into the brain.

The third fluid pathway of the second port may be used to deliver therapeutic fluid to a subject to determine whether a therapy is effective, at which point an infusion device, such as an implantable infusion device, may be used to continue to deliver the therapeutic fluid. The second port may remain connected to the port catheter once therapy has been determined to be effective or may be disconnected from the port catheter. The infusion device may be connected to the port catheter to continue to deliver the therapeutic fluid, may be operatively coupled to a fourth inlet of the second port to continue to deliver the therapeutic fluid, or may be connected to the port catheter connector of the first port to continue to deliver the therapeutic device. If the infusion device is connected to the port catheter connector of the first port via an infusion catheter, the port catheter may be removed from the subject or otherwise explanted. If the infusion device is connected to the port catheter, a coupler may be used to couple an infusion catheter to the port catheter or the infusion device may be directly coupled to the port catheter via a catheter connector of the infusion device. The second port may be disconnected from the port catheter and a splice coupler may be used to couple the infusion catheter to the port catheter. Alternatively, a Y-connector, T-connector, or the like may be used to allow both the second port and the infusion device to be operatively coupled to the first port.

The third pathway of the second port may be used to deliver therapeutic fluid containing a therapeutic agent that may require only periodic administration, such as once a day infusion, once a week infusion, and the like. Therapeutic agents that may be infused periodically include genetic therapies (e.g. interfering RNAs, oligonucleotides), biologic molecules (e.g., therapeutic antibodies, growth factors and large immune modulators) and small molecules (e.g. chemotherapeutic and immune modulators). The third fluid pathway of the second port may be used to deliver a therapeutic agent that is different from a therapeutic agent delivered through the fourth fluid pathway of the second port or delivered by an infusion device otherwise operatively coupled to the second pathway of the first port.

The infusion device may be implantable or non-implantable. The non-implantable infusion device may be an ambulatory device or a stationary device. The infusion device may be manually powered, electromechanically powered, chemically powered, or otherwise powered. In some examples, the infusion device may comprise a piston pump, a peristaltic pump, an osmotic pump, a plunger, or the like. Examples of existing infusion devices that may be used include those manufactured by Medtronic, Inc. and Tricumed Medizintechnik GmbH.

Reference is now made to FIGS. 1-4, which illustrate some components of embodiments of systems described herein. FIG. 1 shows a first port 100 implanted in a subject's head and a second port 500 in proximity to the subject's clavicle. The second port 500 may be implanted or may be external to the subject. The first 100 and second 500 ports may be implanted in, or positioned in proximity to, any other suitable location of the subject. A port catheter 600 operatively couples the first port 100 to the second port 500. The second port 500 may be implanted or external to the subject.

Figure 2:
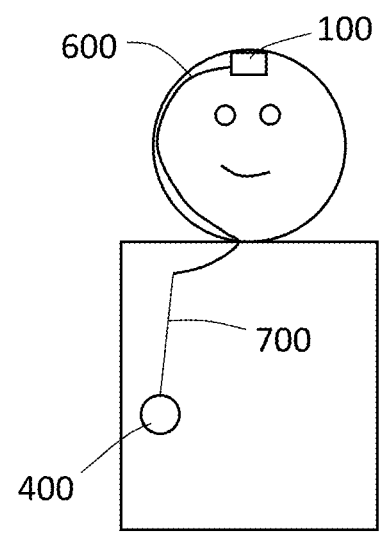

In FIG. 2, the second port 500 is disconnected from the port catheter 600, and an infusion device catheter 700 that is operatively coupled to an infusion device 400 is coupled to the port catheter 600. The infusion device catheter 700 may be coupled to the port catheter 600 in any suitable manner. For example, a splice connector (not shown) having components similar to those described above regarding catheter connectors may be employed to couple the infusion device catheter 700 to the port catheter 600. Preferably, the infusion device 400 is implanted in the subject.

Figure 3:
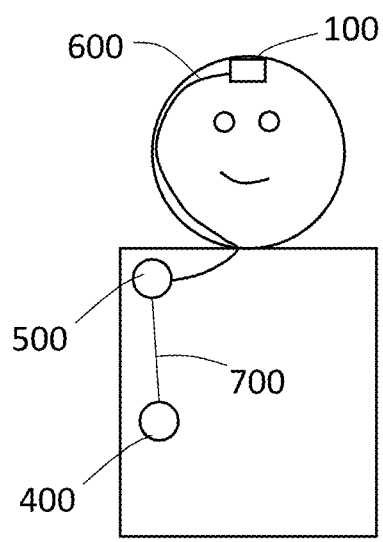

FIG. 3 illustrates an embodiment where an infusion device 400 is operatively coupled to the second port 500 via an infusion device catheter 700. The infusion device catheter 700 may be coupled to a fourth inlet (not shown), such as via a catheter connector (not shown) defining the fourth inlet, of the second port 500. Preferably, the second port 500 and the infusion device 400 are implanted.

Figure 4:
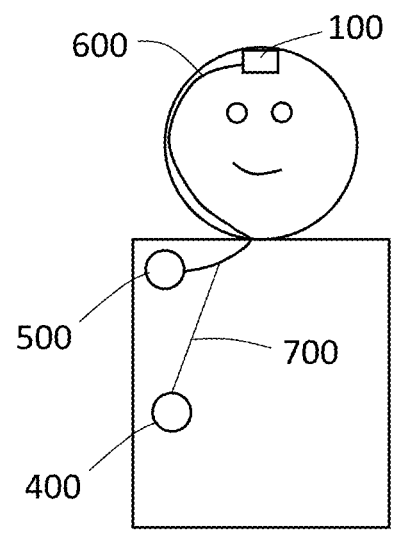

FIG. 4 illustrates an embodiment in which an infusion device 400 is operatively coupled to the port catheter 600 via an infusion device catheter 700 while the second port 500 is also coupled to the port catheter 600. The port catheter 600 may be bifurcated at its proximal end portion to permit both the second port 500 and the infusion device 400 to be simultaneously operatively coupled to the port catheter 700. Alternatively, a Y-adapter or T-adapter (not shown) having components such as those described above regarding catheter connectors may be employed to operatively couple both the second port 500 and the infusion device 400, via the infusion device catheter 700, to the port catheter 600.

Figure 5:
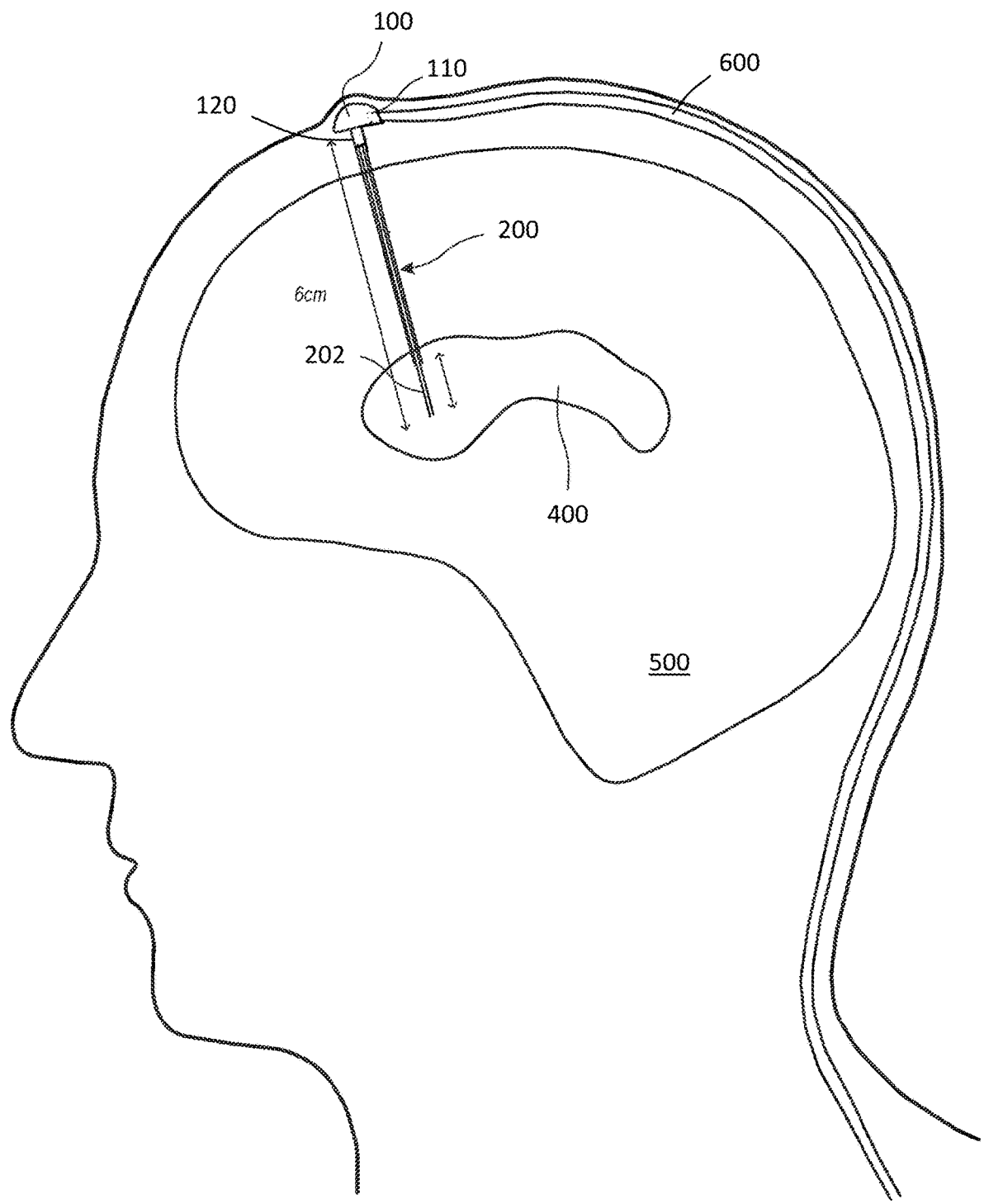
FIG. 5 is a schematic illustration showing a first port, CSF catheter, and a portion of a port catheter implanted in a patient.
Figure 6:
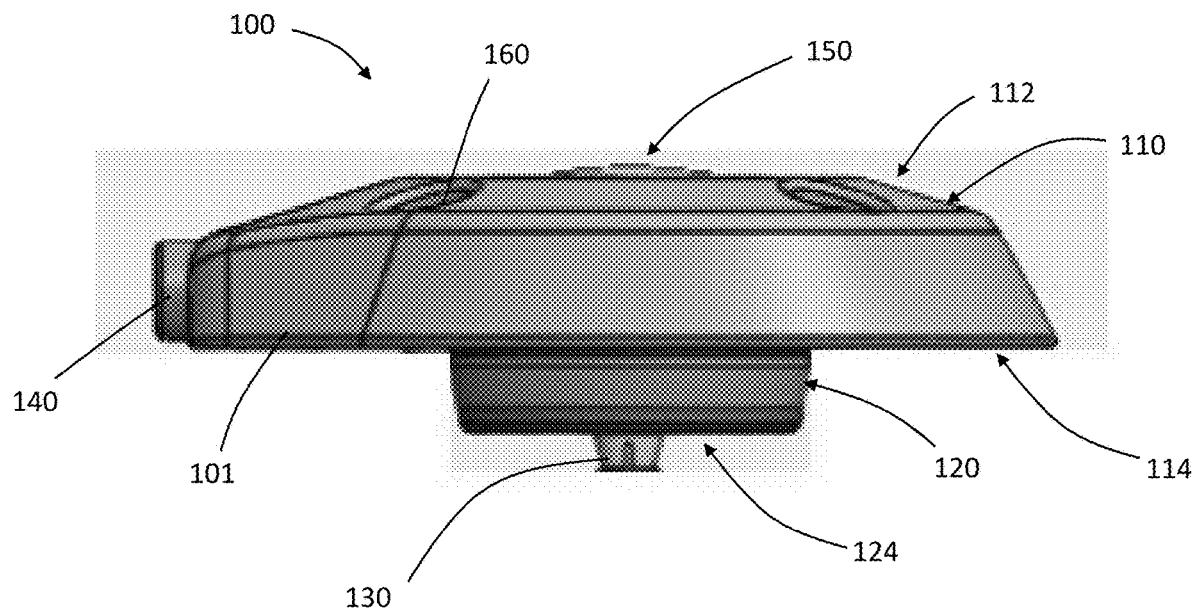
FIG. 6 is a schematic side view of an embodiment of a first port.
Figure 7:
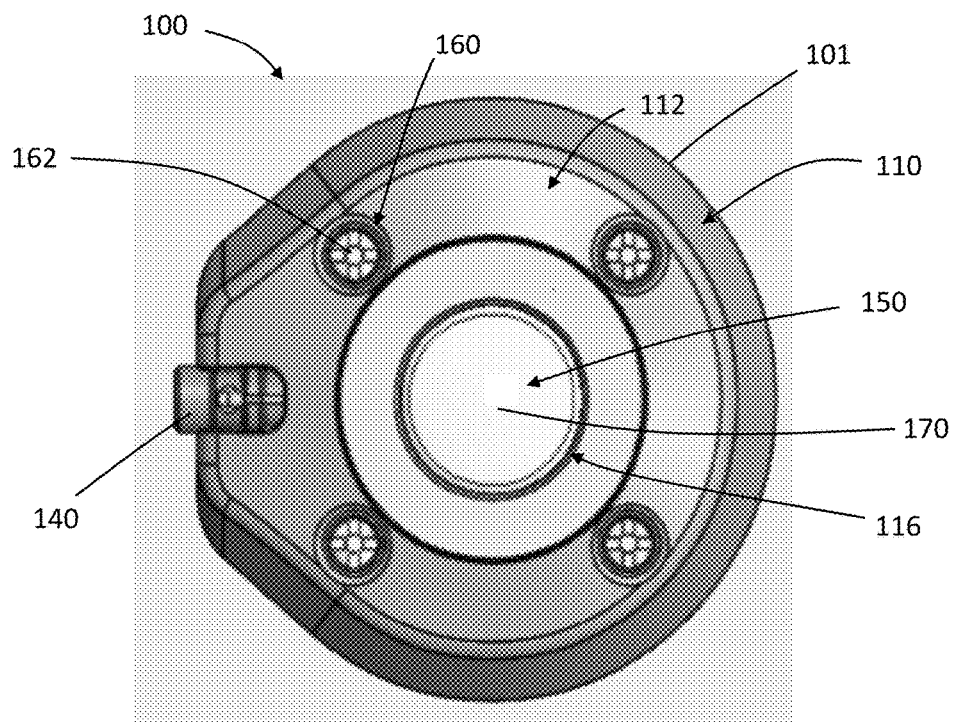
FIG. 7 is a schematic top view of an embodiment of the first port depicted in FIG. 6.
Figure 8:
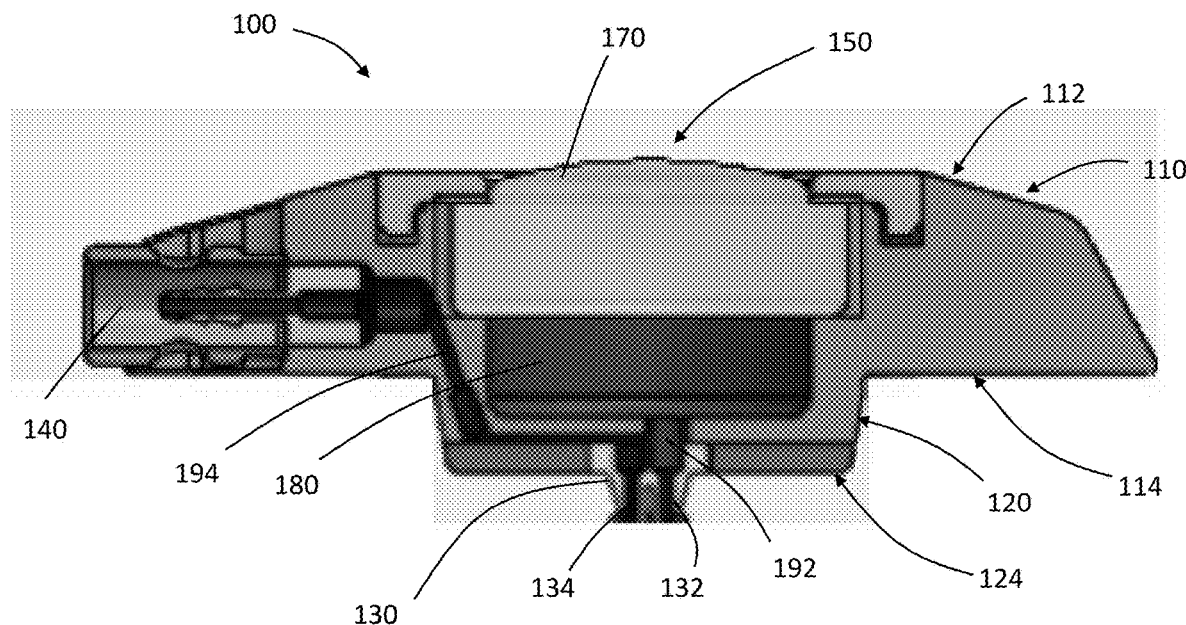
FIG. 8 is a schematic side view of the first port in FIG. 6 in which the housing is sectioned.

FIG. 5 shows a first port 100, CSF catheter 200, and a portion of a port catheter 600 implanted in a patient. A distal end portion 202 of the CSF catheter 200 may be implanted in a lateral ventricle 400 of a brain 500 of a subject. The proximal end of the CSF catheter 200 may be coupled to a CSF catheter connector (not shown) of the first port 100. In the depicted embodiment, the CSF catheter 200 may have a length of about 6 centimeters to about 7 centimeters, which should be sufficient to connect to the first port 100 and extend into the lateral ventricle 400 of the brain 500 of the subject. In the depicted embodiment, the first port 100 includes a lower portion 120 positioned within a burr hole (not shown) of a skull (not shown) of the subject, and an upper flange portion 110 positioned between the skull and the scalp of the subject. The port catheter 600 may be coupled to a port catheter connector (not shown) of the first port 100 and positioned along the skull of the subject and tunneled to a position in the patient remote from the first port 100. For example, the port catheter 600 may be operably coupled to a second port or infusion device located at any suitable location of the subject, such as another location in the head or in proximity to the head, a location in the torso or in proximity to the torso, or the like.

FIGS. 6-9 illustrate an embodiment of a first port 100 configured for implanting in proximity to a skull of a subject. Of course, it will be understood that other configurations of the first port and other implant locations are contemplated herein. The first port 100 depicted in FIGS. 6-9 includes an upper flange portion 110 having a top surface 112 and a bottom surface 114 and includes a lower portion 120 having a bottom major surface 124. Fastener feedthroughs 160 extend through the upper flange portion 110 from the top surface 112 to the bottom surface 114 and are configured to receive fasteners 162, such as screws, which may be used to anchor the housing to the skull of a subject in which the first port 100 is implanted.

The first port 100 includes a first inlet 150 in communication with the first fluid path 192. The lateral edge of the first inlet 150 is defined by a first opening 116 defined by the top surface 112 of the upper flange portion 110. A self-sealing septum 170 extends across the opening 116. When the first port 100 is implanted, the first inlet 150 is positioned and oriented to receive a needle inserted through the scalp such that a lumen of the needle is placed in fluid communication with the first fluid path 192.

The first port 100 includes a reservoir 180 in communication with and forming a part of the first fluid path 192. The reservoir 180 is positioned such that insertion of a needle into the port 150 places a lumen of the needle in fluid communication with the reservoir 180. The reservoir 180 is disposed with the housing 101.

The first port 100 also includes a port catheter connector 140 that extends substantially parallel with the bottom surface 114 of the upper flange portion 110 of the first port 100. The port catheter connector 140 is operably coupled to an opening defined by the upper flange portion 110 (such as second opening 118 depicted in FIG. 1). The port catheter connector 140 defines a second inlet and a passageway in communication with the second fluid path 194 of the device 100. The port catheter connector 140 is configured to operably couple to a port catheter to place a lumen of the port catheter in fluid communication with the second fluid path 194. The port catheter may further be coupled to a second port, an infusion device, or a second port and an infusion device (e.g., as depicted in FIGS. 1-4).

The first port 100 also includes a CSF catheter connector 130 having a first lumen 132 defining a first outlet and a second lumen 134 defining a second outlet. The CSF catheter connector 130 extends from the bottom major surface 124 of the lower portion of the housing 120. The first lumen 132 of the CSF catheter connector 130 is operably coupled to the first fluid pathway 192. The second lumen 134 of the CSF catheter connector 130 is operably coupled to the second fluid pathway 194. The CSF catheter connector 130 is configured to operably couple to a dual lumen catheter, which may have a distal end. The distal end may be implantable in a cerebral ventricle (e.g., as depicted in FIG. 5)

Figure 9:
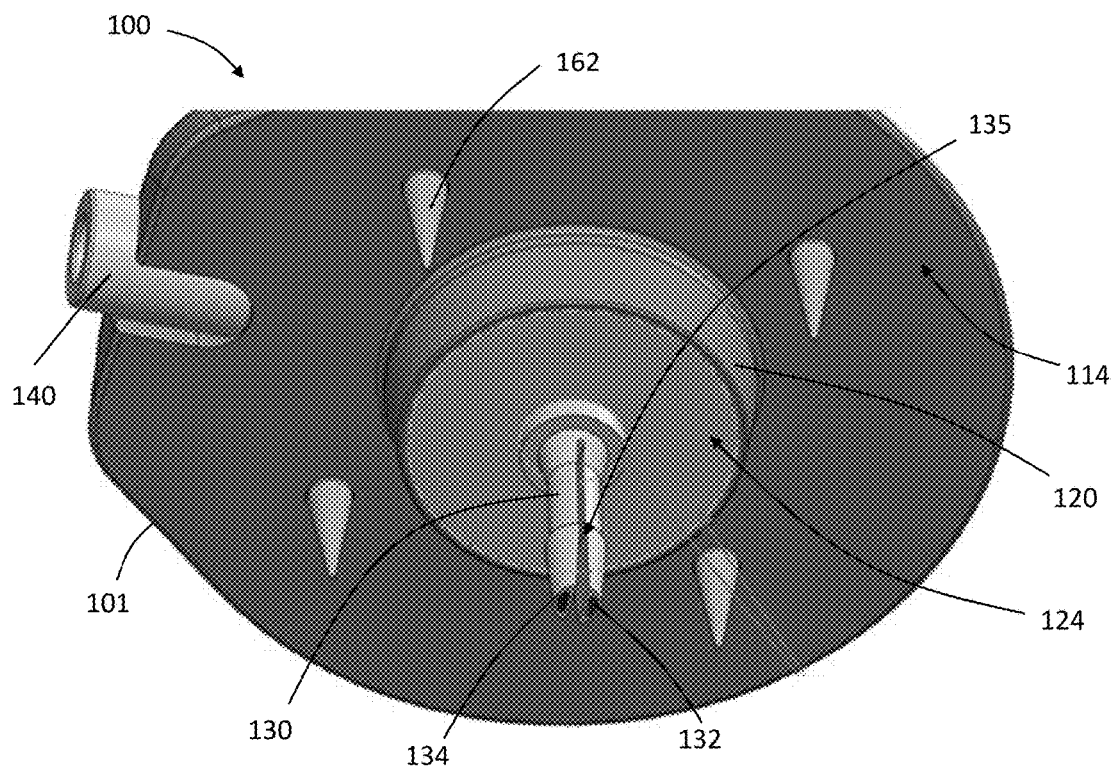
FIG. 9 is a schematic perspective view showing a bottom of an embodiment of the first port depicted in FIGS. 6-8.
Figure 10:
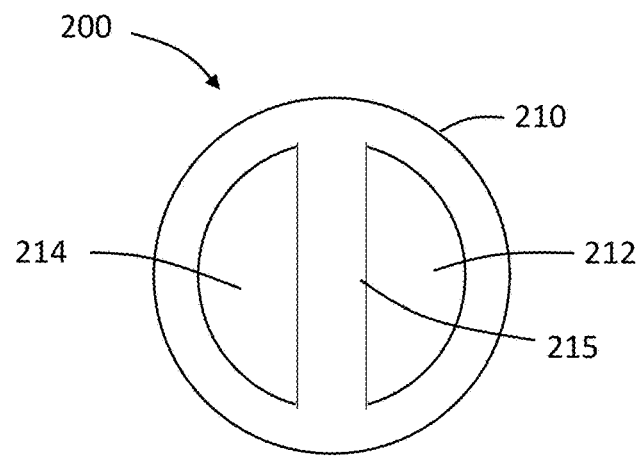
FIG. 10 is a schematic cross-sectional view of an embodiment of a dual lumen CSF catheter.

As shown in FIG. 9, the CSF catheter connector 130 may include a slot 135 configured to receive a portion of a CSF catheter that separates one lumen from another in a dual lumen catheter. For example and with reference to FIG. 10, a central portion 215 of a body 210 of a CSF catheter 200 that separates a first lumen 212 from a second lumen 214 may be inserted into slot 135 of the CSF catheter connector 130 such that the first lumen 212 of the catheter 200 is placed in fluid communication with the first lumen 132 of the CSF catheter connector 130 and such that the second lumen 214 of the CSF catheter 200 is placed in fluid communication with the second lumen 134 of the CSF catheter connector 130.

Figure 11:
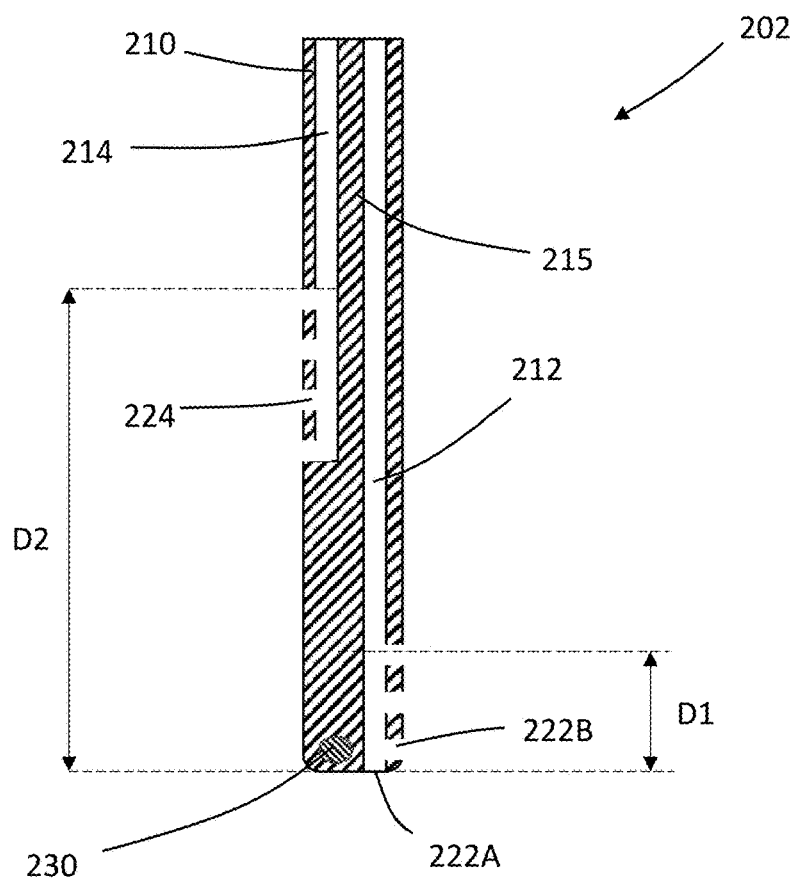
FIG. 11 is a schematic longitudinal sectional view of a distal portion of a CSF catheter.

Referring now to FIG. 11, a distal portion 202 of an embodiment of a CSF catheter is shown. The CSF catheter includes a first lumen 212 and a second lumen 214 separated by a central wall 215 of the body 210 of the CSF catheter. The first lumen 212 is in communication with one or more openings 222 at the distal end portion 202. In the depicted embodiment, the first lumen 212 is in communication with three side openings 222B at the distal end portion 202 and a distal end opening 222A. The second lumen 214 is in communication with one or more side openings 224 at the distal end portion 202. In the depicted embodiment, the second lumen 212 is in communication with four side openings 224 at the distal end portion 202. The side openings 222A and 224 are positioned on generally opposing sides of the CSF catheter. The distance (D1) from the distal tip to the side opening 222A furthest from the distal tip is less than the distance (D2) from the distal tip to the side opening 224 furthest from the distal tip. Preferably, all the openings 224 in communication with the second lumen 214 are positioned away from the distal tip a distance greater than D1. The position and orientation of the openings 222A, 222B, 224 allow for therapeutic fluid that may be infused through the second lumen through side openings 224 to substantially mix with CSF prior to being aspirated through openings 222A, 222B and through the first lumen 215.

If D2 is substantially greater than D1, the CSF catheter may be suitable for withdrawing fluid from a cerebral ventricle through openings 222A and 222B and may be suitable for delivering fluid to brain parenchyma through openings 224. If D2 is not substantially greater than D1, the CSF catheter may be suitable for withdrawing fluid from a cerebral ventricle through openings 222A and 222B and delivering fluid to the CSF through openings 224.

The catheter depicted in FIG. 11, includes a radiopaque marker 230 visible by X-ray, magnetic resonance imaging (MM), or X-ray and MRI imaging so that the location of the distal end portion 202 may be readily determined. For example, the radiopaque marker 230 may comprise tantalum and may be embedded in the distal end portion 202 of the catheter near the distal tip. The body 210 of the CSF catheter may comprise barium sulfate or another radiopaque material (not shown) dispersed throughout. In some embodiments (not shown), the CSF catheter may include radiopaque markers at locations along the length of the CSF catheter to form depth markings that may be used to determine the depth of the catheter during or after implantation.

Figure 12:
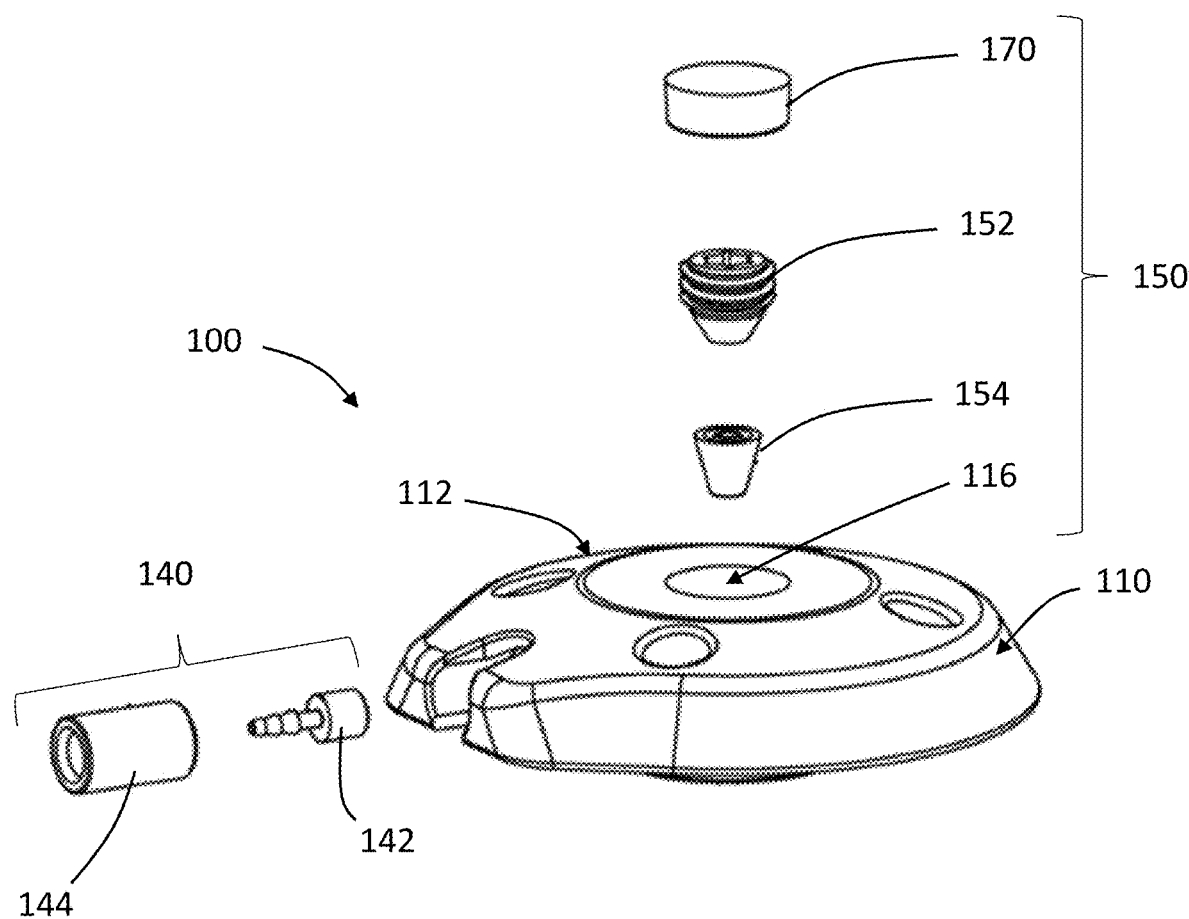
FIG. 12 is an exploded perspective view of an embodiment of a first port showing components of a first inlet port and a port catheter connector.

Referring now to FIG. 12, components of an embodiment of a port connector 140 and a first inlet port 150 associated with an upper flange portion 110 of a first port 100 are shown. The outer edge of the first inlet port 150 is defined by a first opening 116 defined by a top surface 112 of the upper flange portion 110. The first inlet port 150 includes a septum 170 or cap, a compression wedge 152, and an axial ferrule 154, which defines a decreasing inner diameter moving in a direction from the top surface 112 of the upper flange portion 110 towards the bottom surface of the upper flange portion 110. The axial ferrule 154 serves to guide a needle inserted into the first inlet port 150 into a position suitable for placing a lumen of the needle in fluid communication with the first fluid path of the device 100. The axial ferrule 154 may also limit insertion of the needle beyond a bottom end of the ferrule 154.

The port catheter connector 140 includes a compression fitting, such as sleeve 144, defining a lumen configured to receive a port catheter and a barbed fitting 142 configured to be inserted into a lumen of the port catheter. The barbed fitting 142 defines the second inlet and includes a passageway in communication with the second fluid path of the device 100. The compression sleeve 144 may be disposed about the port catheter and slid towards the end of the port catheter after the port catheter has been advanced over the barbed fitting 142 to cause the port catheter to be compressed against the barbed fitting 144.

Figure 13:
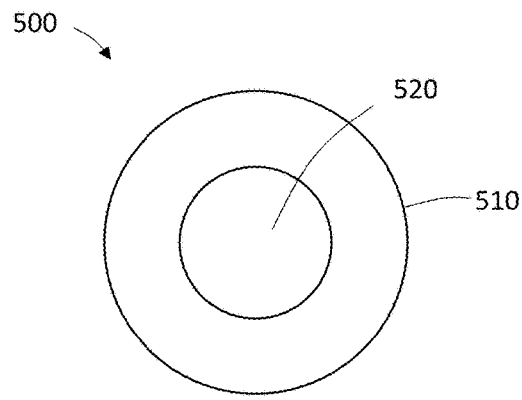
FIG. 13 is a schematic top plan view of an embodiment of a second port.
Figure 14:
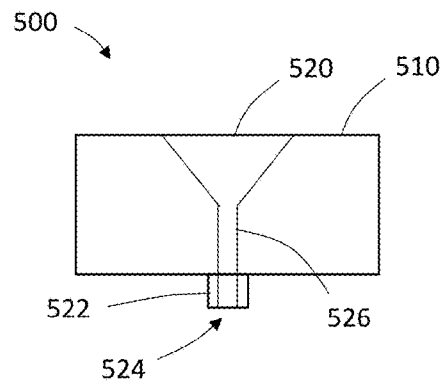
FIGS. 14-17 are schematic sectional views of embodiments of a second port.
Figure 15:
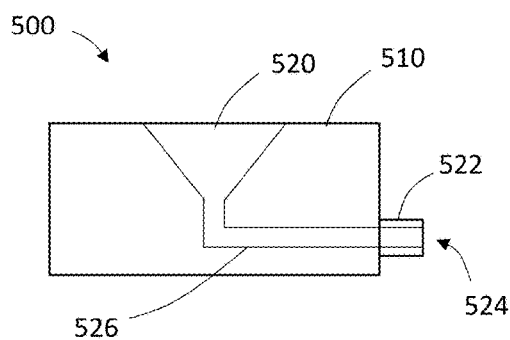
Figure 16:
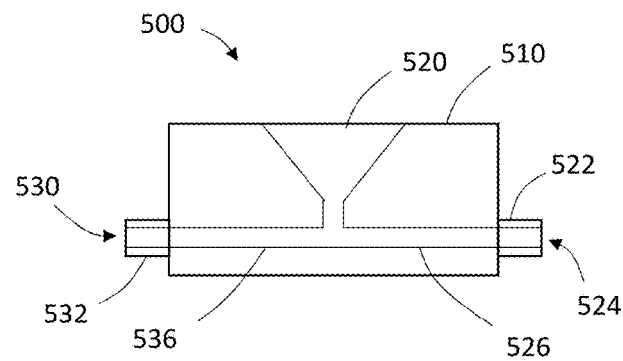
Figure 17:
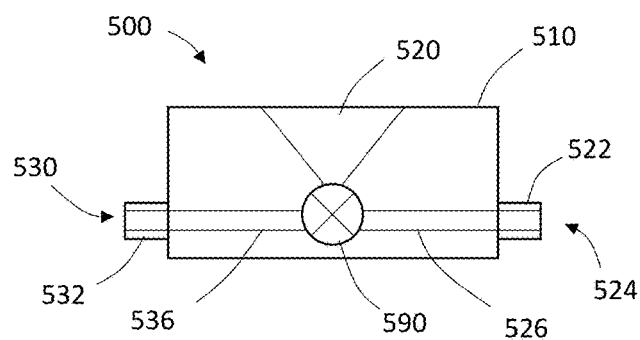

Referring now to FIGS. 13-17, embodiments of second ports 500 are illustrated. A schematic top plan view of a second port 500 is shown in FIG. 13. FIG. 14 illustrates a schematic sectional view of an embodiment of a second port 500 according to FIG. 13. FIGS. 15 and 16 illustrate sectional views of alternative embodiments of second ports 500. FIG. 17 illustrates an embodiment of a second port 500 according to FIG. 16, in which the second port 500 comprises a valve 590.

The second port 500 may comprise a housing 510 that defines at least a portion of the outer surface of the second port. The housing 510 may define an opening that serves as the third inlet 520. A self-sealing septum (not shown) may be disposed across the opening defining the third inlet 520. The self-sealing septum may be as described above regarding a self-sealing septum of the first port. The third inlet 520 may comprise a ferrule (not shown) and compression wedge (not shown) as described above regarding the inlet port of the first port.

The second port 500 may comprise a port catheter connector 522 that defines a third outlet 524. The second port 500 comprises a third fluid pathway 526 that extends from the third inlet 520 to the third outlet 524. The port catheter connector 522 may positioned at any suitable location of the second port 500. In FIG. 14 the port catheter connector 522 is positioned at a surface opposing the first inlet 520 (e.g., the port catheter connector 522 is positioned at a bottom surface and the first inlet 520 is positioned at the top surface). In FIGS. 15-17, the port catheter connector 522 is positioned at a side surface of the second port 500. The port catheter connector 522 is configured to operatively couple to a port catheter to place a lumen of the port catheter in fluid communication with the third fluid pathway 526. The port catheter connector 522 of the second port 500 may comprise components of a catheter connector as described above regarding the first port.

The second port 500 may comprise an infusion device catheter connector 532 as shown in FIGS. 16 and 17. The infusion device catheter connector 532 defines a fourth inlet 530. A fourth fluid pathway 536 extends from the fourth inlet 530 to the third outlet 524. The infusion device catheter connector 532 is configured to operatively couple to an infusion device catheter to place a lumen of the infusion device catheter in fluid communication with the fourth fluid pathway 536. The infusion device catheter connector 522 of the second port 500 may comprise components of a catheter connector as described above regarding the first port.

As shown in FIG. 17, the second port 520 may comprise a valve 590 or more than one valve. The valve 590 or valves may be one-way valves that allow fluid to flow through the third fluid pathway 526 from the third inlet 520 to the third outlet 524 but not from the third outlet 524 to the third inlet 520 and may allow flow through the fourth fluid pathway 536 from the fourth inlet 530 o the third outlet 524 but not from the third outlet 524 to the fourth inlet 530.

Various aspects of medical systems including first and second ports, and methods for using the systems are discloses herein. A summary of some of the aspect is provided below.

In a first aspect, a system for infusing fluid into a CSF-containing space and for withdrawing fluid from the CSF-containing space includes a first port comprising a first inlet, a first outlet, a first fluid pathway extending from the first inlet to the first outlet, a second inlet, a second outlet, and a second fluid pathway extending from the second inlet to the second outlet; one or more CSF catheters comprising a first lumen, a first distal opening in fluid communication with the first lumen, a second lumen, and a second distal opening in fluid communication with the second lumen, wherein the one or more CSF catheters are, or are configured to be, operatively coupled with the first implantable device such that the first lumen is in fluid communication with the first fluid pathway and the second lumen is in fluid communication with the second fluid pathway, and wherein at least the first (and preferably the first and second) distal opening is configured to be placed in the CSF-containing space; a second port comprising a third inlet, a third outlet, and a third fluid pathway extending from the third inlet to the third outlet; and a port catheter configured to operatively couple the third fluid pathway to the second fluid pathway.

A second aspect is a system of the first aspect, wherein the first inlet is configured to receive a needle to aspirate CSF fluid from the CSF-containing space.

A third aspect is a system of the first or second aspect, wherein the first port is configured to be implanted in proximity to a skull.

A fourth aspect is a system of the third aspect, wherein at least a portion of the first port is configured to be implanted in a burr hole in the skull.

A fifth aspect is a system of any one of the first four aspects, wherein the third inlet is configured to receive a needle to introduce fluid through the third fluid pathway.

A sixth aspect is a system of any one of the first five aspects, wherein the second port is implantable.

A seventh aspect is a system of the sixth aspect, wherein the second port is configured to be implanted in proximity to an ear or in proximity to a clavicle.

An eighth aspect is a system of any one the first seven aspects, wherein second port comprises a fourth inlet and a fourth fluid flow pathway extending from the fourth inlet to the third outlet.

A ninth aspect is a system of the eighth aspect, further comprising an implantable infusion device and an infusion device catheter, wherein the infusion device catheter is configured to operatively couple the infusion device to the fourth inlet of the second port.

A tenth aspect is a system of any one of aspects 1 to 7 further comprising an infusion device and an infusion catheter, wherein the infusion catheter is configured to operatively couple the infusion device to the second fluid flow pathway of the first port.

In an eleventh aspect a method comprises providing the system of any one of aspects 1 to 10 associated with a subject; introducing a first therapeutic fluid into the third inlet of the second port to cause the therapeutic fluid to flow through the third pathway of the second port, through a lumen of the port catheter, through the second fluid pathway of the first port, through the second lumen of the CSF catheter, through a distal opening of the CSF catheter in fluid communication with the second lumen of the CSF catheter, and into the subject; and withdrawing CSF from the CSF-containing space of the subject through a distal opening of the CSF catheter in fluid communication with the first lumen of the CSF catheter, through the first lumen of the CSF catheter, through the first passageway of the first port, and out of the first inlet of the first port.

A twelfth aspect is a method of aspect 11, wherein the first therapeutic fluid is introduced into the CSF-containing space.

A thirteenth aspect is a method of aspect 11 or 12, wherein the system comprises the infusion device and the infusion catheter operatively coupled to the infusion device, and wherein the method further comprises introducing a second therapeutic fluid from the infusion device to the subject through the distal opening of the CSF catheter in communication with the second lumen of the CSF catheter, wherein the first and second therapeutic fluids are the same or different.

A fourteenth aspect is a method of aspect 13, wherein the first and second therapeutic fluids are the same.

A fifteenth aspect is a method of aspect 13 or 14, further comprising uncoupling the port catheter from the third inlet of the second port and operatively coupling the infusion device catheter to the port catheter.

A sixteenth aspect is a method of aspect 13, wherein the second port comprises the fourth inlet and the fourth fluid pathway extending from the fourth inlet to the third outlet, and wherein the infusion device catheter is operatively coupled to the fourth inlet.

A seventeenth aspect is a method of aspect 13, wherein the second port and the infusion device are both operatively coupled to the port catheter.

All scientific and technical terms used herein have meanings commonly used in the art unless otherwise specified. The definitions provided herein are to facilitate understanding of certain terms used frequently herein and are not meant to limit the scope of the present disclosure.

As used herein, singular forms "a," "an" and "the" include plural referents unless the context clearly dictates otherwise. As used in this specification and the appended claims, the term "or" is generally employed in its sense including "and/or" unless the content clearly dictates otherwise. The term "and/or" means one or all of the listed elements or a combination of any two or more of the listed elements.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the inventive technology.

Any direction referred to herein, such as "top," "bottom," "side," "upper," "lower," and other directions or orientations are described herein for clarity and brevity but are not intended to be limiting of an actual device or system. Devices and systems described herein may be used in a number of directions and orientations.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred. Any recited single or multiple feature or aspect in any one claim can be combined or permuted with any other recited feature or aspect in any other claim or claims.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must).

The words "include," "including," and "includes" indicate open-ended relationships and therefore mean including, but not limited to. Similarly, the words "have," "having," and "has" also indicated open-ended relationships, and thus mean having, but not limited to. Similarly, the terms "comprise" and "comprising" indicate open-ended relationships, and thus mean comprising, but not limited to. The terms "consisting essentially of" and "consisting of" are subsumed within the term "comprising." For example, a catheter comprising tubing may be a catheter consisting of tubing. The term "consisting essentially of" means a recited list of one or more items belonging to an article, kit, system, or method and other non-listed items that do not materially affect the properties of the article, kit, system, or method.

The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "second" feature does not require that a "first" feature be implemented prior to the "second" feature, unless otherwise specified. A "second" feature does not necessarily require or imply that a "first" feature is needed or present.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a catheter connector may be configured to place a lumen of a catheter in fluid communication with a fluid path, even when the catheter is not connected to the catheter connector).

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112 paragraph (f), interpretation for that component It will be apparent to those skilled in the art that various modifications and variations can be made to the present inventive technology without departing from the spirit and scope of the disclosure. Since modifications, combinations, sub-combinations and variations of the disclosed embodiments incorporating the spirit and substance of the inventive technology may occur to persons skilled in the art, the inventive technology should be construed to include everything within the scope of the appended claims and their equivalents.

What is claimed is:

1. A system for infusing fluid into a CSF-containing space and for withdrawing fluid from the CSF-containing space, the system comprising:
   a first port comprising a first inlet, a first outlet, a first fluid pathway extending from the first inlet to the first outlet, a second inlet, a second outlet, and a second fluid pathway extending from the second inlet to the second outlet;
   one or more CSF catheters comprising a CSF catheter body, a first lumen, a first plurality of distal openings in fluid communication with the first lumen, a second lumen, and a second plurality of distal openings in fluid communication with the second lumen, wherein the one or more CSF catheters are, or are configured to be, operatively coupled with the first port such that the first lumen is in fluid communication with the first fluid pathway and the second lumen is in fluid communication with the second fluid pathway, wherein the first plurality of distal openings comprises a distal end opening disposed at a distal tip of the CSF catheter body and a plurality of first side openings, and
   wherein at least the first plurality of distal openings are configured to be placed in the CSF-containing space;
   a second port comprising a third inlet, a third outlet, and a third fluid pathway extending from the third inlet to the third outlet;
   a port catheter connecting the third outlet to the second inlet and configured to operatively couple the third fluid pathway to the second fluid pathway; and
   a port catheter connector extending parallel with a bottom surface of an upper flange portion of the first port and configured to couple the port catheter to the second inlet.

2. The system of claim 1, wherein the first inlet is configured to receive a needle to aspirate CSF fluid from the CSF-containing space.

3. The system of claim 1, wherein the first port is configured to be implanted in proximity to a skull.

4. The system of claim 3, wherein at least a portion of the first port is configured to be implanted in a burr hole in the skull.

5. The system of claim 1, wherein the third inlet is configured to receive a needle to introduce fluid through the third fluid pathway.

6. The system of claim 1, wherein the second port is implantable.

7. The system of claim 6, wherein the second port is configured to be implanted subcutaneously in second location on skull in proximity to an ear or in implanted subcutaneously in proximity to a clavicle.

8. The system of claim 1, wherein second port comprises a fourth inlet and a fourth fluid flow pathway extending from the fourth inlet to the third outlet.

9. The system of claim 8, further comprising an implantable infusion device and an infusion device catheter, wherein the infusion device catheter is configured to operatively couple the infusion device to the fourth inlet of the second port.

10. The system of claim 1, further comprising an infusion device and an infusion catheter, wherein the infusion catheter is configured to operatively couple the infusion device to the second fluid flow pathway of the first port.

11. The system of claim 1, wherein a first distance separates the plurality of first side openings and the distal tip.

12. The system of claim 11, wherein the second plurality of distal openings comprises: a plurality of second side openings, wherein a second distance separates the plurality of second side openings and the distal tip, wherein the second distance is greater than the first distance.

13. The system of claim 1, wherein a first lumen body portion and a second lumen body portion of the CSF catheter body are both configured to extend to the distal tip.

14. The system of claim 1, further comprising a second port catheter connector configured to couple the port catheter to the third outlet.

15. The system of claim 1, wherein the port catheter connector comprises a sleeve configured to receive the port catheter and a barbed fitting configured to be inserted into a lumen of the port catheter.

16. A method comprising:
providing the system of claim 1 associated with a subject;
introducing a first therapeutic fluid into the third inlet of the second port to cause the therapeutic fluid to flow through the third pathway of the second port, through a lumen of the port catheter, through the second fluid pathway of the first port, through the second lumen of the CSF catheter, through the second plurality of distal openings of the CSF catheter in fluid communication with the second lumen of the CSF catheter, and into the subject; and
withdrawing CSF from the CSF-containing space of the subject through the first plurality of distal openings of the CSF catheter in fluid communication with the first lumen of the CSF catheter, through the first lumen of the CSF catheter, through the first passageway of the first port, and out of the first inlet of the first port.

17. The method of claim 16, wherein the first therapeutic fluid is introduced into the CSF-containing space.

18. The method of claim 16, wherein the system comprises an infusion device and an infusion catheter operatively coupled to the infusion device, and wherein the method further comprises introducing a second therapeutic fluid from the infusion device to the subject through the second plurality of distal openings of the CSF catheter in communication with the second lumen of the CSF catheter, wherein the first and second therapeutic fluids are the same or different.

19. The method of claim 18, wherein the first and second therapeutic fluids are the same.

20. The method of claim 18, further comprising uncoupling the port catheter from the third inlet of the second port and operatively coupling the infusion device catheter to the port catheter.

21. The method of claim 18, wherein the second port comprises the fourth inlet and the fourth fluid pathway extending from the fourth inlet to the third outlet, and wherein the infusion device catheter is operatively coupled to the fourth inlet.

22. The method of claim 18, wherein the second port and the infusion device are both operatively coupled to the port catheter.

* * * * *